US008462281B2

(12) United States Patent
Lee et al.

(10) Patent No.: US 8,462,281 B2
(45) Date of Patent: Jun. 11, 2013

(54) ARRAY SUBSTRATE FOR LIQUID CRYSTAL DISPLAY DEVICE WITH STORAGE ELECTRODES ON THE SEMICONDUCTOR LAYER AND METHOD OF FABRICATING THE SAME

(75) Inventors: Sook-Woo Lee, Gyeonggi-do (KR); Yong-In Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 521 days.

(21) Appl. No.: 12/385,753

(22) Filed: Apr. 17, 2009

(65) Prior Publication Data
US 2009/0269872 A1 Oct. 29, 2009

Related U.S. Application Data

(62) Division of application No. 11/452,996, filed on Jun. 15, 2006, now Pat. No. 7,532,263.

(30) Foreign Application Priority Data

Nov. 9, 2005 (KR) .............................. 2005-0106840

(51) Int. Cl.
G02F 1/1343 (2006.01)
G02F 1/136 (2006.01)
G09G 3/36 (2006.01)
H01L 29/04 (2006.01)

(52) U.S. Cl.
USPC ................... 349/39; 349/38; 349/42; 349/43; 349/47; 345/92; 257/59; 257/72

(58) Field of Classification Search
USPC .... 349/38–39, 38–38, 42–43, 46–47; 345/92; 257/59, 72
See application file for complete search history.

(56) References Cited

U.S. PATENT DOCUMENTS

| 6,569,717 | B1 | 5/2003 | Murade |
| 6,593,592 | B1 | 7/2003 | Yamazaki et al. |
| 6,657,688 | B2 | 12/2003 | Nagata et al. |
| 6,720,577 | B2 * | 4/2004 | Arao et al. ...................... 257/59 |
| 6,737,306 | B2 * | 5/2004 | Yamazaki et al. ............ 438/155 |
| 7,208,355 | B2 * | 4/2007 | Ishikawa ....................... 438/155 |

FOREIGN PATENT DOCUMENTS

| CN | 1680992 A | 10/2005 |
| JP | 5-34679 | 2/1993 |
| JP | 10-96956 | 4/1998 |
| JP | 10-177163 | 6/1998 |
| JP | 2003-195350 | 7/2003 |
| JP | 2003-197612 | 7/2003 |
| JP | 2004-271824 | 9/2004 |
| JP | 2005-72292 | 3/2005 |

* cited by examiner

Primary Examiner — Hoan C Nguyen
(74) Attorney, Agent, or Firm — Morgan, Lewis & Bockius LLP

(57) ABSTRACT

An array substrate for a liquid crystal display (LCD) device includes a substrate including a display region and a non-display region, a driving circuit in the non-display region, at least a first thin film transistor (TFT) in the display region, a storage capacitor in the display region including a first storage electrode, a second storage electrode, and a third storage electrode, wherein the first storage electrode includes a first semiconductor layer and a counter electrode, and the third storage electrode includes a first transparent electrode pattern and a first metal pattern, a gate line and a data line crossing each other to define a pixel region in the display region, and a pixel electrode connected to the first TFT in the pixel region.

10 Claims, 58 Drawing Sheets doping with high concentration n-type impurities doping with high concentration n-type impurities doping with high concentration p-type impurities doping with high concentration n-type impurities doping with high concentration n-type impurities doping with high concentration p-type impurities doping with high concentration p-type impurities doping with high concentration n-type impurities doping with low concentration n-type impurities

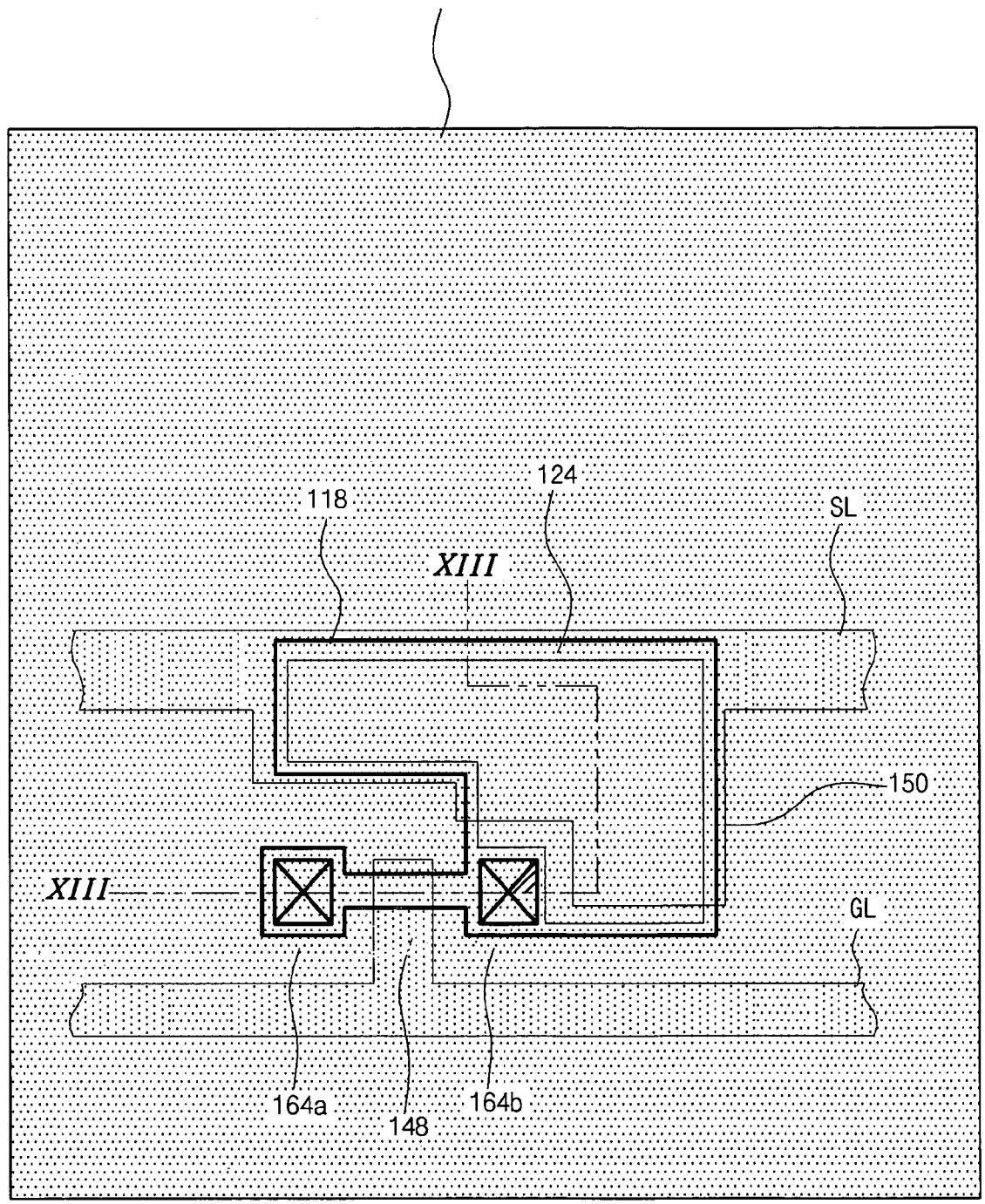

doping with high concentration p-type impurities doping with high concentration n-type impurities

ARRAY SUBSTRATE FOR LIQUID CRYSTAL DISPLAY DEVICE WITH STORAGE ELECTRODES ON THE SEMICONDUCTOR LAYER AND METHOD OF FABRICATING THE SAME This is a divisional application of application Ser. No. 11/452,996, filed on Jun. 15, 2006 now U.S. Pat. No. 7,532,263, which is hereby incorporated by reference.

The present application claims the benefit of Korean Patent Application No. 2005-0106840 filed in Korea on Nov. 9, 2005, which is hereby incorporated by reference.

BACKGROUND OF THE INVENTION

1. Field of the Invention

The present invention relates to an array substrate for a liquid crystal display device and a method of fabricating the same, and more particularly, to an array substrate having an integrated driving circuit.

Discussion of the Related Art

In general, a liquid crystal display (LCD) device uses optical anisotropy and polarization properties of liquid crystal molecules to display images. The LCD device includes first and second substrates facing each other and a liquid crystal layer interposed therebetween. The first substrate, typically referred to as an array substrate, includes thin film transistors (TFTs) as switching elements. The second substrate, typically referred to as a color filter substrate, includes a color filter. The TFT includes a semiconductor layer of amorphous silicon or polycrystalline silicon. Since a process using the amorphous silicon is performed in a relatively low temperature and requires a relatively inexpensive insulating substrate, the amorphous silicon has been widely used in fabricating the TFTs. However, since the amorphous silicon has randomly arranged silicon atoms, the amorphous silicon has weak bonding strengths between the silicon atoms, dangling bonds, and low field effect mobility. Accordingly, the TFTs made from amorphous silicon are not adequate for a driving circuit.

By contrast, the polycrystalline silicon has excellent field effect mobility. Hence, the polycrystalline silicon is typically used for fabricating the TFTs of the driving circuit. Further, by forming the driving circuit on the substrate using the polycrystalline silicon without using tape automated bonding (TAB), the LCD device becomes compact, and production cost of the LCD device decreases.

FIG. 1 is a schematic plane view showing an array substrate of an LCD device according to the related art. As shown in FIG. 1, the first substrate 30 includes a display region D1 and a non-display region D2. A switching TFT (Ts) and a pixel electrode 17 connected to the switching TFT (Ts) are formed in a pixel region P. A gate line 12 along a first direction and a data line 14 are formed to define the pixel region P. The pixel regions P are formed as a matrix in the display region D1.

A gate driving circuit 16 and a data driving circuit 18 are formed in the non-display region D2 of the first substrate 30. The gate driving circuit 16 and the data driving circuit 18 supply control signals and data signals to the pixel regions P through the gate lines 12 and the data lines 14, respectively. The gate driving circuit 16 and the data driving circuit 18 have TFTs having a complementary metal-oxide semiconductor (CMOS) structure to apply a suitable signal to the respective pixel region P. The TFTs having CMOS structure are typically used for rapidly treating signals in the driving circuit. The CMOS structure includes a combination of n-type (i.e., negative type) and p-type (i.e., positive type) TFTs.

FIG. 2 is a schematic plane view showing a display region of an LCD device having an integrated driving (IC) circuit on the first substrate according to the related art. As shown in FIG. 2, the first substrate 30 includes the gate lines GL, the data lines DL, the switching TFTs Ts, the pixel electrodes 82, and storage capacitors Cst. The gate lines GL and the data lines DL cross each other to define the pixel regions P, and the switching TFTs Ts including a gate electrode 52, an active layer 38, and source and drain electrodes 74a and 74b are formed at a crossing portion of the gate and data lines GL and DL. The pixel electrode 82 connected to the drain electrode 74b and the storage capacitor Cst including first, second, and third storage electrodes 40, 54, and 76 are formed in the pixel region P. The storage capacitors Cst are connected to a storage line SL.

The gate driving circuit 16 and a data driving circuit 18 is formed in a non-display region D2 at a periphery of the display region D1. The gate driving circuit 16 and the data driving circuit 18 supply signals to the gate and data lines GL and DL, respectively. Since the gate driving circuit 16 and the data driving circuit 18 have low leakage currents and easily control the signals supplied to the gate and data lines GL and DL, the gate driving circuit 16 and the data driving circuit 18 include TFTs of n-type or TFTs with the CMOS structure.

FIG. 3 is a cross-sectional view of a driving circuit, and FIG. 4 is a cross-sectional view taken along the line IV-IV of FIG. 2. The driving circuit DC, which may be one of the gate driving circuit 16 and the data driving circuit 18, is formed in the non-display region D2 and includes TFTs with CMOS structure, i.e., a combination of a first TFT Tp of p-type and second TFT Tn of n-type, as shown in FIG. 3. As shown in FIG. 4, a switching TFT Ts as a switching element, a pixel electrode 82, and a storage capacitor Cst are formed in the display region D1. The TFT Ts is typically an n-type TFT. The storage capacitor Cst includes a first capacitor C1 and a second capacitor C2, which are connected to each other in series. The first capacitor C1 includes a first storage electrode 40 and a second storage electrode 54. The second capacitor C2 includes the second storage electrode 54 and a third storage electrode 76. A process for fabricating the LCD device according to the related art is performed by a nine mask process including several doping process for forming the storage capacitor Cst, the first TFT Tp, and the second TFT Tn.

FIGS. 5A to 5I are cross-sectional views showing processes of fabricating a driving circuit according to the related art. FIGS. 6A to 6I are cross-sectional views showing processes of fabricating a display region of an array substrate according to the related art. FIGS. 7A to 7I are cross-sectional views showing processes of fabricating a portion taken along the lines VII-VII of FIGS. 6A to 6I.

A first mask process will now be described with reference to FIG. 5A, FIG. 6A and FIG. 7A. As shown in FIG. 5A, FIG. 6A and FIG. 7A, a buffer layer 32 is formed on the first substrate 30 by depositing a first insulating material. The non-display region D2 having first and second areas A1 and A2 (FIG. 5A) and the display region D1 having third and fourth areas A3 and A4 in the pixel region P (FIG. 7A) are defined on the first substrate 30. Then, a first semiconductor layer 34 of polycrystalline silicon in the first area A1, a second semiconductor layer 36 of polycrystalline silicon in the second area A2, and a third semiconductor layer 38 of polycrystalline silicon in the third area A3 and the first storage electrode 40 of polycrystalline silicon in the fourth area A4 are formed on the buffer layer 32. The layers of polycrystalline silicon are formed by depositing amorphous silicon, crystallizing the amorphous silicon using a laser, and patterning the crystallized amorphous silicon by a first mask process. The first, second, and third semiconductor layers 34, 36, and 38 function as an active layer, and the first storage electrode 40 functions as an electrode of the first capacitor (C1 of FIG. 4). The third semiconductor layer 38 and the first storage electrode 40 may be integrated.

A second mask process for doping the first storage electrode 40 with impurities is described with reference to FIG. 5B, FIG. 6B, and FIG. 7B. As shown in FIG. 5B, FIG. 6B, and FIG. 7B, a first photoresist (PR) pattern 42 is formed on the first, second, and third semiconductor layers 34, 36, and 38 by coating and patterning a photoresist layer during a second mask process. The first PR pattern 42 covers the first, second, and third areas A1, A2, and A3 while exposing the first storage electrode 40 in the fourth area A4. Then, the first storage electrode 40 is doped with high concentration n-type impurities using the first PR pattern 42 as a doping mask. Since the first storage electrode 40 functions as the electrode of the first capacitor (C1 of FIG. 4), impurities are doped to decrease electrical resistance of the first storage electrode 40. Then, the first PR pattern 42 is removed.

A third mask process will now be described with reference to FIG. 5C, FIG. 6C, and FIG. 7C. As shown in FIG. 5C, FIG. 6C, and FIG. 7C, a gate insulating layer 46 is formed on the first, second, and third semiconductor layers 34, 36, and 38 and the first storage electrode 40 by depositing a first inorganic insulating material. The inorganic insulating material includes one of silicon nitride and silicon oxide. Then, a first gate electrode 48, a second gate electrode 50, a third gate electrode 52, and a second storage electrode 54 are formed on the gate insulating layer 46 by deposing and patterning a first conductive metal by the third mask process. The first gate electrode 48 corresponds to a center of the first semiconductor layer 34 and has a size smaller than the first semiconductor layer 34. The second gate electrode 50 corresponds to a center of the second semiconductor layer 36 and has a size smaller than the second semiconductor layer 36. The third gate electrode 52 corresponds to a center of the third semiconductor layer 38 and has a size smaller than the third semiconductor layer 38. The second storage electrode 54 corresponds to a center of the first storage electrode 40 and has substantially the same size as the first storage electrode 40. At the same time, the gate line GL extending from the third gate electrode 52 is formed along a side of the pixel region P (FIG. 6C). A storage line SL extending from the second storage electrode 54 is formed across the pixel region P (FIG. 6C).

A fourth mask process for doping the second and third semiconductor layers 36 and 38 with impurities is described with reference to FIG. 5D, FIG. 6D, and FIG. 7D. As shown in FIG. 5D, FIG. 6D, and FIG. 7D, a second PR pattern 56 is formed in the first area A1 by coating and patterning PR. The second PR pattern 56 covers the first semiconductor layer 34. Then, ends of the second semiconductor layer 36 and ends of the third semiconductor layer 38 are doped with high concentration n-type impurities using the second PR pattern, the second and third gate electrodes 50 and 52, and the second storage electrode 54 as a doping mask such that the ends of the second semiconductor layer 36 and ends of the third semiconductor layer 38 have an ohmic contact characteristic. Then, the second PR pattern 56 is removed.

A fifth mask process for doping the first semiconductor layer 34 with impurities will now be described with reference to FIG. 5E, FIG. 6E, and FIG. 7E. As shown in FIG. 5E, FIG. 6E, and FIG. 7E, a third PR pattern 58 is formed in the second, third, and fourth areas A2, A3, and A4 by coating and patterning a layer of photoresist. The third PR pattern 58 covers the second and third semiconductor layers 36 and 38 and the first storage electrode 40. Because the first storage electrode 40 is covered with the second storage electrode 54, the third PR pattern 58 in the fourth area A4 is not essential. Then, ends of the first semiconductor layer 34 are doped with high concentration p-type impurities using the third PR pattern 58 and the first gate electrode 48 as a doping mask such that the ends of the first semiconductor layer 34 has an ohmic contact characteristic. The third PR pattern 58 is then removed.

A sixth mask process will now be described with reference to FIG. 5F, FIG. 6F, and FIG. 7F. As shown in FIG. 5F, FIG. 6F, and FIG. 7F, an interlayer insulating layer 60 having first, second, third, fourth, fifth, and sixth contact holes 62a, 62b, 64a, 64b, 66a, and 66b is formed on the first, second, and third gate electrodes 48, 50, and 52, and the second storage electrode 54 by depositing and patterning a second inorganic insulating material. The inorganic insulating material includes one of silicon nitride and silicon oxide. The first and second contact holes 62a, 62b expose the ends of the first semiconductor layer 34, respectively. The third and fourth contact holes 64a and 64b expose the ends of the second semiconductor layer 36, respectively. The fifth and sixth contact holes 66a and 66b expose the ends of the third semiconductor layer 38, respectively.

A seventh mask process will now be described with reference to FIG. 5G, FIG. 6G, and FIG. 7G. First, second, and third source electrodes 70a, 72a , and 74a and first, second, and third drain electrodes 70b, 72b and 74b are formed on the interlayer insulating layer 60 by depositing and patterning a second conductive metal. The second conductive metal includes one of chrome, molybdenum, tungsten, copper, and aluminum alloy. The first source electrode 70a and the first drain electrode 70b contact the first semiconductor layer 34 through the first and second contact holes 62a and 62b, respectively. The second source electrode 72a and the second drain electrode 72b contact the second semiconductor layer 36 through the third and fourth contact holes 64a and 64b, respectively. The third source electrode 74a and the third drain electrode 74b contact the third semiconductor layer 38 through the fifth and sixth contact holes 64a and 64b, respectively. At the same time, a third storage electrode 76 extending from the third drain electrode 74b is formed in the fourth area A4. The second capacitor C2 includes of the second storage electrode 54 and the third storage electrode 76. The data line DL extending from the third source electrode 74a is formed along one side of the pixel region P and crosses the gate line GL to define the pixel region P.

Through the above-mentioned seven mask processes, the CMOS structure having a combination of the p-type TFT and the n-type TFT is formed in the non-display region D2, and the n-type switching TFT is formed in the third area A3 of the display region D1. Also, the first and second capacitors are formed in the fourth area A4 of the display region D1.

An eighth mask process is described with reference to FIG. 5H, FIG. 6H, and FIG. 7H. As shown in FIG. 5H, FIG. 6H, and FIG. 7H, a passivation layer 78 is formed on the source electrodes 70a, 72a, and 74a and drain electrodes 70b, 72b, and 74b by depositing and patterning a second insulating material. A drain contact hole 80 exposing one of the third drain electrode 74b and the third storage electrode 76 is formed in the passivation layer 78.

A ninth mask process will now be described with reference to FIG. 5I, FIG. 6I, and FIG. 7I. As shown in FIG. 5I, FIG. 6,I and FIG. 7I, a pixel electrode 82 is formed on the passivation layer 78 by depositing and patterning a transparent conductive metal. The transparent conductive metal includes one of indium-tin-oxide (ITO) and indium-zinc-oxide (IZO). The pixel electrode 82 contacts one of the third drain electrode 74b and the third storage electrode 76 through the drain contact hole 82.

Through the above-mentioned nine mask processes, the array substrate for the LCD device having the integrated driving circuit according to the related art is formed. However, due to the number of processes, processing time is delayed and production costs are increased. Also, since the array substrate is manufactured through so many processes, the defect rate increases.

SUMMARY OF THE INVENTION

Accordingly, the present invention is directed to array substrate for a liquid crystal display device and a method of fabricating the same that substantially obviate one or more of the problems due to limitations and disadvantages of the related art.

An object of the present invention is to provide an array substrate having an integrated driving circuit that decreases the number of fabrication processes and decreases production cost.

Another object of the present invention is to provide a method of fabricating a liquid crystal display device having an integrated driving circuit that decreases the number of mask processes and decreases fabrication cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the array substrate for a liquid crystal display (LCD) device includes a substrate including a display region and a non-display region, a driving circuit in the non-display region, at least a first thin film transistor (TFT) in the display region, a storage capacitor in the display region including a first storage electrode, a second storage electrode, and a third storage electrode, wherein the first storage electrode includes a first semiconductor layer and a counter electrode, and the third storage electrode includes a first transparent electrode pattern and a first metal pattern, a gate line and a data line crossing each other to define a pixel region in the display region, and a pixel electrode connected to the first TFT in the pixel region.

In another aspect, the method of fabricating an array substrate for a liquid crystal display (LCD) device includes preparing a substrate having a display region and a non-display region, forming a first semiconductor layer and a second semiconductor layer in the non-display region of the substrate, and a third semiconductor layer and a fourth semiconductor layer in the display region of the substrate, the first semiconductor layer including a first region and a second region, the second semiconductor layer including a third region, a fourth region, and a fifth region, and the third semiconductor layer including a sixth region, a seventh region, and an eighth region, forming a counter electrode on the fourth semiconductor layer to define a first storage electrode, forming a first gate electrode over the first region of the first semiconductor layer, a first metal pattern covering the second semiconductor layer, and a second metal pattern covering the third semiconductor layer and the counter electrode, doping the second region of the first semiconductor layer with high concentration p-type impurities, forming a second gate electrode over the third region of the second semiconductor layer, a third gate electrode over the sixth region of the third semiconductor layer, and a second storage electrode over the first storage electrode, wherein the second gate electrode formed from the first metal pattern, and the third gate electrode and the second storage electrode are formed from the second metal pattern, doping the fifth region of the second semiconductor layer and the eighth region of the third semiconductor layer with high concentration n-type impurities, and the fourth region of the second semiconductor layer and the seventh region of the third semiconductor layer with low concentration n-type impurities, forming an interlayer insulating layer to cover the first, second, and third gate electrodes and the second storage electrode, the interlayer insulating layer having first and second contact holes exposing the second region of the first semiconductor layer, third and fourth contact holes exposing the fifth region of the second semiconductor layer, and fifth and sixth contact holes exposing the eighth region of the third semiconductor layer, and forming first, second, and third source electrodes, first, second, and third drain electrodes, a third storage electrode, and a pixel electrode on the interlayer insulating layer, the first source electrode and the first drain electrode contacting the second region of the first semiconductor layer through the first and second contact holes, respectively, the second source electrode and the second drain electrode contacting the fifth region of the second semiconductor layer through the third and fourth contact holes, respectively, the third source electrode and the third drain electrode contacting the eighth region of the third semiconductor layer through the fifth and sixth contact holes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
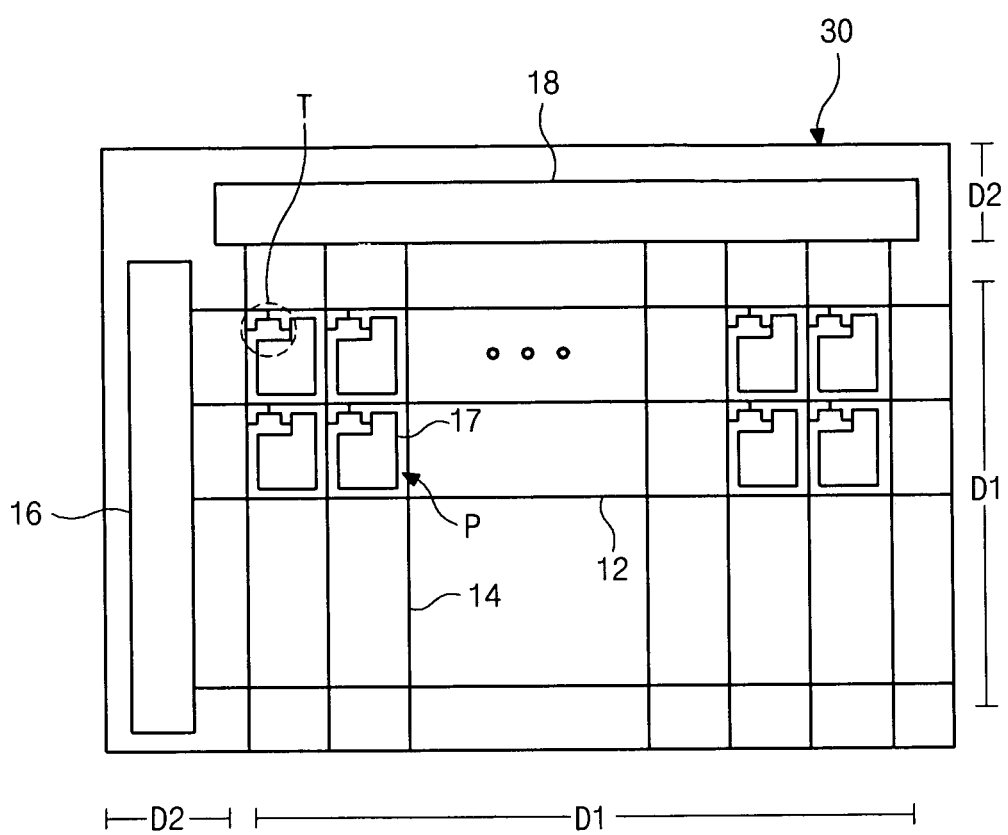
FIG. 1 is a schematic plane view showing an array substrate for an LCD device according to the related art.
Figure 2:
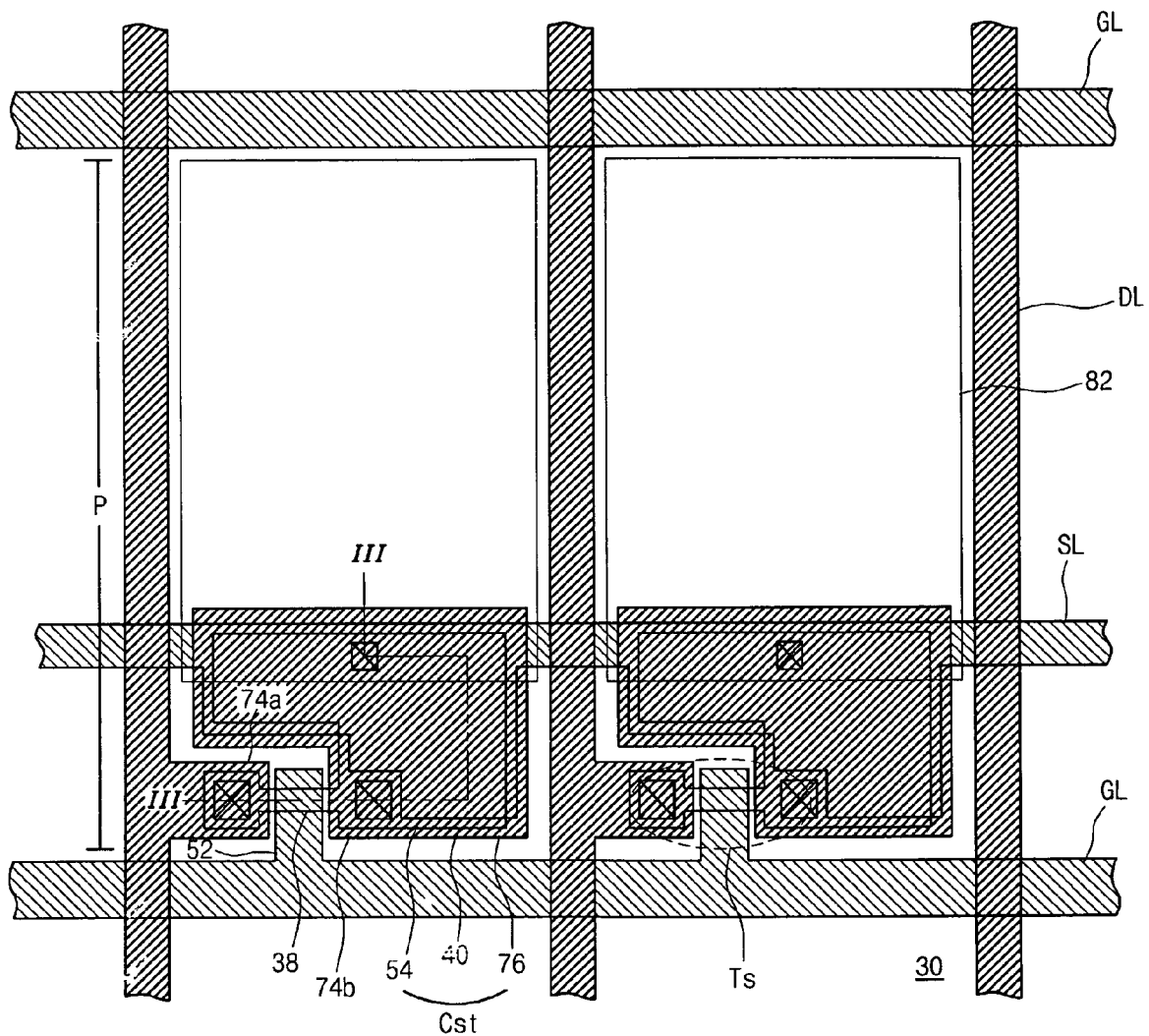
FIG. 2 is a schematic plane view showing a display region of an LCD device having an integrated driving circuit on the first substrate according to the related art.
Figure 3:
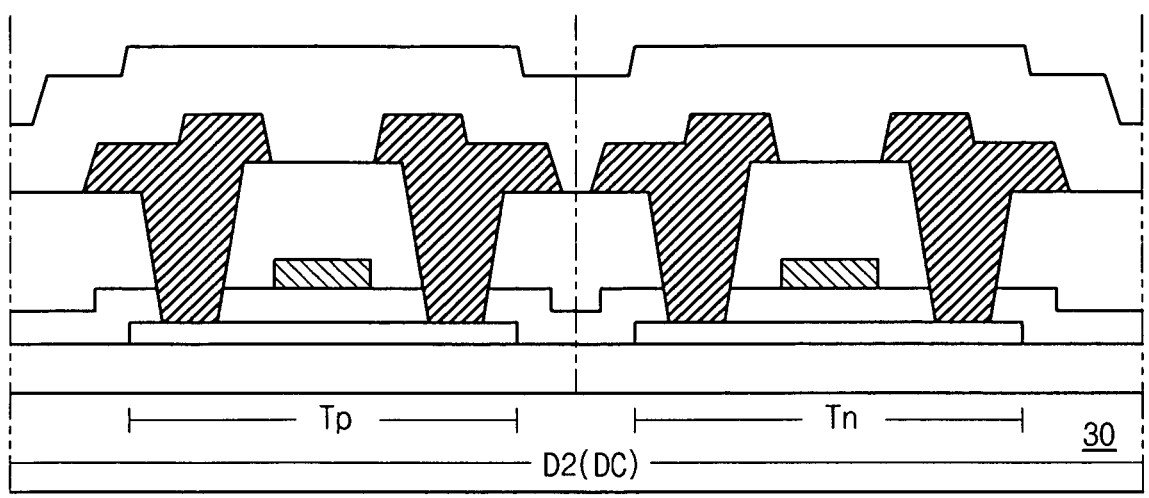
FIG. 3 is a cross-sectional view of a driving circuit according to the related art.
Figure 4:
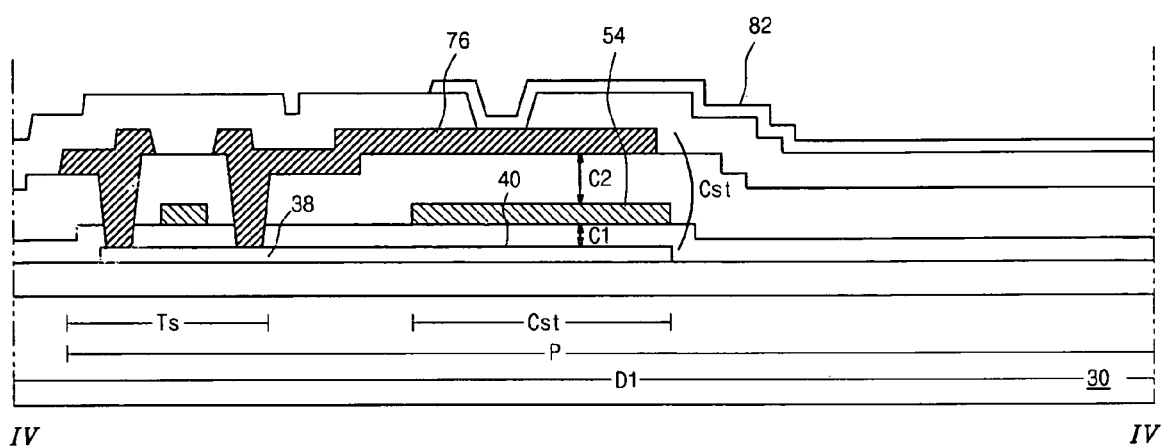
FIG. 4 is a cross-sectional view of a display region taken along the line IV-IV of FIG. 2.
Figure 5A:
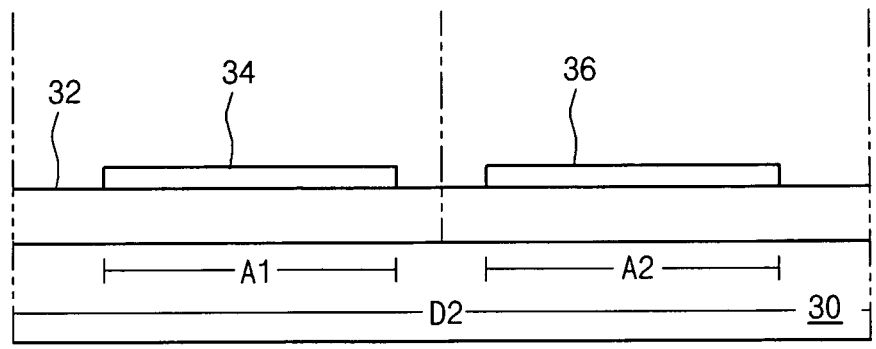
FIGS. 5A to 5I are cross-sectional views showing processes of fabricating a driving circuit according to the related art.
Figure 5B:
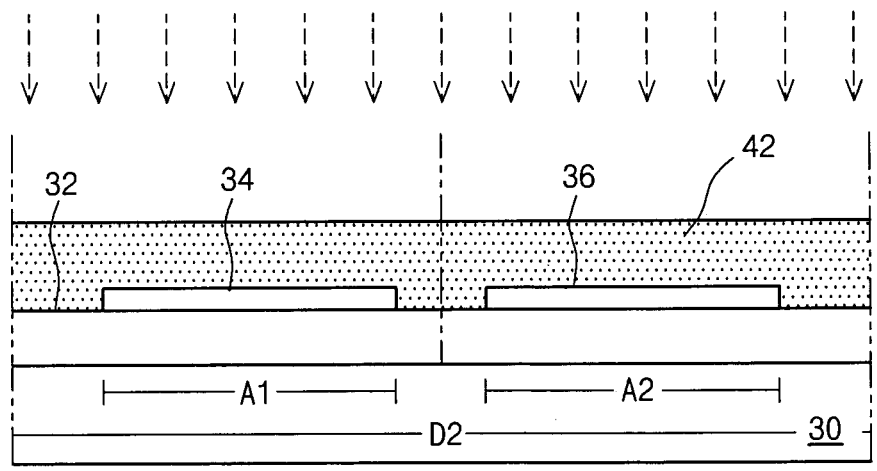
Figure 5C:
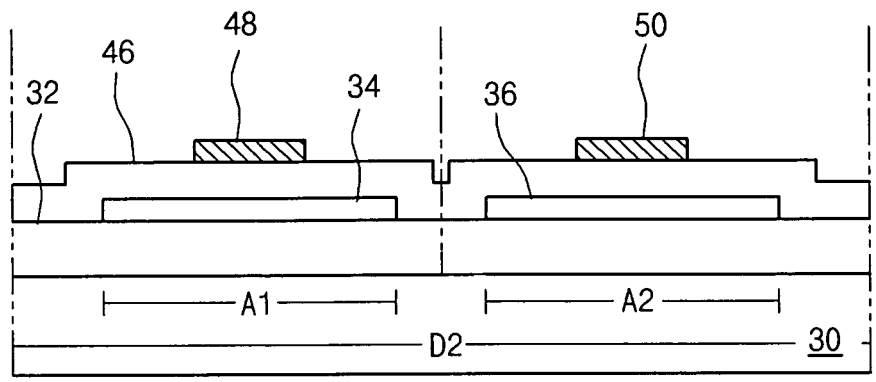
Figure 5D:
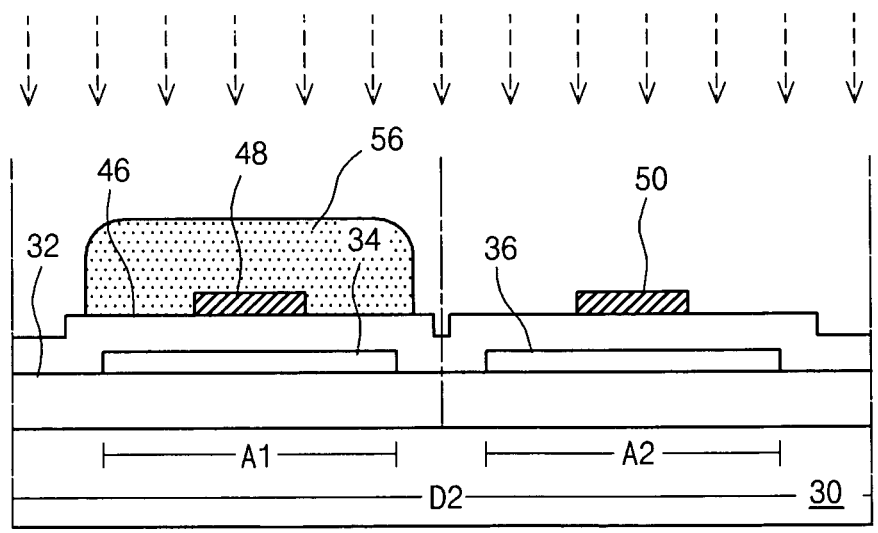
Figure 5E:
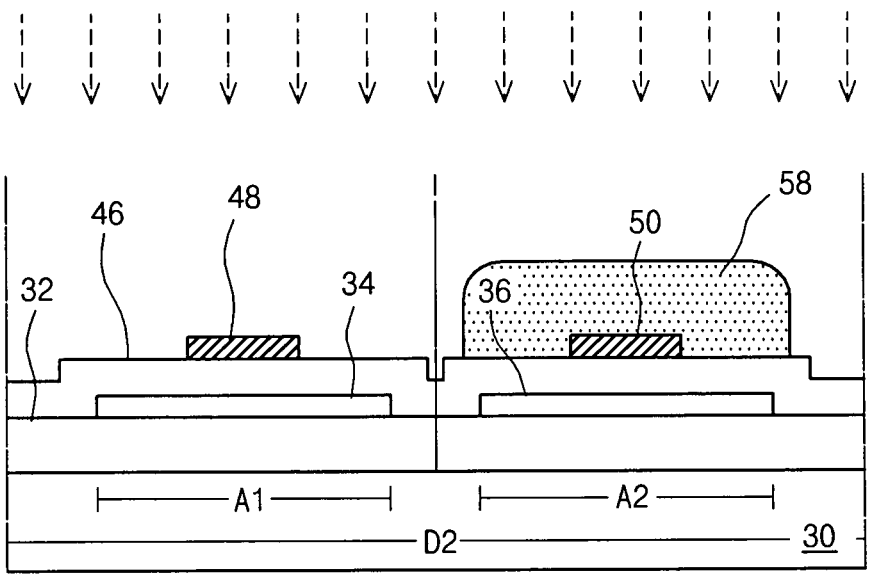
Figure 5F:
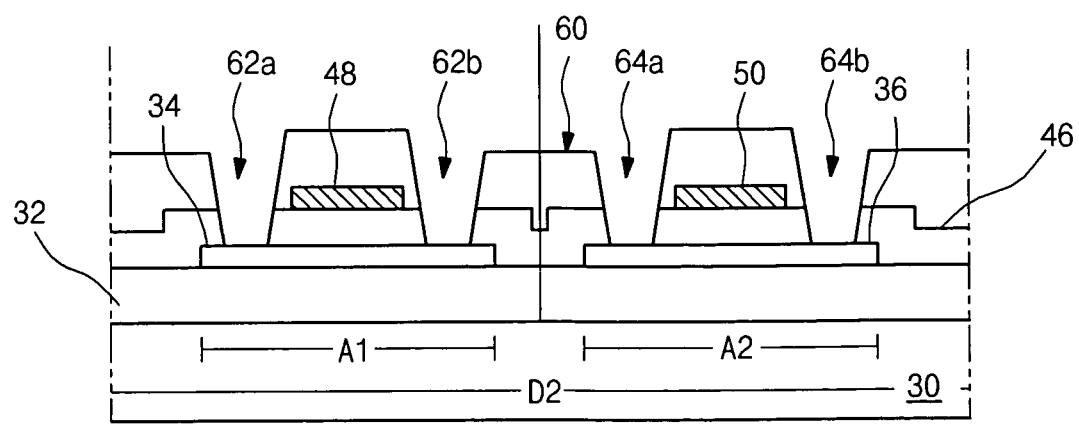
Figure 5G:
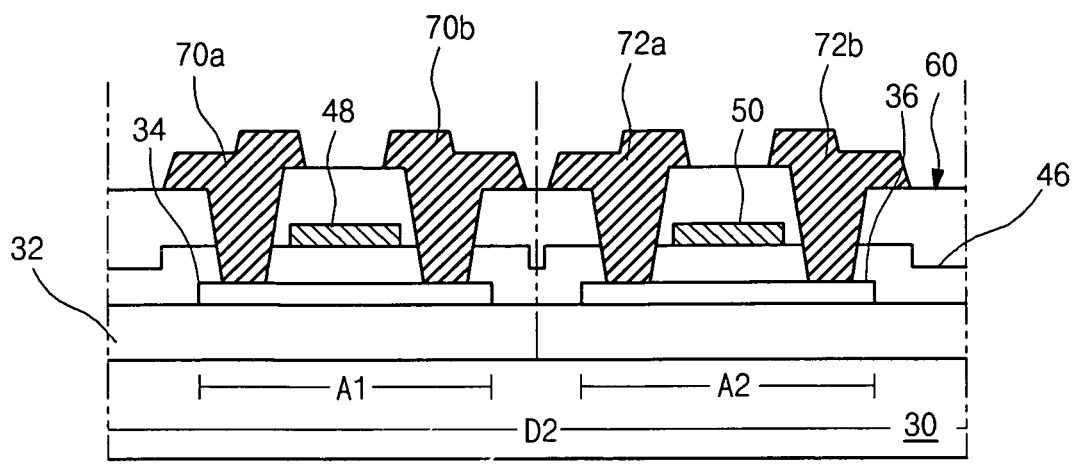
Figure 5H:
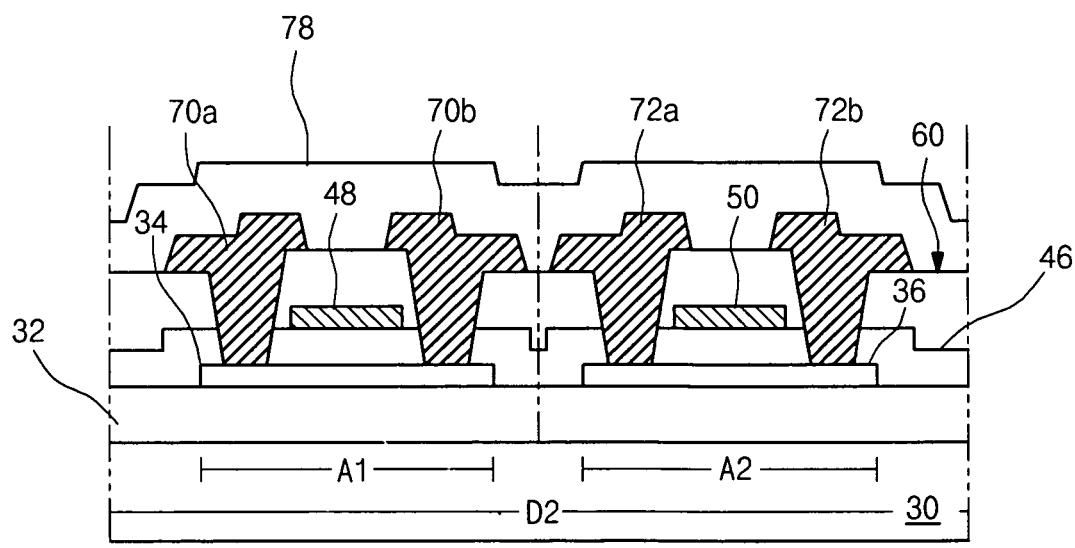
Figure 5I:
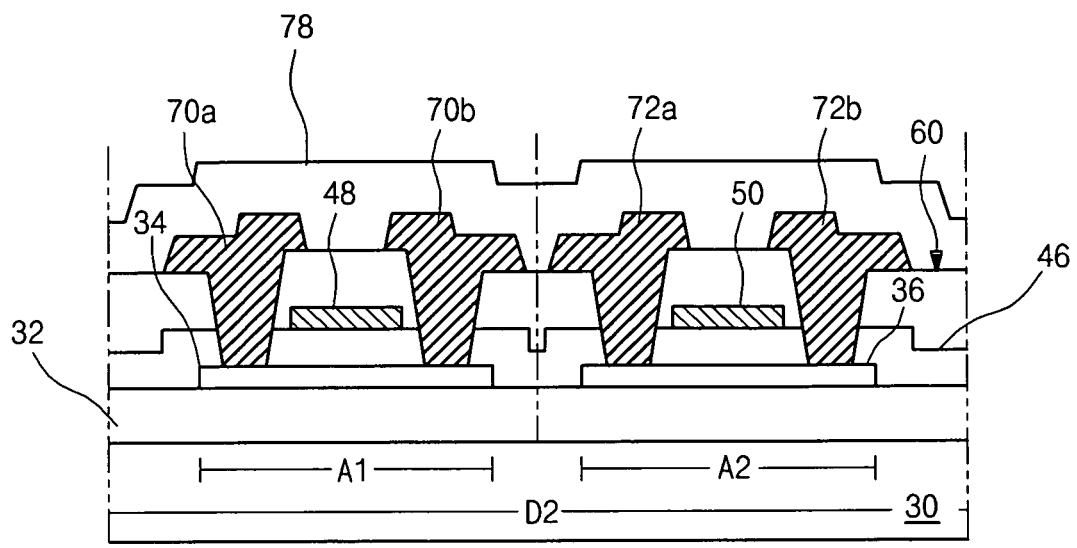
Figure 6A:
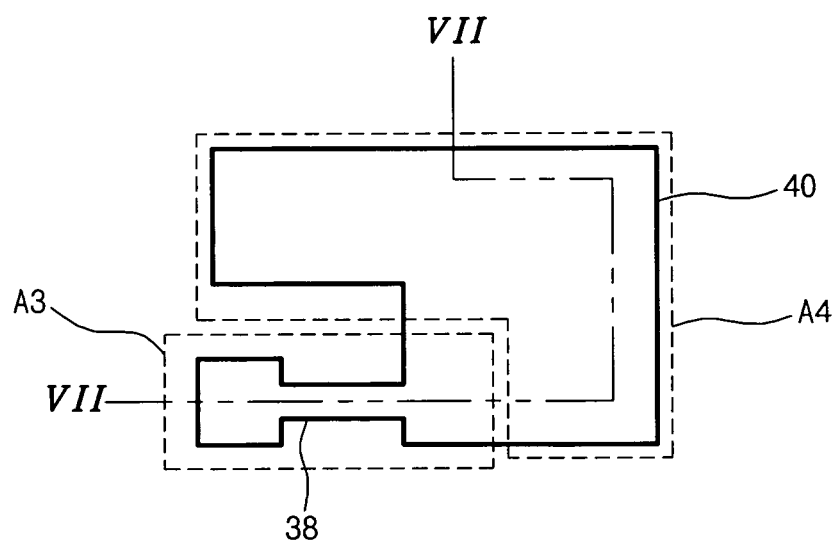
FIGS. 6A to 6I are cross-sectional views showing processes of fabricating a display region of an array substrate according to the related art.
Figure 6B:
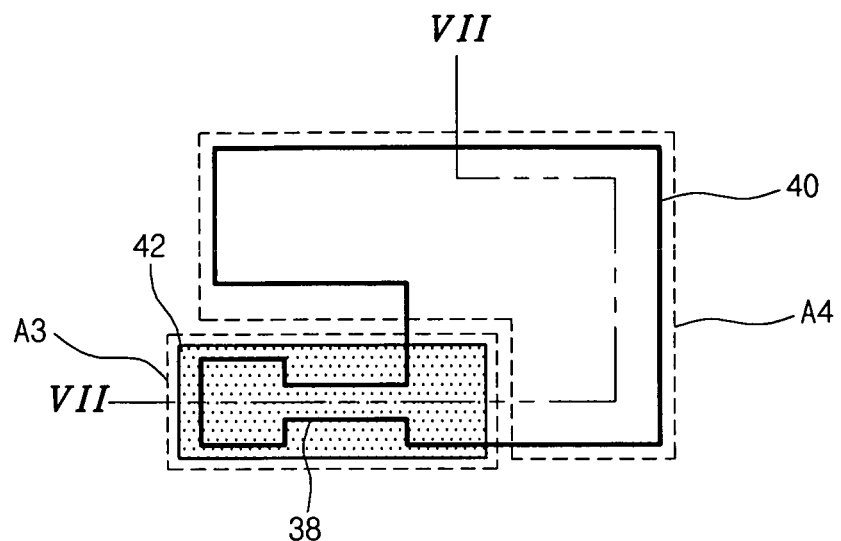
Figure 6C:
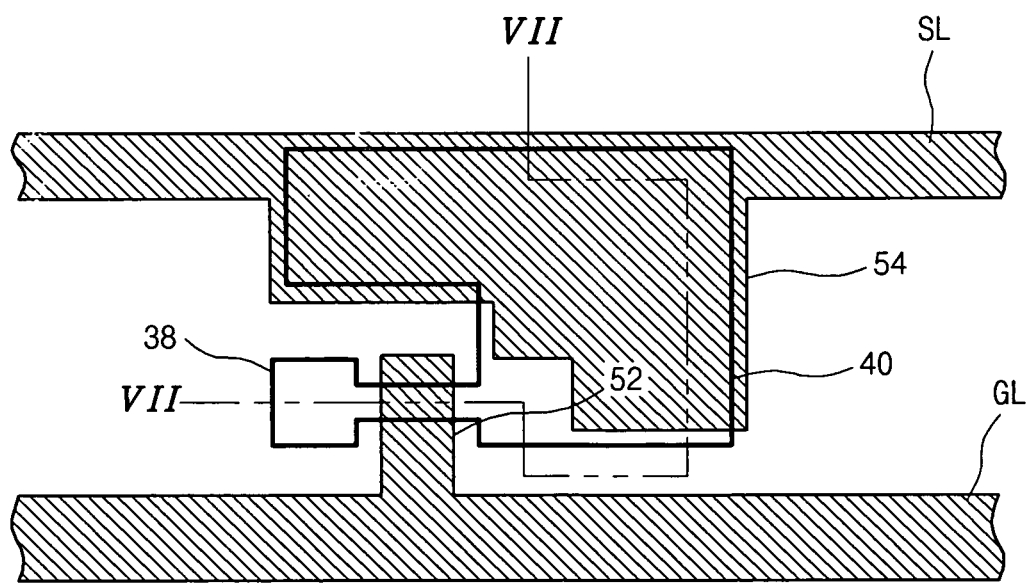
Figure 6D:
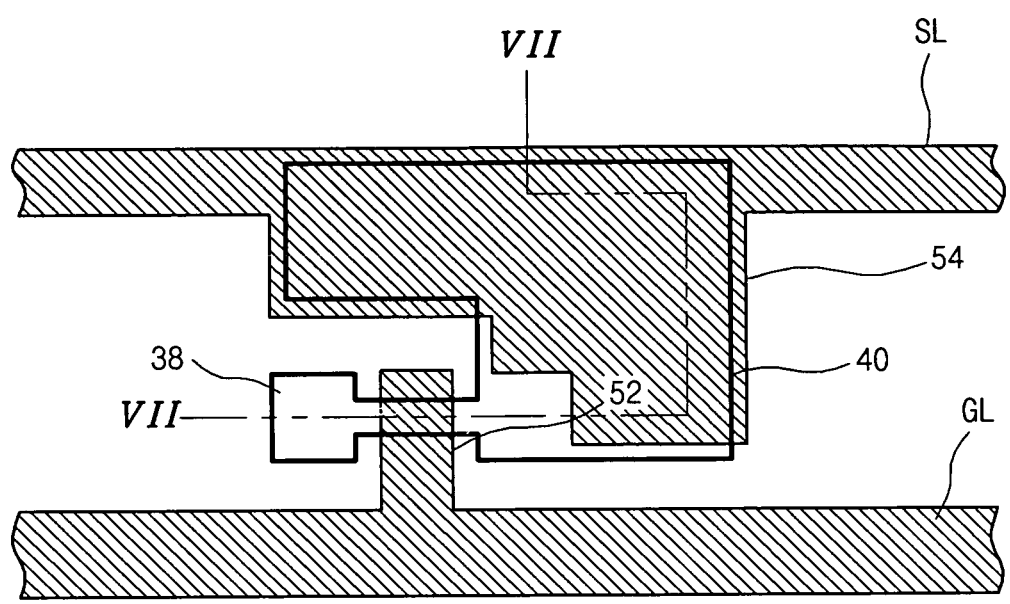
Figure 6E:
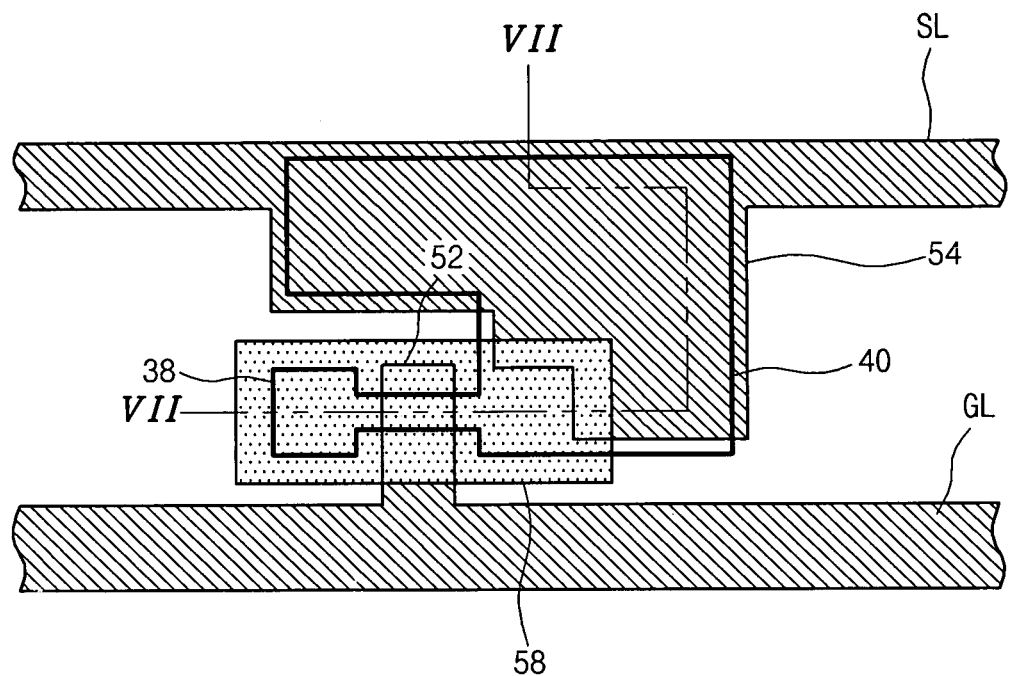
Figure 6F:
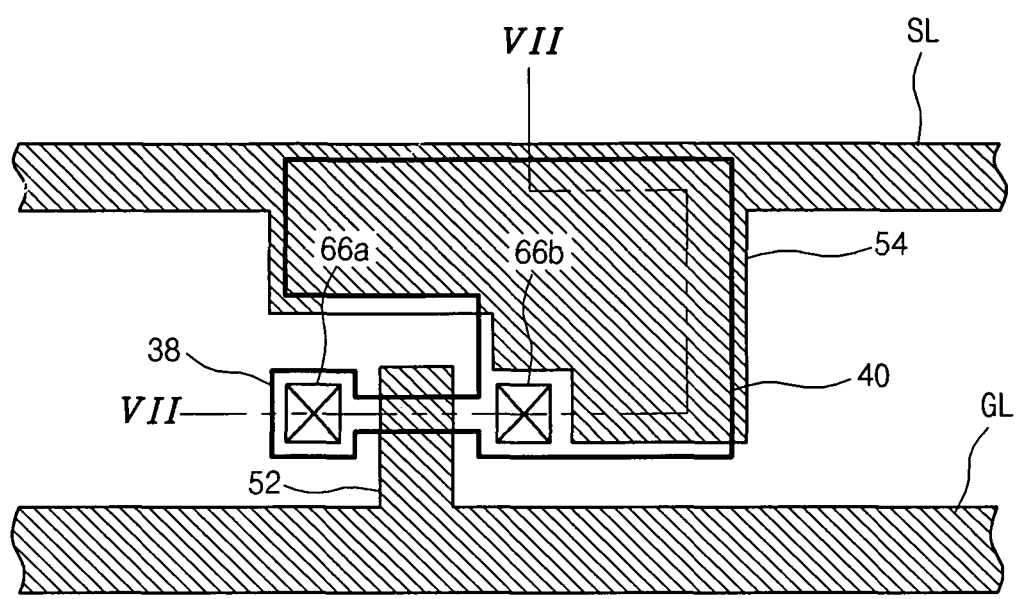
Figure 6G:
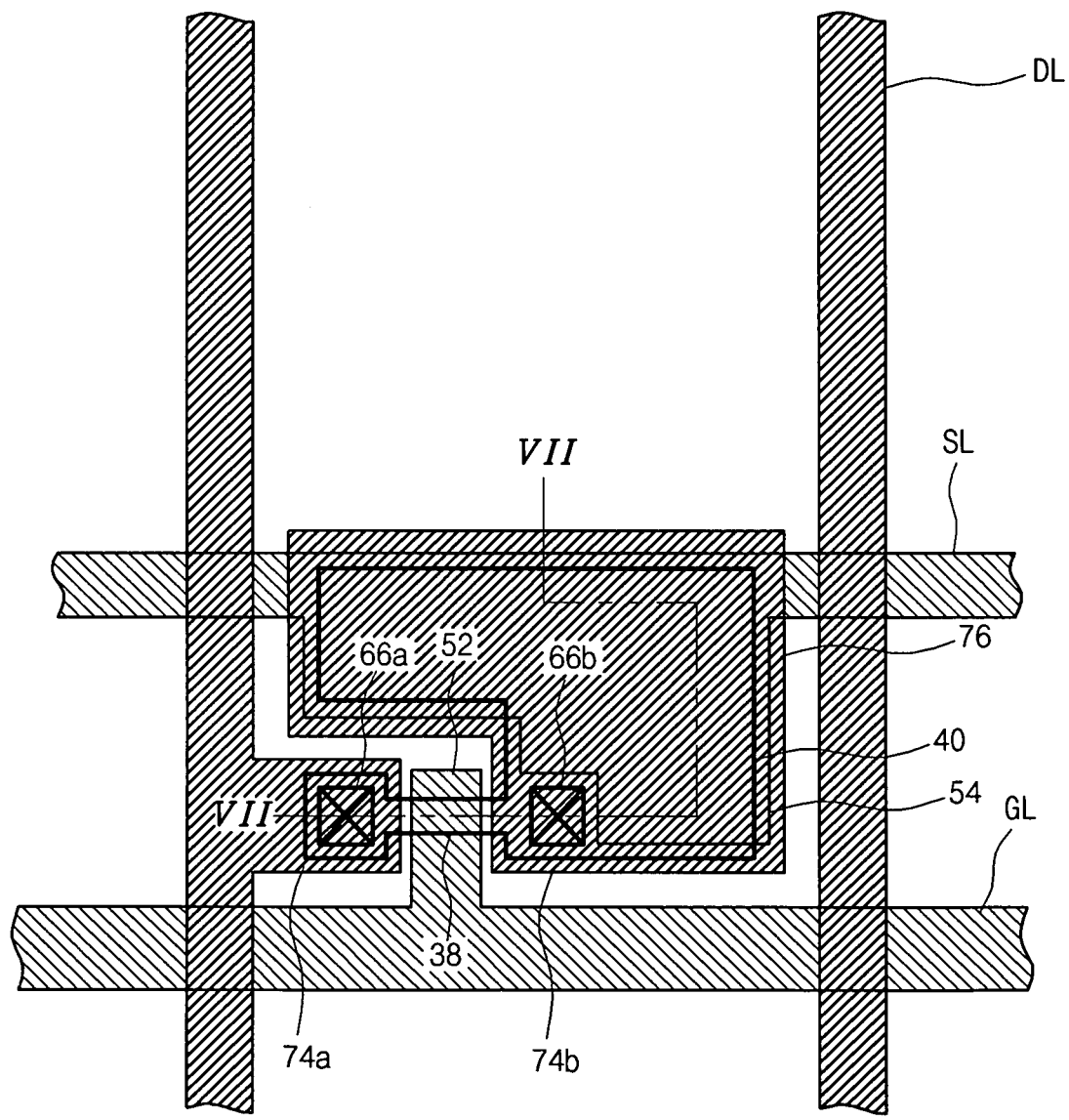
Figure 6H:
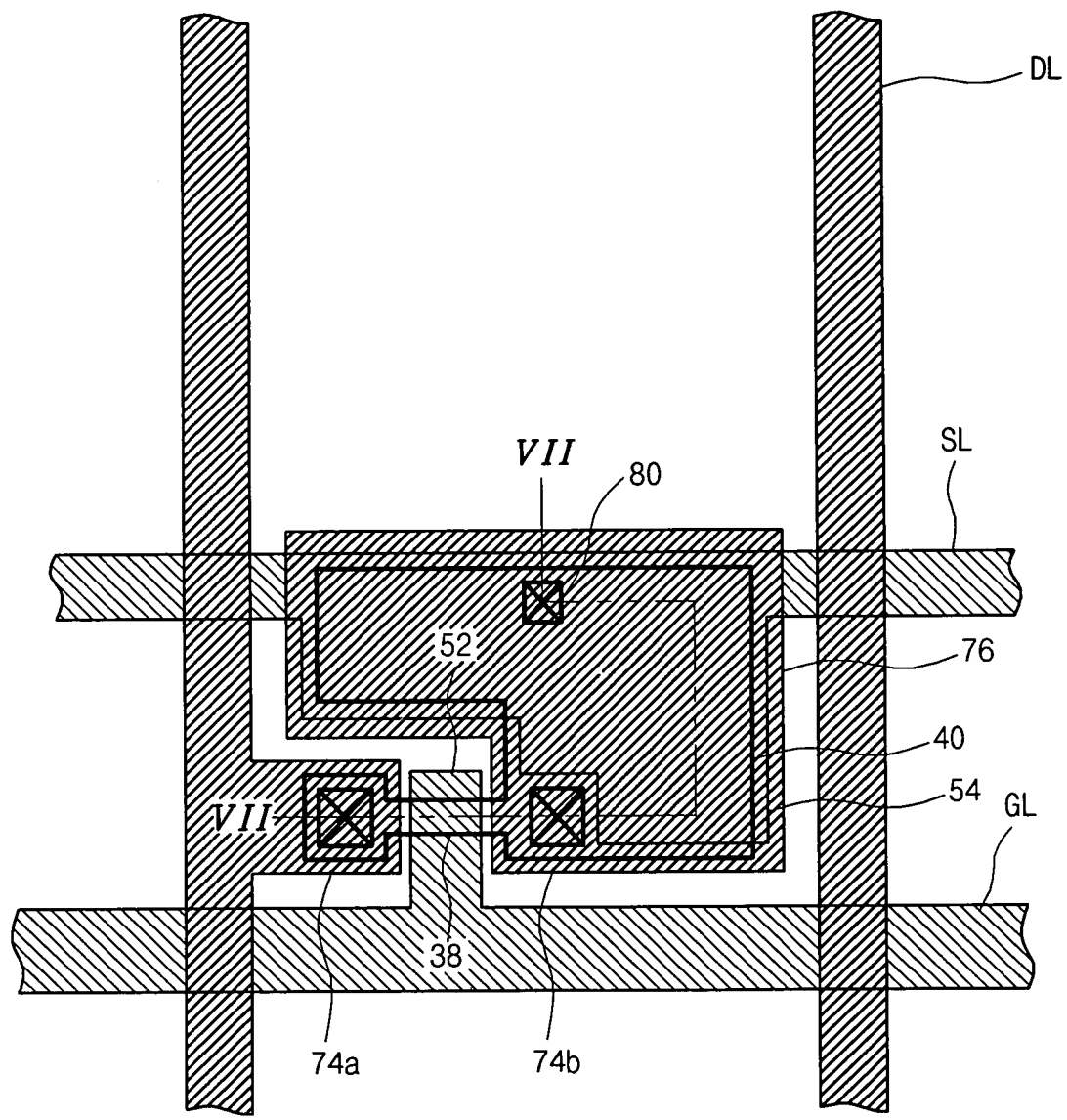
Figure 6I:
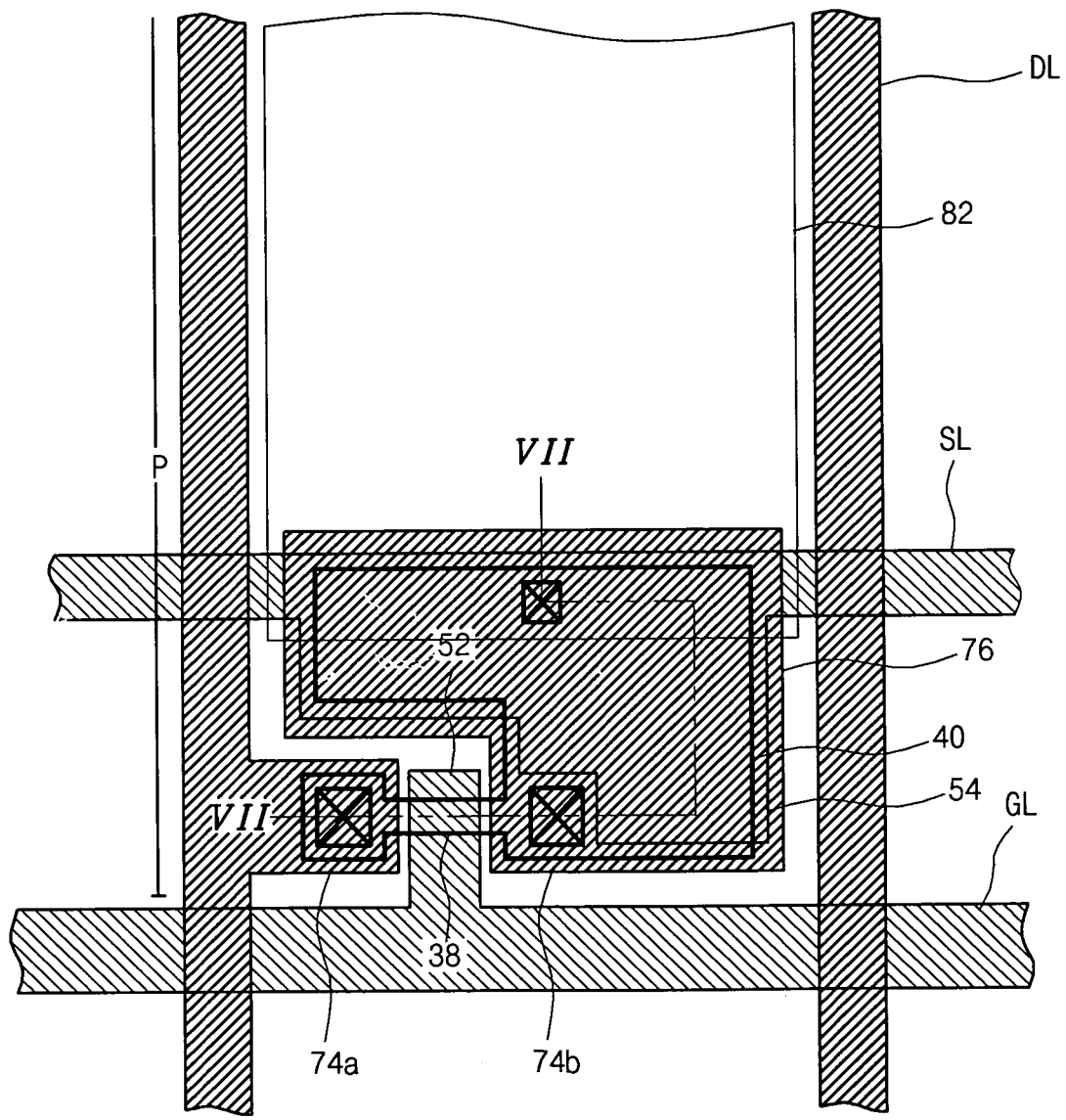
Figure 7A:
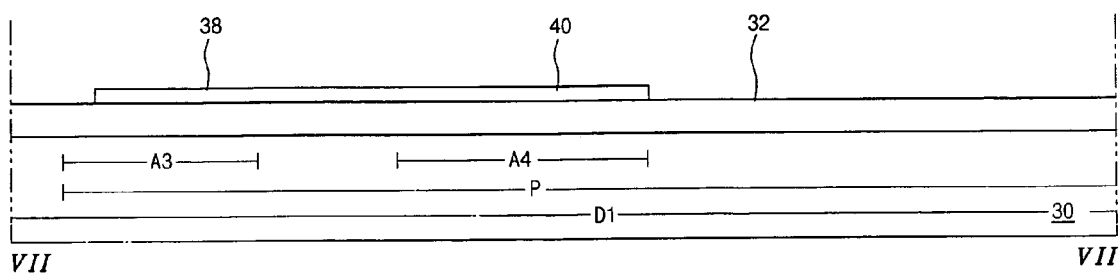
FIGS. 7A to 7I are cross-sectional views showing processes of fabricating a portion taken along the lines VII-VII of FIGS. 5A to 5I.
Figure 7B:
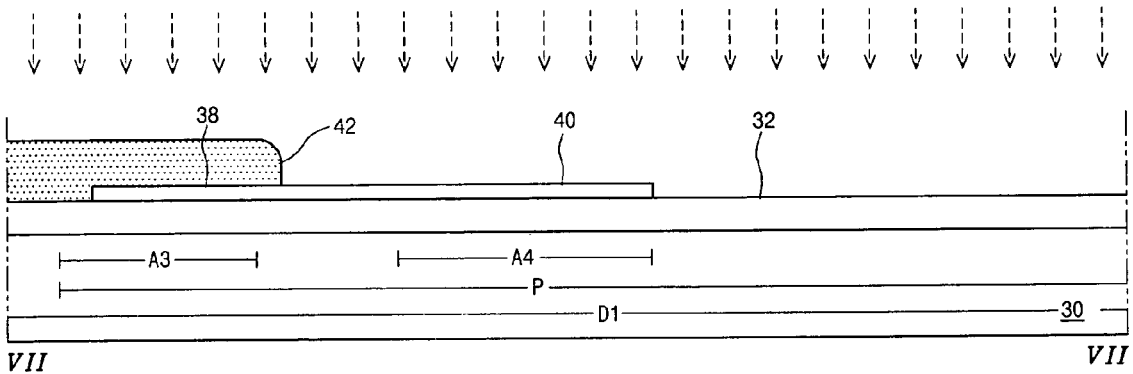
Figure 7C:
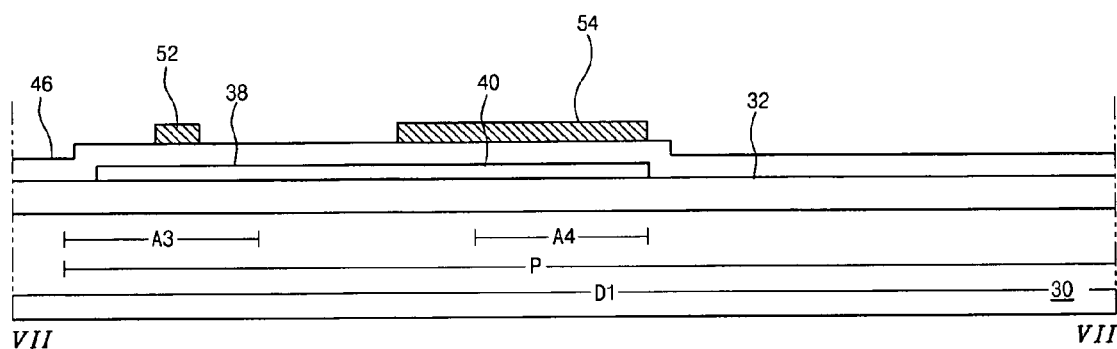
Figure 7D:
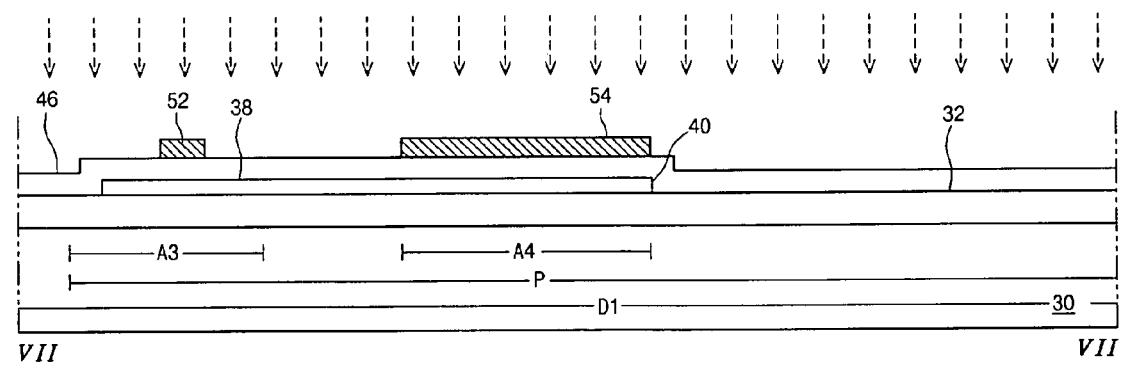
Figure 7E:
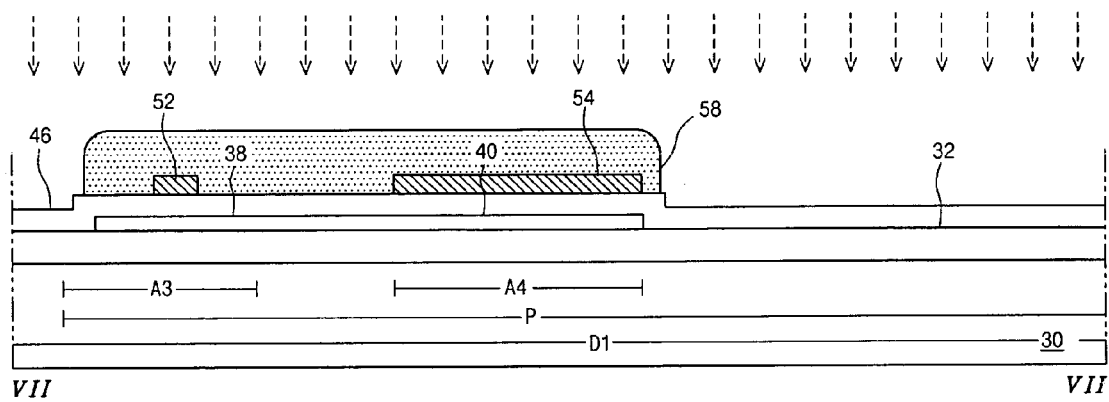
Figure 7F:
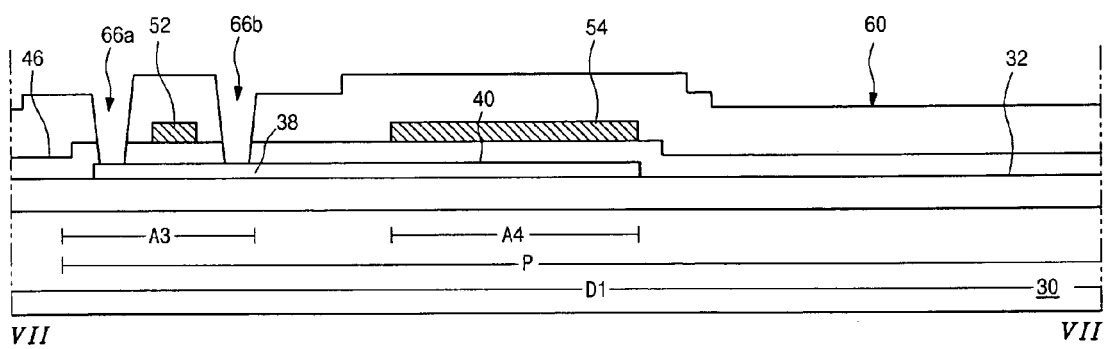
Figure 7G:
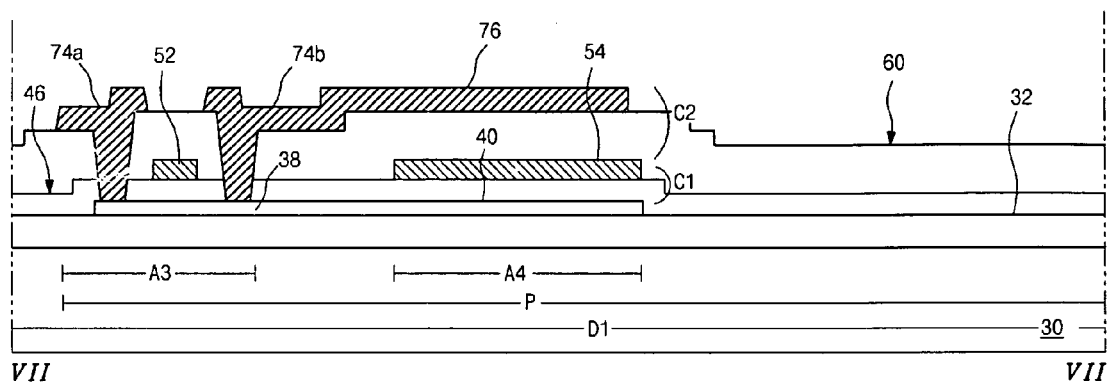
Figure 7H:
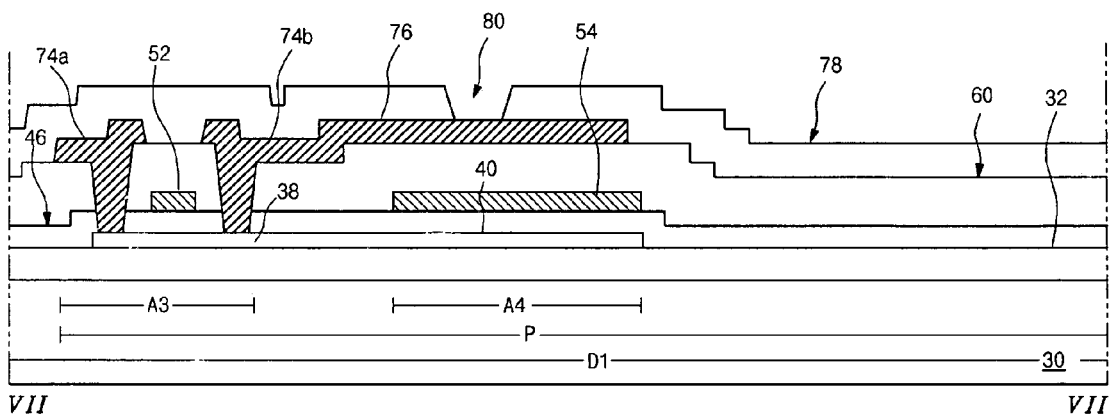
Figure 7I:
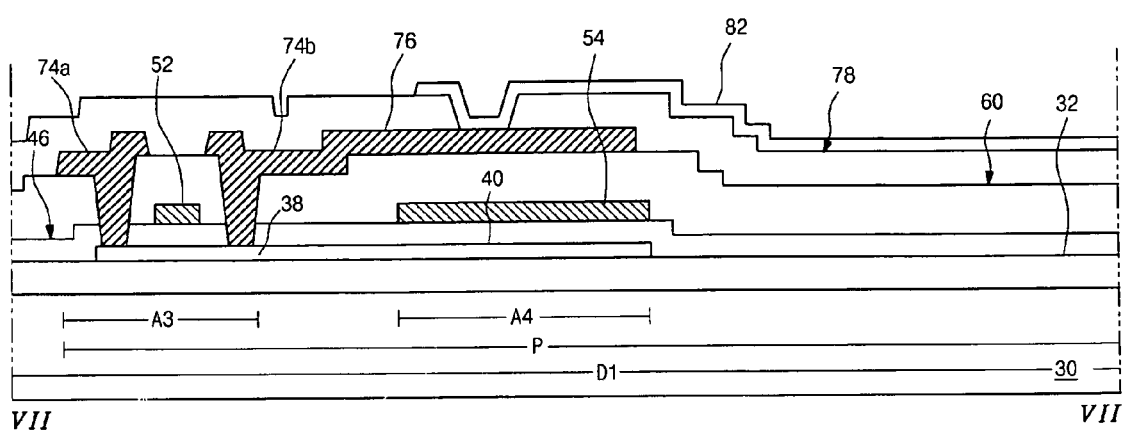
Figure 8:
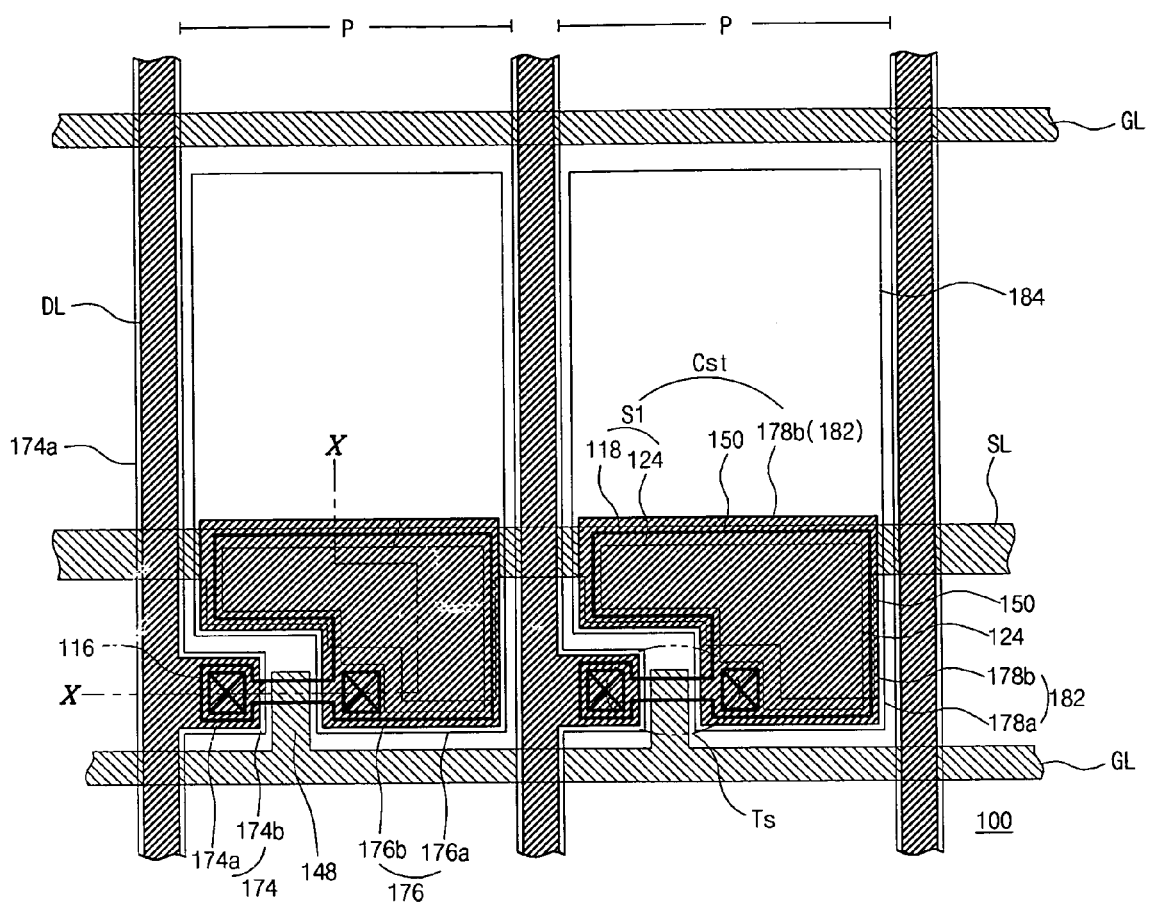
FIG. 8 is a schematic plane view showing a display region of an LCD device having an integrated driving circuit on the first substrate according to an exemplary embodiment of the present invention.

FIG. 8 is a schematic plane view showing a display region of an LCD device having an integrated driving circuit on the first substrate according to an exemplary embodiment of the present invention. As shown in FIG. 8, gate lines GL and data lines DL are formed on a first substrate 100 and cross each other to define pixel regions P. A switching TFT Ts of polycrystalline silicon is formed at a crossing portion of the gate and data lines GL and DL and includes an active layer 116 of polycrystalline silicon, a gate electrode 148 and a source electrode 174 and a drain electrode 176. A pixel electrode 184 is formed in the pixel region P and contacts the drain electrode 176 of the switching TFT Ts.

A storage capacitor Cst including a first storage electrode S1, a second storage electrode 150, and a third storage electrode 182 is formed in the pixel region P. The first storage electrode S1 includes a semiconductor layer 118 of polycrystalline silicon and a counter electrode 124 on the semiconductor layer 118. The second storage electrode 150 extends from a storage line SL and is disposed over the first storage electrode S1. The third storage electrode 182 extends from the drain electrode 176 and is disposed over the second storage electrode 150. It is characteristic that same signals are applied to the counter electrode 124 and the semiconductor layer 118. The source electrode 174 includes a transparent electrode layer 174a and a conductive metal layer 174b. The drain electrode 176 includes a transparent electrode layer 176a and a conductive metal layer 176b. Also, the storage electrode 182 includes a transparent electrode pattern 178a and a conductive metal pattern 178b. It is characteristic that the transparent electrode pattern 178a extends from the pixel electrode 184.

Figure 9:
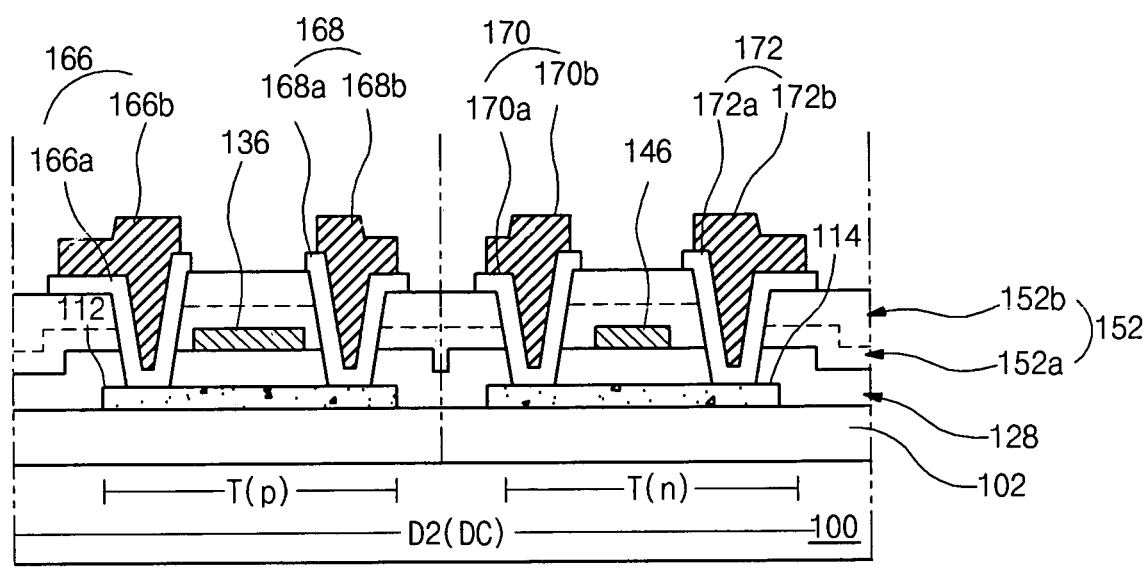
FIG. 9 is a cross-sectional view of a driving circuit according to an exemplary embodiment of the present invention.
Figure 10:
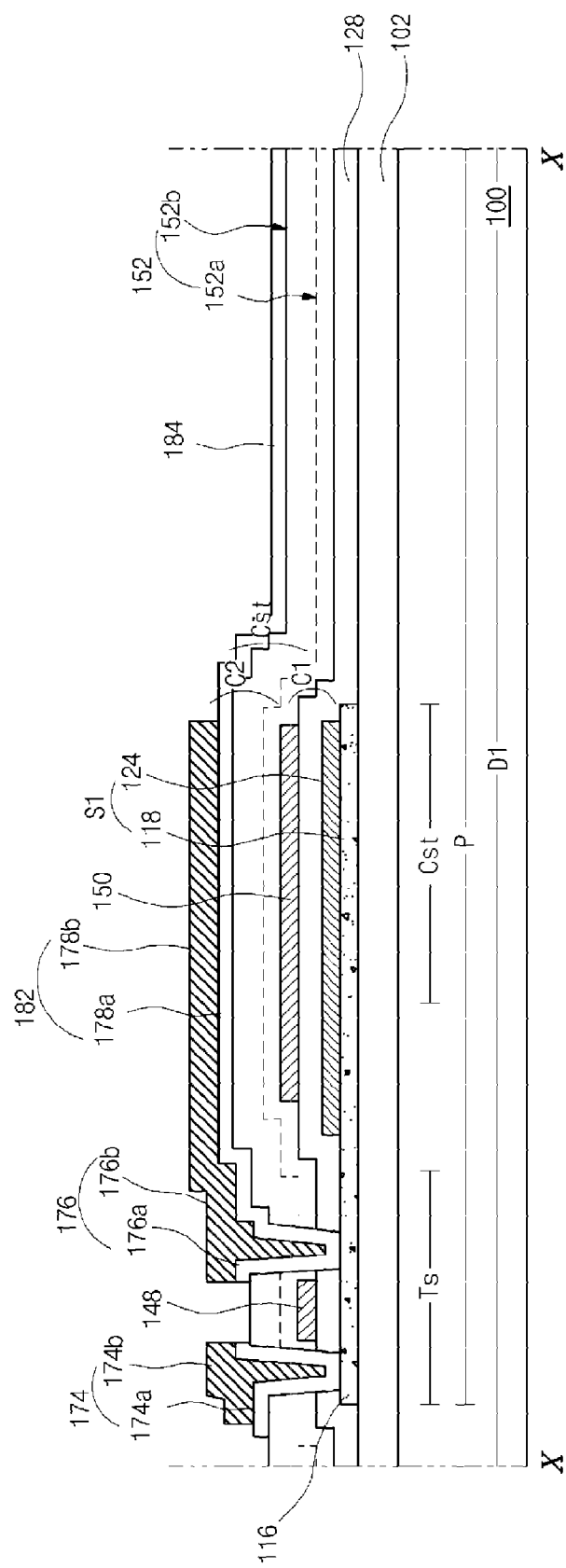
FIG. 10 is a cross-sectional view of display region taken along the line X-X of FIG. 8.

FIG. 9 is a cross-sectional view of a driving circuit according to an exemplary embodiment of the present invention. FIG. 10 is a cross-sectional view of display region taken along line X-X of FIG. 8. As shown in FIG. 9 and FIG. 10, the first substrate 100 has two regions defined as a display region D1 including the pixel region P (FIG. 10) and a non-display region D2 (FIG. 9).

A driving circuit (DC) having a CMOS structure, for example, is formed in the non-display region D2. As shown in FIG. 9, the CMOS structure includes a first TFT Tp of p-type and a second TFT Tn of n-type. The first TFT Tp includes a buffer layer 102, a first semiconductor layer 112, a gate insulating layer 128, a first gate electrode 136, an interlayer insulating layer 152 including a first interlayer insulating layer 152a and a second interlayer insulating layer 152b, a first source electrode 166 including a first transparent electrode pattern 166a and a first conductive metal pattern 166b, and a first drain electrode 168 including a second transparent electrode pattern 168a and a second conductive metal pattern 168b. The second TFT Tn includes the buffer layer 102, a second semiconductor layer 114, the gate insulating layer 128, a second gate electrode 146, the interlayer insulating layer 152 including the first interlayer insulating layer 152a and the second interlayer insulating layer 152b, a second source electrode 170 including a third transparent electrode pattern 170a and a third conductive metal pattern 170b, and a second drain electrode 172 including a fourth transparent electrode pattern 172a and a fourth conductive metal pattern 172b.

As shown in FIG. 10, the switching TFT Ts, the storage capacitor Cst, and the pixel electrode 184 are formed in pixel region P. The switching TFT Ts includes the buffer layer 102, a third semiconductor layer 116, the gate insulating layer 128, a third gate electrode 148, the interlayer insulating layer 152 including the first interlayer insulating layer 152a and the second interlayer insulating layer 152b, a third source electrode 174 including a fifth transparent electrode pattern 174a and a fifth conductive metal pattern 174b, and a third drain electrode 176 including a sixth transparent electrode pattern 176a and a sixth conductive metal pattern 176b. The TFT Ts is an n-type TFT. However, other types of TFTs may be used without departing from the scope of the invention. The storage capacitor Cst includes a first capacitor C1 and a second capacitor C2 connected to each other in series. The first capacitor C1 includes a first storage electrode S1 and a second storage electrode 150, and the second capacitor C2 includes a second storage electrode 150 and a third storage electrode 182 including a seventh transparent electrode pattern 178a and a seventh conductive metal pattern 178b. The pixel electrode 184 contacts the switching TFT Ts.

Figure 11A:
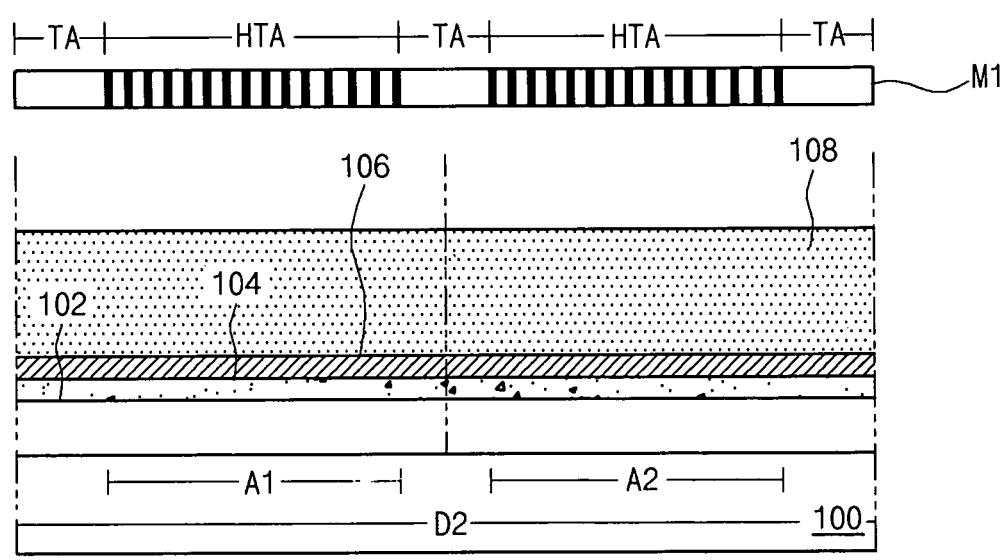
FIGS. 11A to 11P are cross-sectional views showing fabricating processes of a driving circuit according to an exemplary embodiment of the present invention.
Figure 11B:
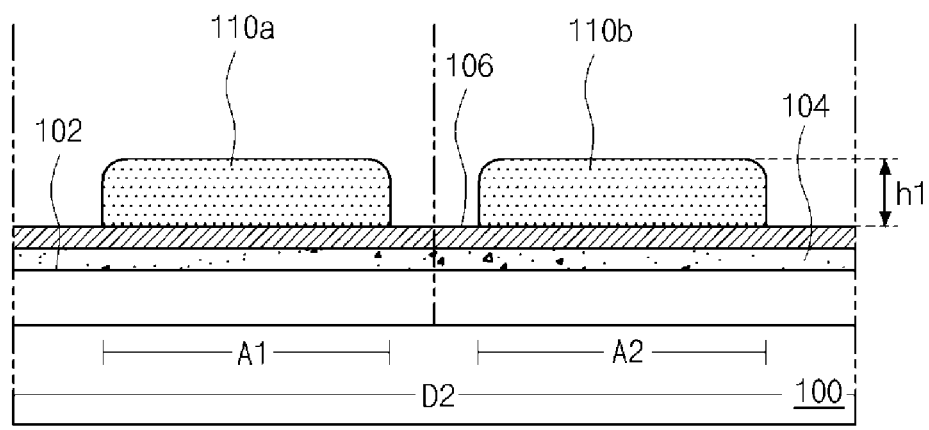
Figure 11C:
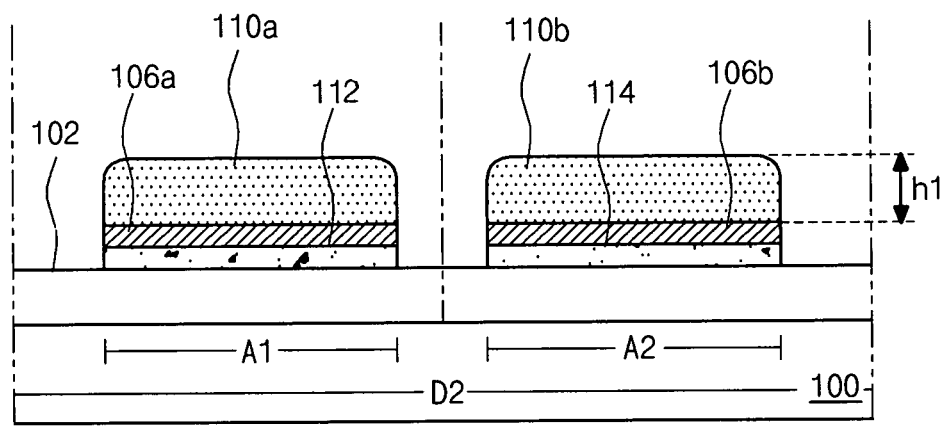
Figure 11D:
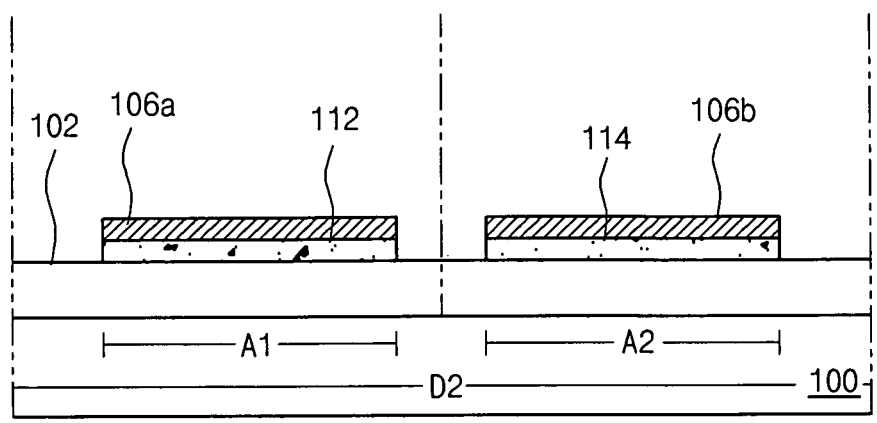
Figure 11E:
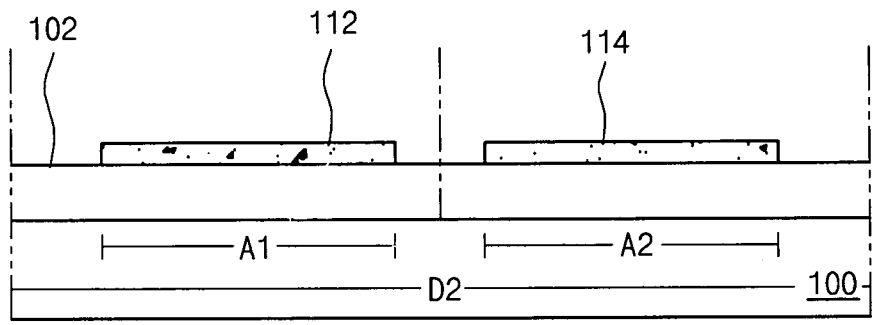
Figure 11F:
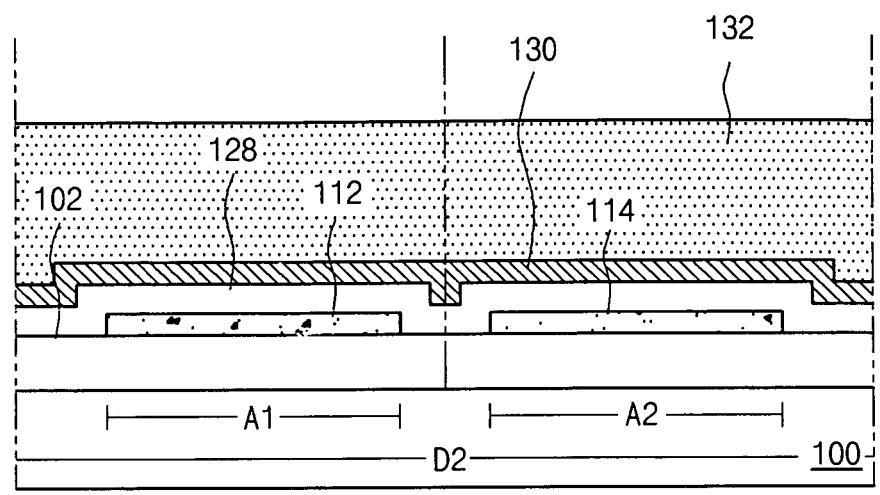
Figure 11G:
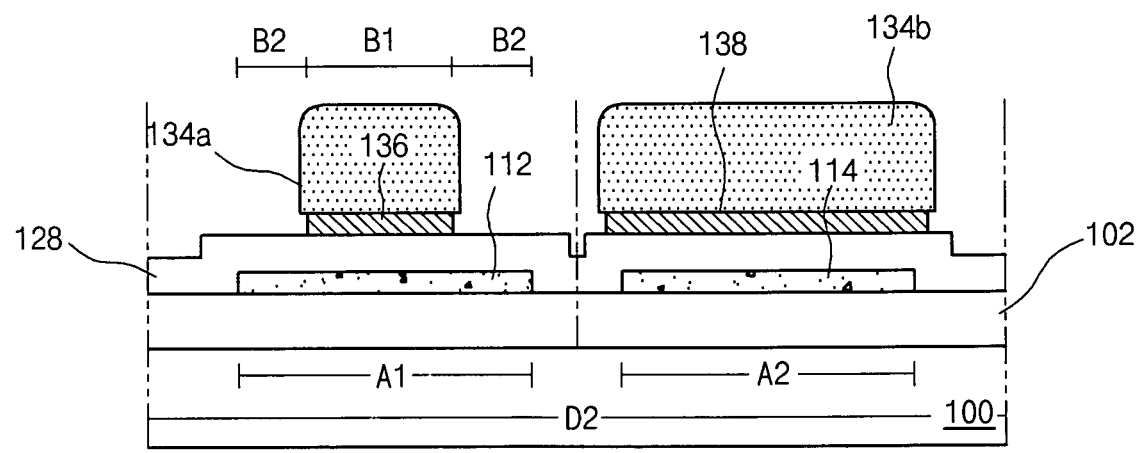
Figure 11H:
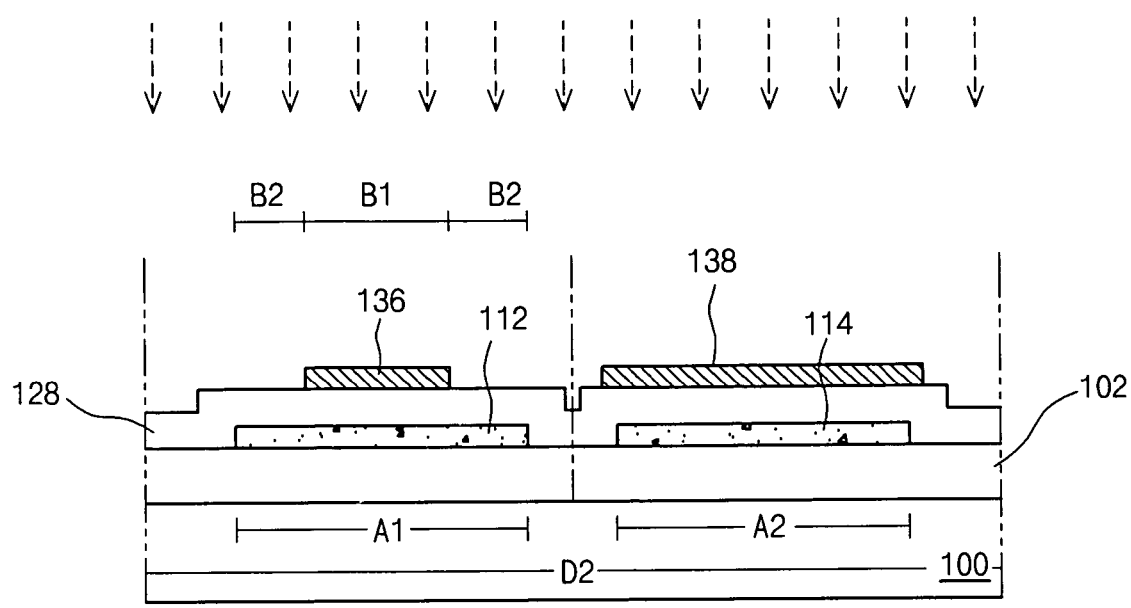
Figure 11I:
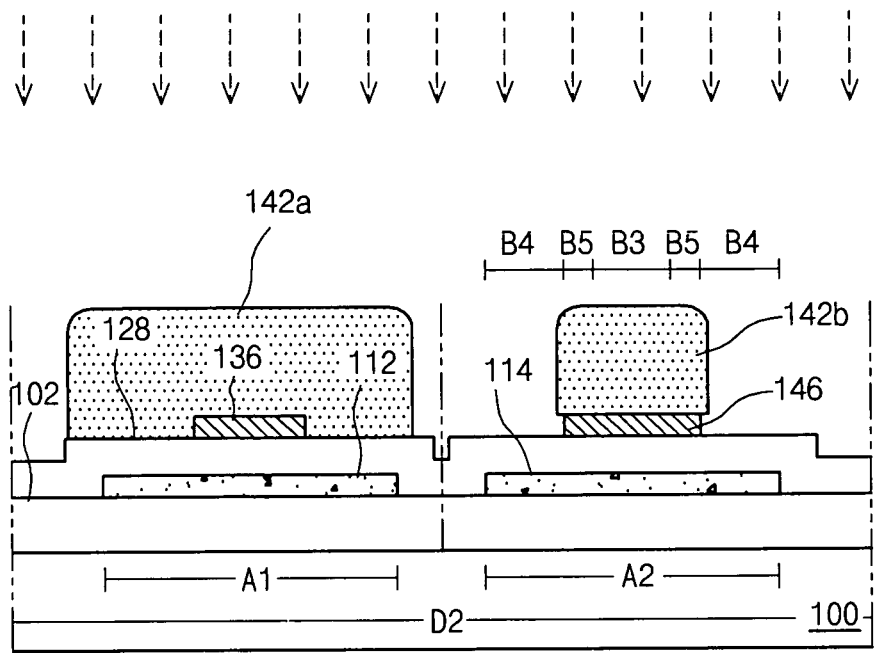
Figure 11J:
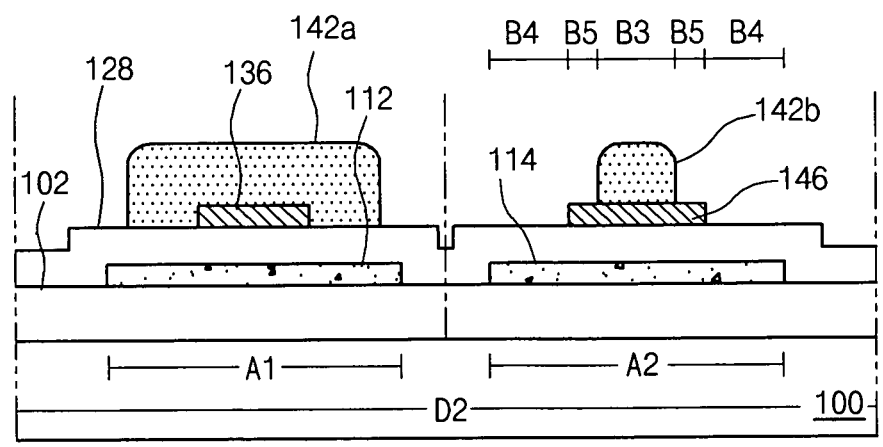
Figure 11K:
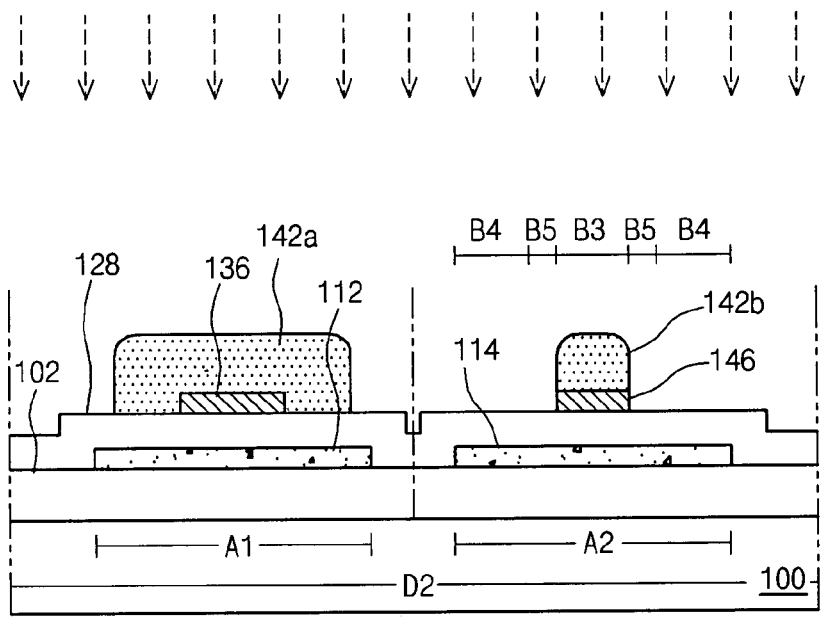
Figure 11L:
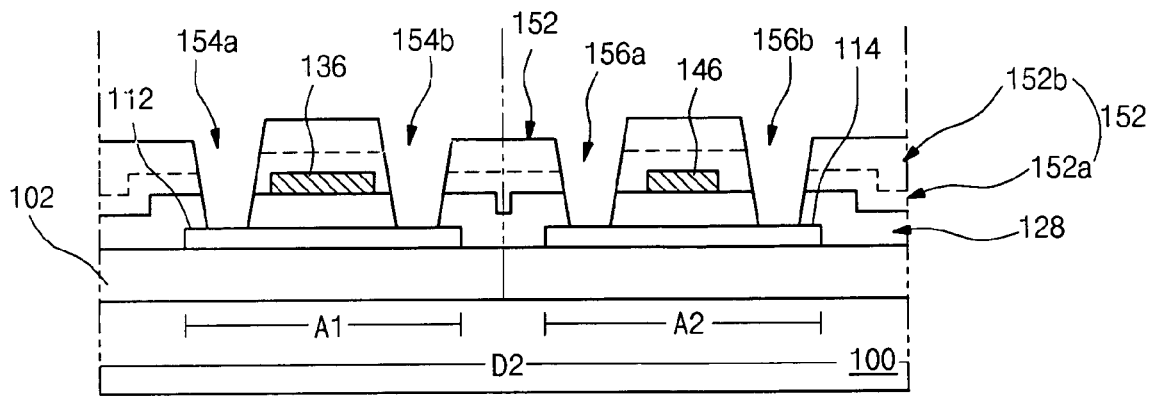
Figure 11M:
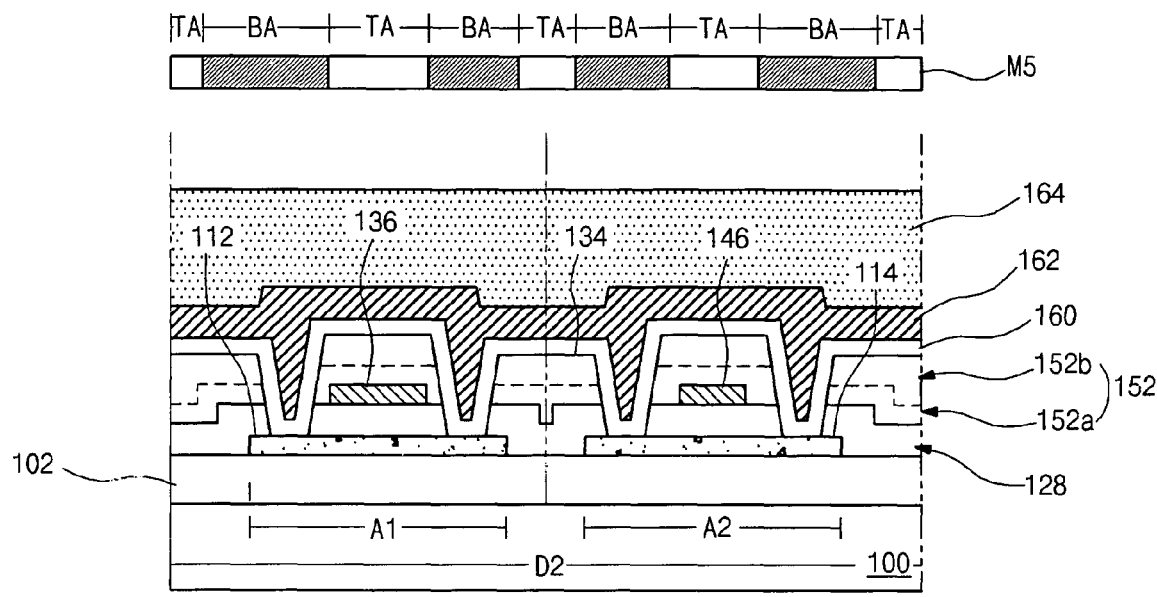
Figure 11N:
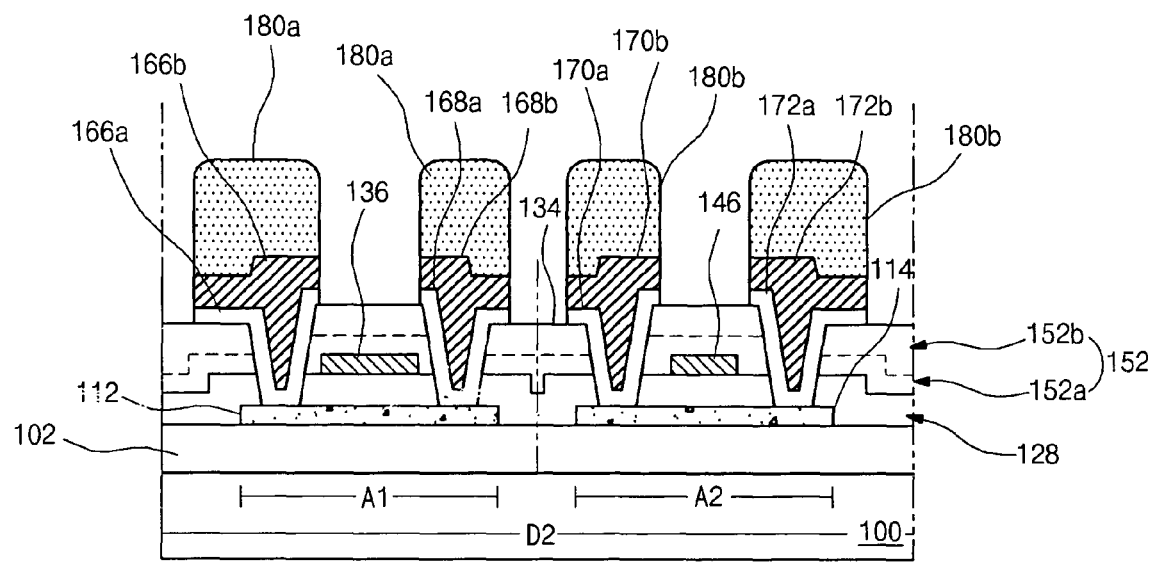
Figure 11O:
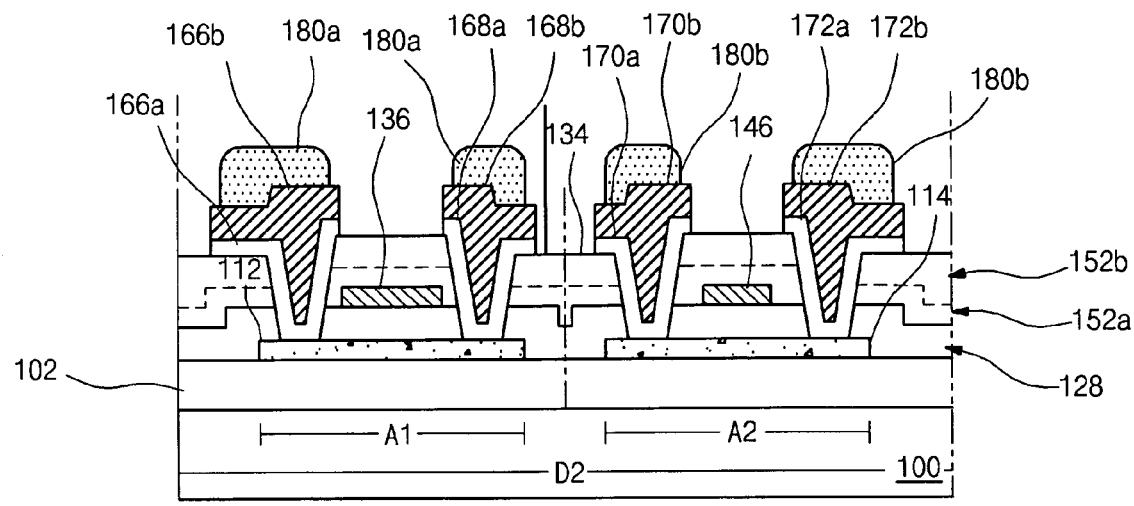
Figure 11P:
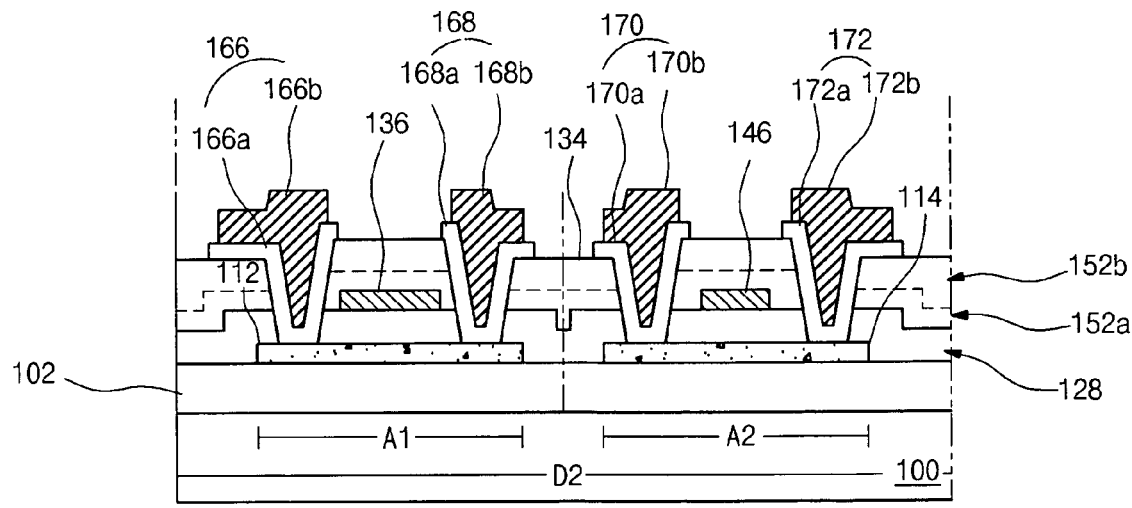
Figure 12A:
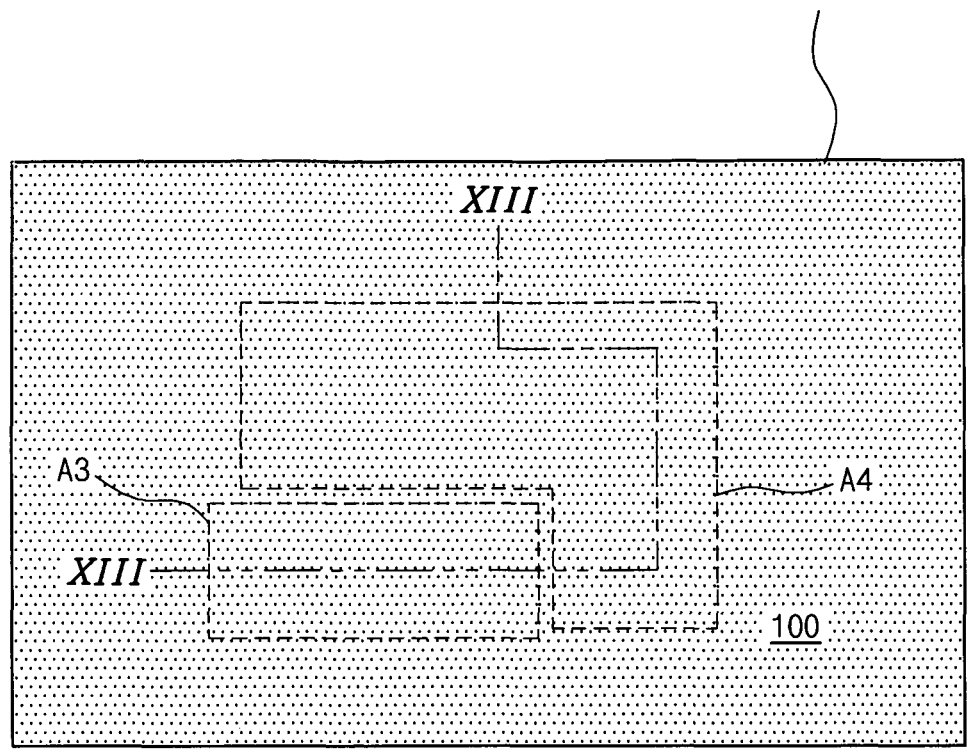
FIGS. 12A to 12P are cross-sectional views showing fabricating processes of a display region of an array substrate according to an exemplary embodiment of the present invention.
Figure 12P:
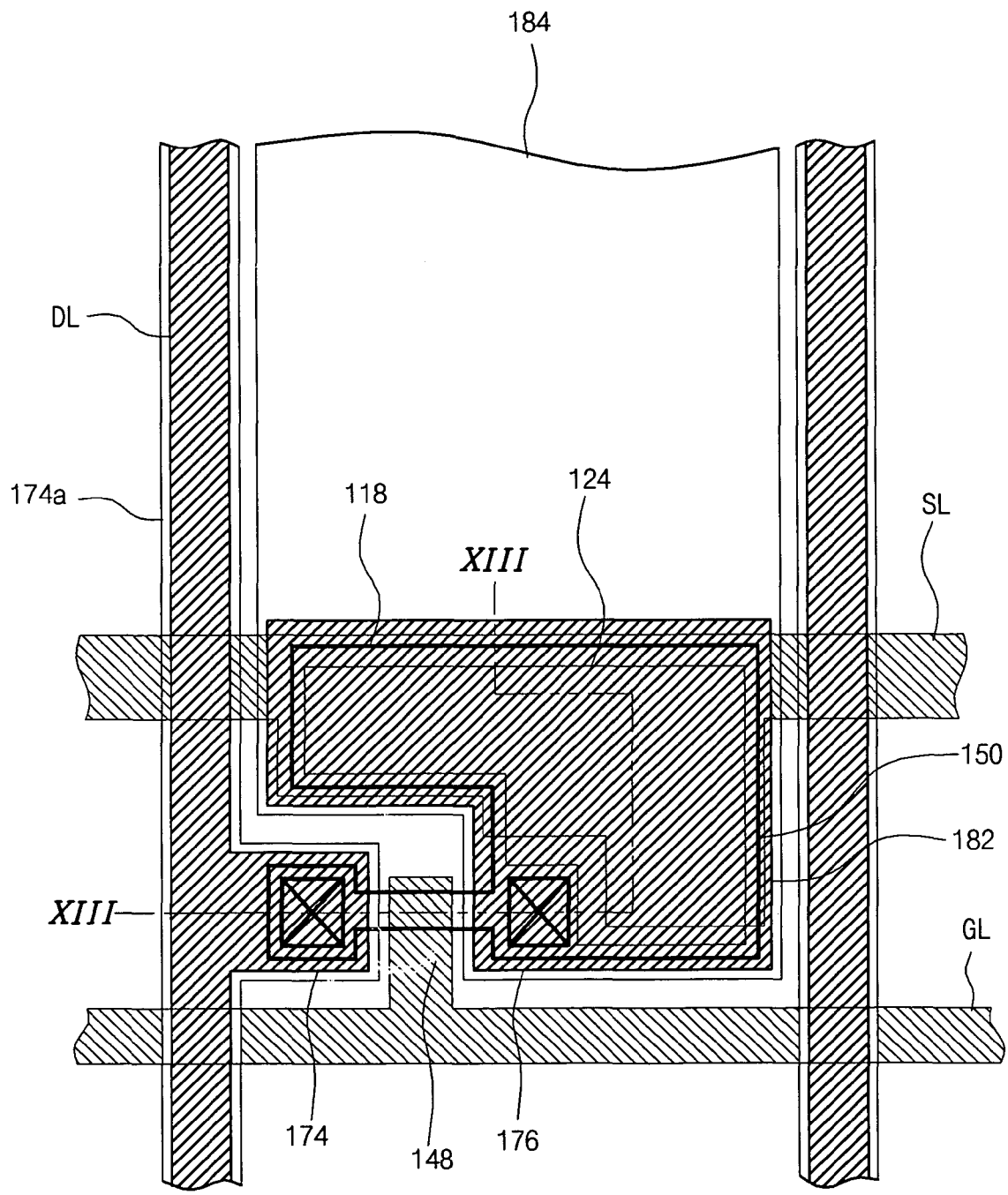
Figure 13A:
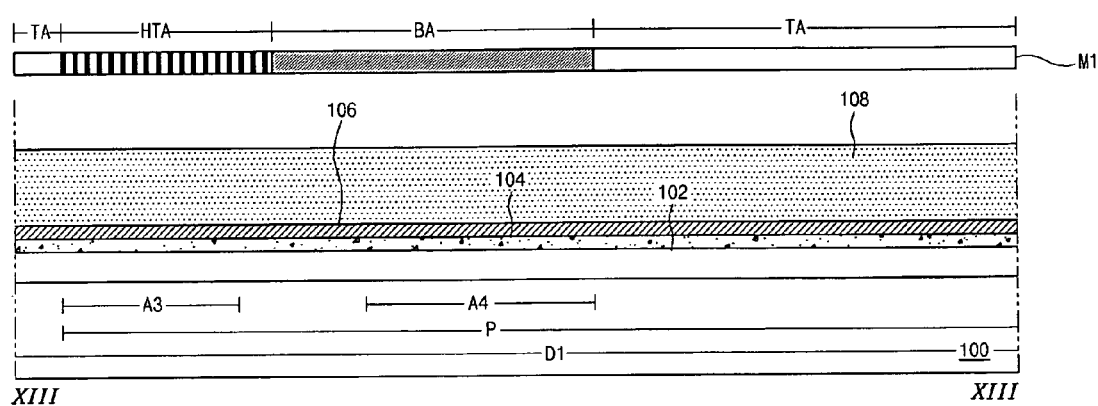
FIGS. 13A to 13P are cross-sectional views showing fabricating processes of a portion taken along the line XIII-XIII of FIGS. 12A to 12P.

FIGS. 11A to 11P are cross-sectional views showing processes of fabricating a driving circuit according to an exemplary embodiment of the present invention. FIGS. 12A to 12P are cross-sectional views showing processes of fabricating a display region of an array substrate according to an exemplary embodiment of the present invention. FIGS. 13A to 13P are cross-sectional views showing processes of fabricating a portion taken along the line XIII-XIII of FIGS. 12A to 12P.

A first mask process will now be described with reference to FIGS. 11A to 11E, FIGS. 12A to 12E, and FIGS. 13A to 13E. As shown in FIG. 11A, FIG. 12A, and FIG. 13A, first and second areas A1 and A2 in the non-display region D2 (FIG. 11A) and third and fourth areas A3 and A4 in the display region D1 (FIG. 13A) are defined on the first substrate 100. The buffer layer 102, a polycrystalline silicon layer 104, and a first metal layer 106 are formed on the first substrate 100. The buffer layer 102 may be formed by depositing an inorganic insulating material, for example. The inorganic insulating material may be one of silicon nitride and silicon oxide. The polycrystalline silicon layer 104 may be formed by depositing an intrinsic amorphous silicon, for example, and crystallizing the intrinsic amorphous silicon into polycrystalline silicon. The first metal layer 106 may be formed by depositing a conductive metal, for example. The conductive metal may be one of tungsten, molybdenum, chrome, and moly-tungsten. Other materials for each of the layers may be used without departing from the scope of the invention.

Then, a first photoresist (PR) layer 108 is formed by coating a photoresist material on the first metal layer 106. A first mask M1 having a transparent area TA, a blocking area BA, and a half-transparent area HTA is disposed over an entire surface of the first PR layer 108. The blocking area BA corresponds to the fourth area A4 and the half-transparent area HTA corresponds to the first, second, and switching areas A1, A2, and A3. The half-transparent area HTA has a transmittance greater than the blocking area BA but less than the transparent area TA.

Figure 12B:
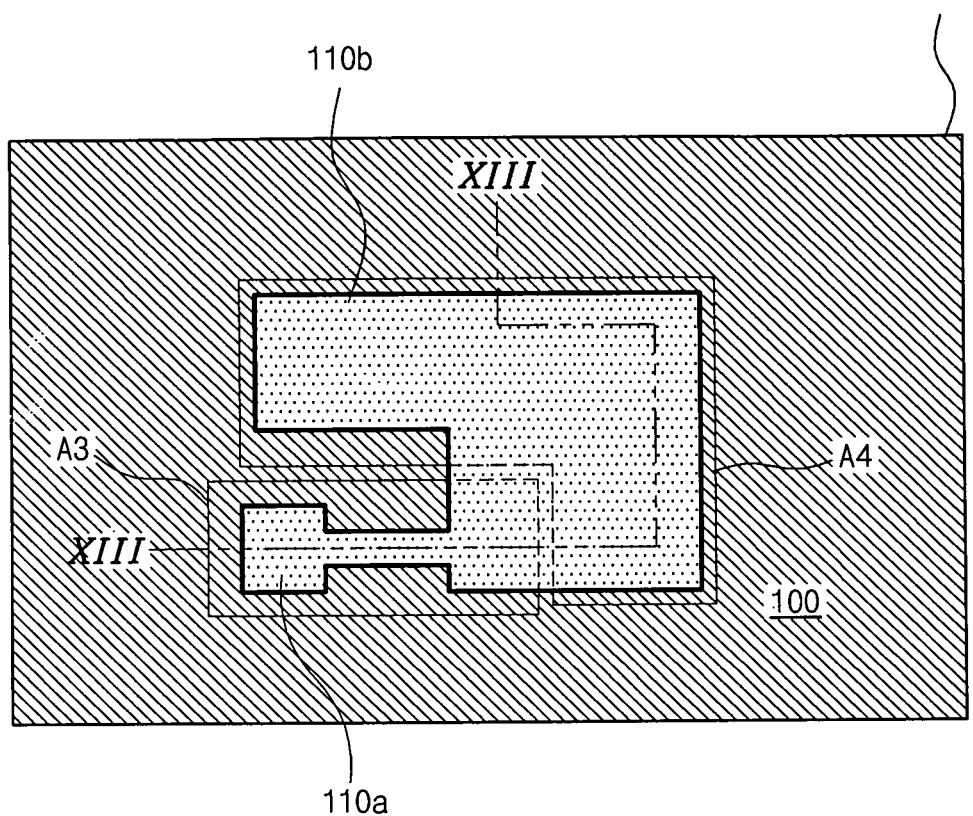
Figure 12C:
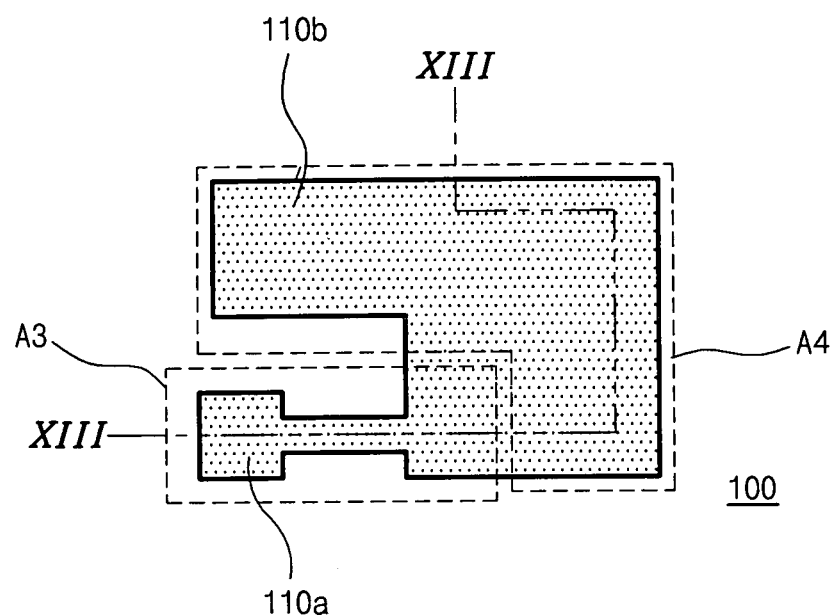
Figure 13B:
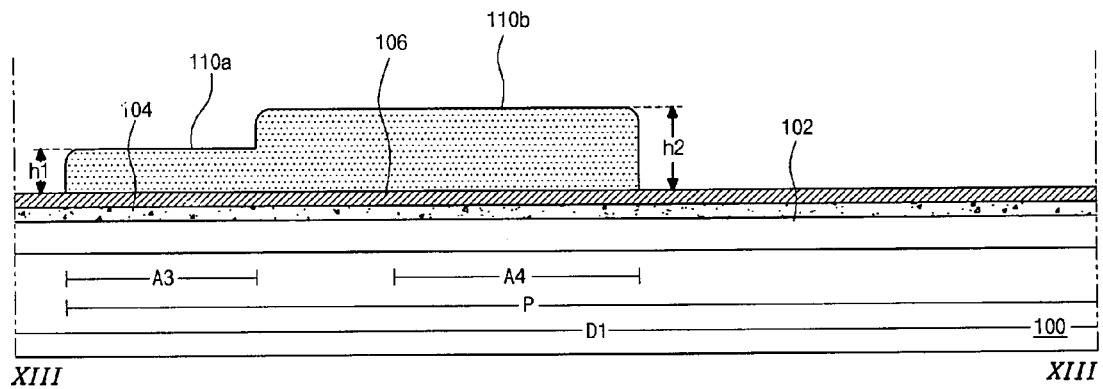

As shown in FIG. 11B, FIG. 12B, and FIG. 13B, a first PR pattern 110a having a first height h1 in the first, second, and third areas A1, A2, and A3 and a second PR pattern 110b having a second height h2 on the fourth area A4 are formed by exposing and developing the first PR layer 108. Since the first PR pattern 110a corresponds to the half-transparent area HTA, and the second PR pattern 110b corresponds to the blocking area BA, the second height h2 is greater than the first height h1. The first PR pattern 110a in the third area A3 and the second PR pattern 110b may be connected. The first metal layer 106 corresponding to the transparent area TA is exposed. Then, the exposed portions of the polycrystalline silicon layer 104 and the first metal layer 106 are removed such that first, second, third, and fourth metal patterns 106a, 106b, 106c, and 106d and the first, second, third, and fourth semiconductor layers 112, 114, 116, and 118 are formed corresponding to the first and second PR patterns 110a and 110b, as shown in FIG. 11C, FIG. 12C, and FIG. 13C.

Figure 13C:
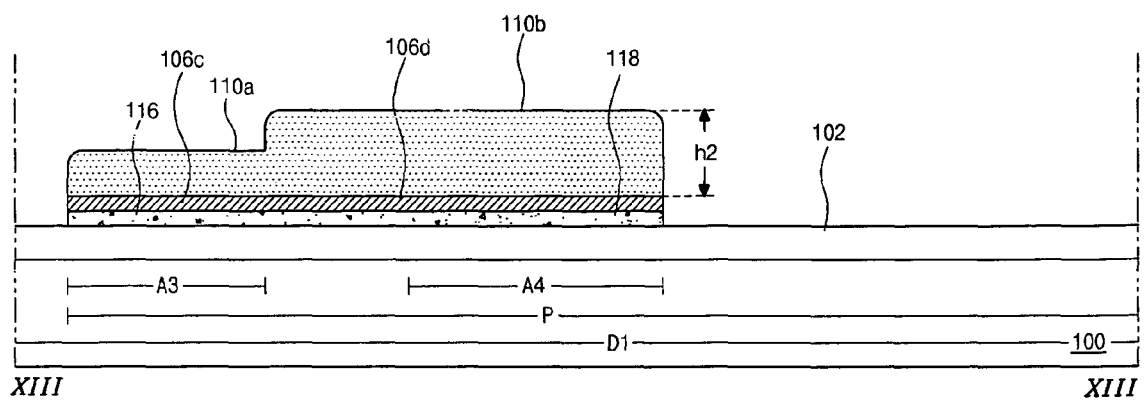

As shown in FIG. 11C, FIG. 12C, and FIG. 13C, the first metal pattern 106a and the first semiconductor layer 112 are disposed in the first area A1, and the second metal pattern 106b and the second semiconductor layer 114 are disposed in the second area A2 (FIG. 11C). The third metal pattern 106c and the third semiconductor layer 116 are disposed in the third area A3, and the fourth metal pattern 106d and the fourth semiconductor layer 118 are disposed in the fourth area A4. The third semiconductor layer 116 and the fourth semiconductor layer 118 as well as the third metal pattern 106c and the fourth metal pattern 106d may be connected, respectively.

Figure 12D:
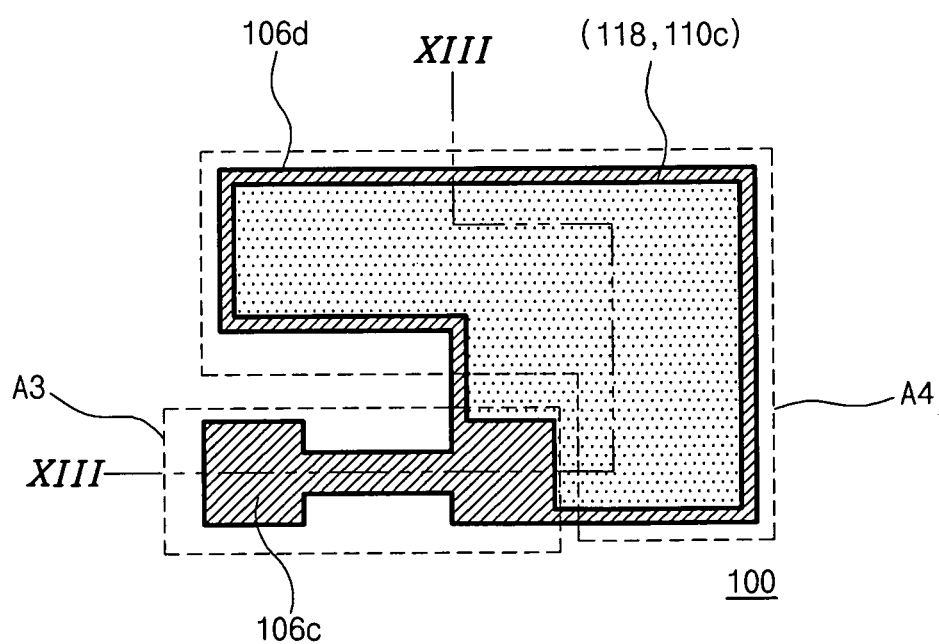
Figure 13D:
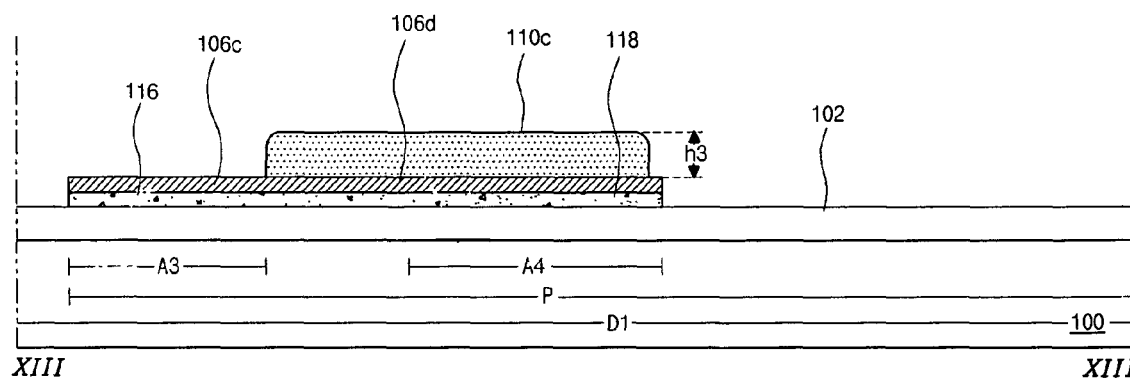

As shown in FIG. 11D, FIG. 12D, and FIG. 13D, a process for ashing the first and second PR patterns 110a, 110b is performed to expose the first, second, and third metal patterns 106a, 106b, and 106c. Because the height of the second PR pattern 110b (h2) is greater than the height of the first PR pattern 110a (h1), a portion of the second PR pattern 110b remains after the first PR pattern 110a is removed from the ashing process to form a third PR pattern 110c. The third PR pattern 110c has a smaller height (h3) than the second height h2.

Figure 12E:
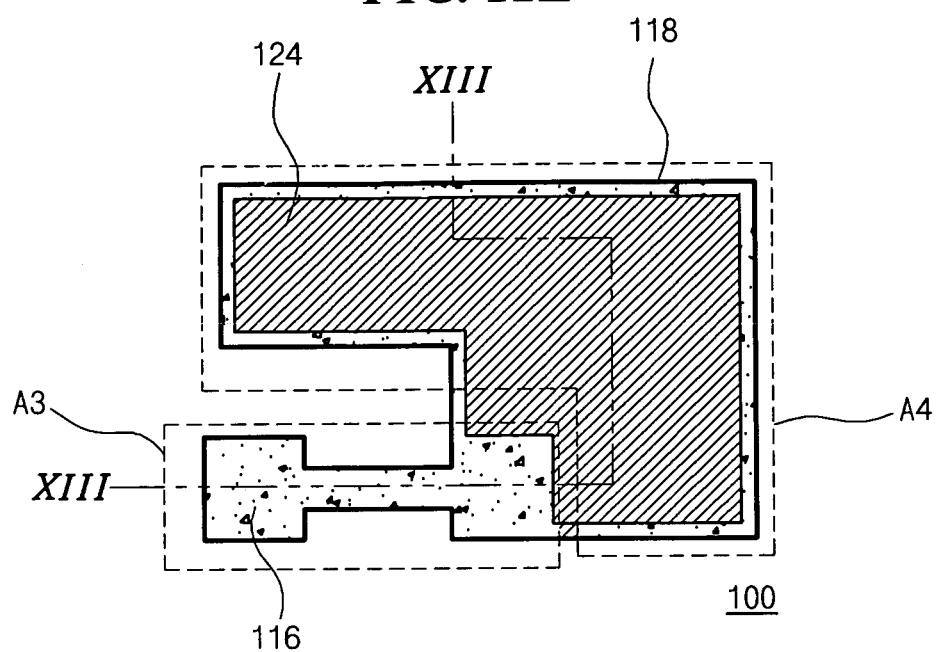
Figure 13E:
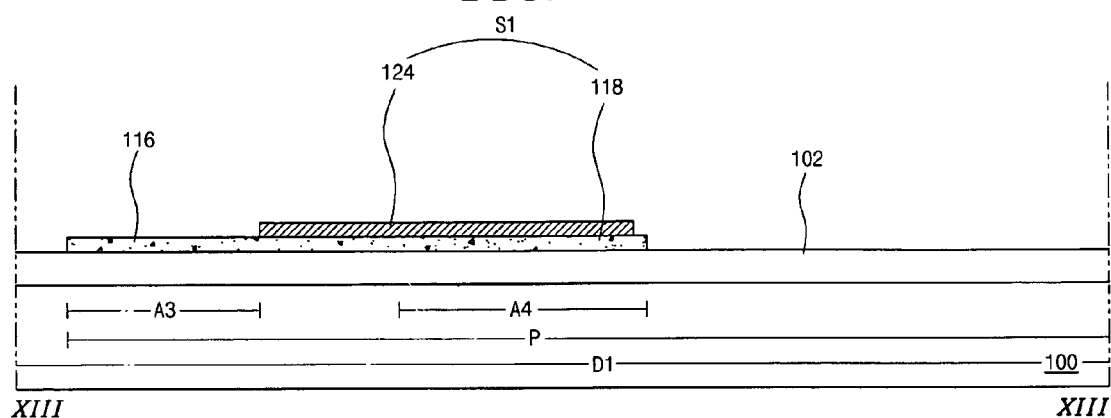

As shown in FIG. 11E, FIG. 12E, and FIG. 13E, the counter electrode 124 is formed on the fourth semiconductor layer 118 in the fourth area A4 while the first, second, and third semiconductor layers 112, 114, and 116 are exposed by an etching process that removes the first, second, and third metal patterns 106a, 106b and 106c and the third PR pattern 110c. The first, second, third, and fourth semiconductor layers 112, 114, 116, and 118 and the counter electrode 124 are formed by the above-mentioned first mask process. The fourth semiconductor layer 118 and the counter electrode 124 on the fourth semiconductor layer 118 function as the first storage electrode S1. Accordingly, a process of doping the fourth semiconductor layer 118 with impurities is omitted by forming the counter electrode 124 on the fourth semiconductor layer 118.

Figure 12F:
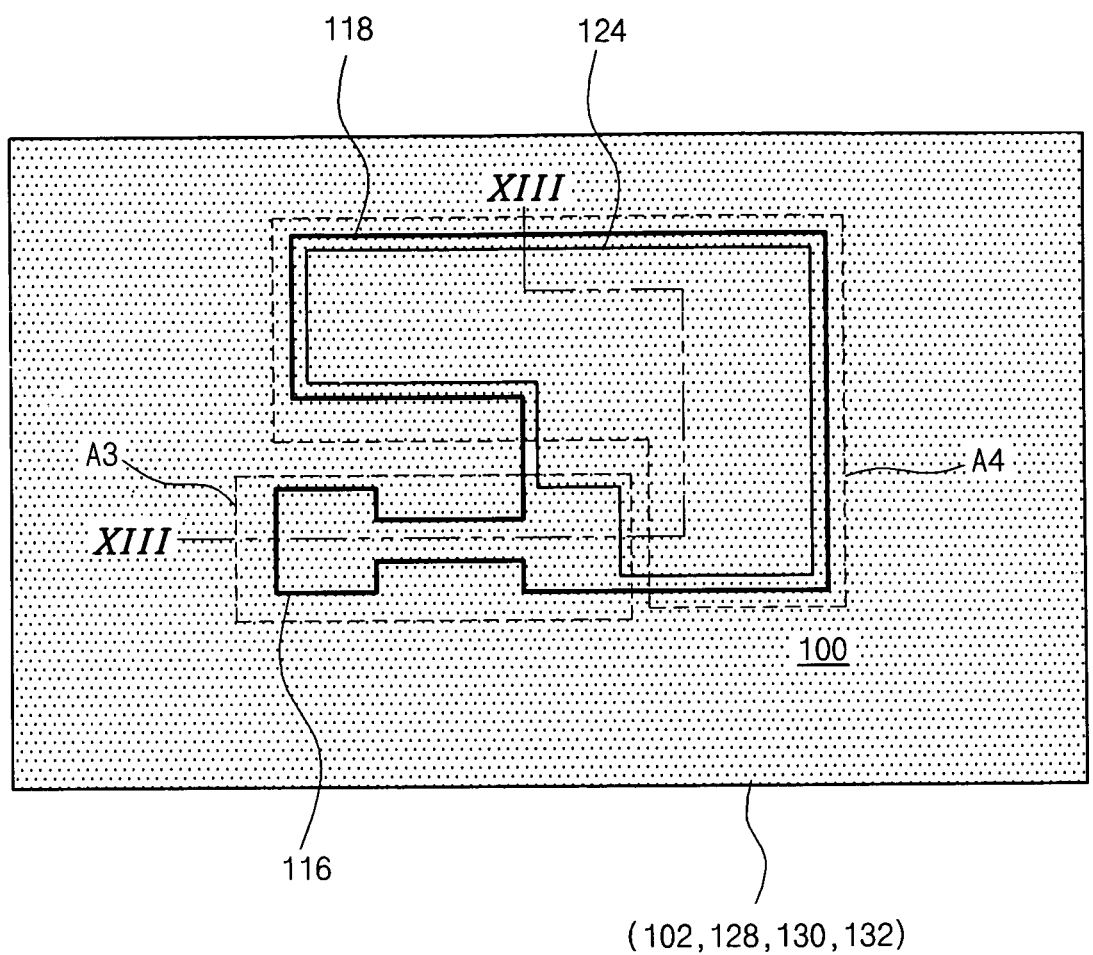

A second mask process is described with reference to FIGS. 11F and 11G, FIGS. 12F and 12G, and FIGS. 13F and 13G. As shown in FIG. 11F, FIG. 12F, and FIG. 13F, the gate insulating layer 128, a second metal layer 130, and a second PR layer 132 is sequentially formed on the first, second, third, semiconductor layers 112, 114, and 116 and the counter electrode 124. Then, the second PR layer 132 is exposed and developed to form a fourth PR pattern 134a in the first area A1, a fifth PR pattern 134b in the second area A2, and a sixth PR pattern 134c in the third and fourth areas A3 and A4 using a second mask (not shown), as shown in FIG. 11G, FIG. 12G, and FIG. 13G.

Figure 12G:
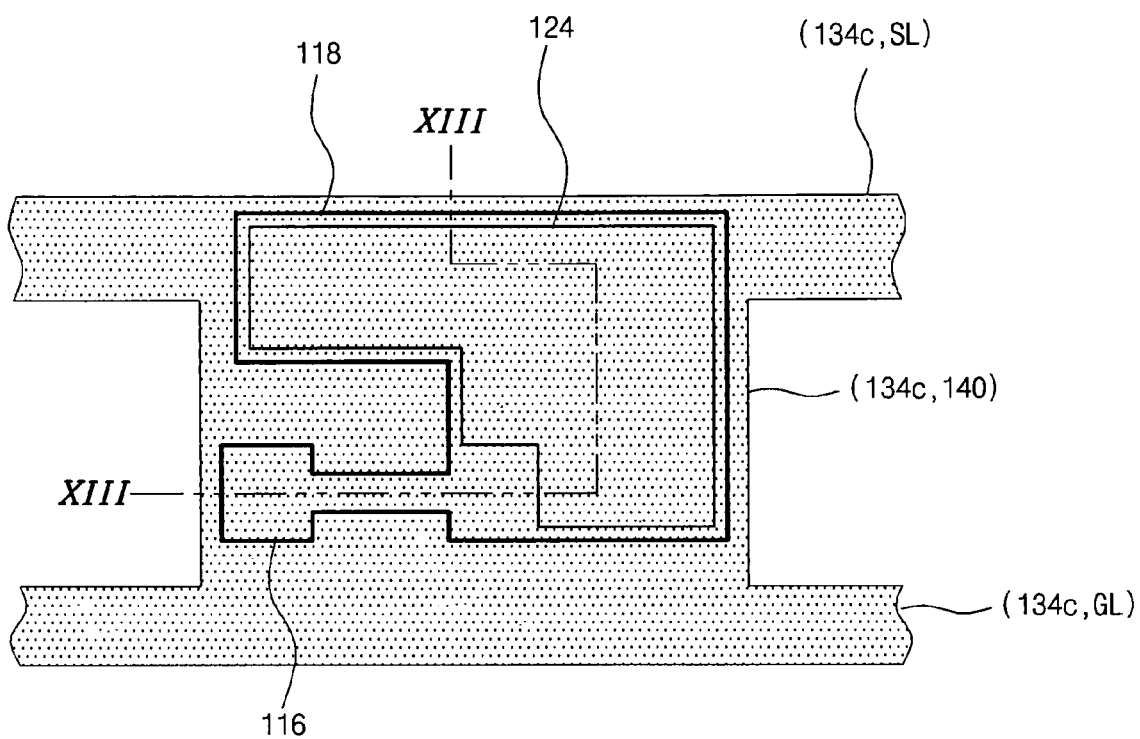
Figure 13F:
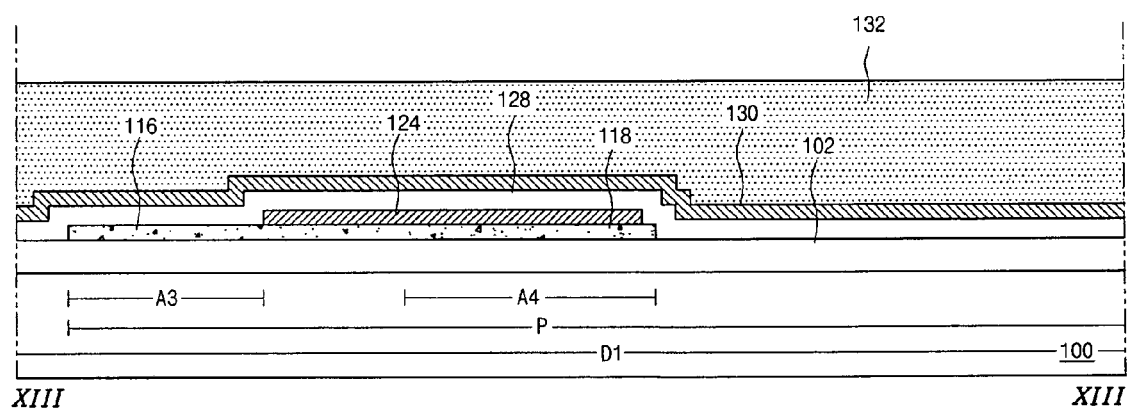
Figure 13G:
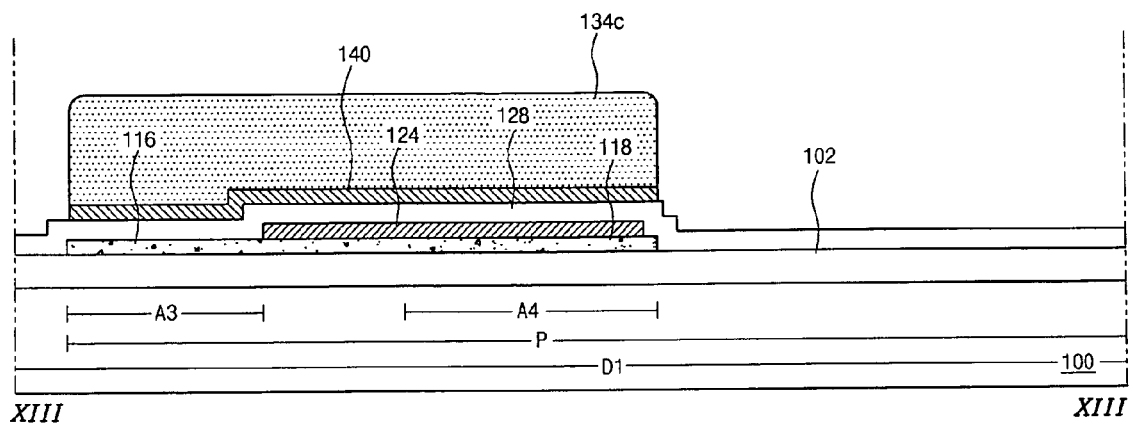

As shown in FIG. 11G, FIG. 12G, and FIG. 13G, the fourth PR pattern 134a corresponds to a center of the first semiconductor layer 112 and has a smaller size than the first semiconductor layer 112. The fifth PR pattern 134b corresponds to a center of the second semiconductor layer 114 and has substantially the same size as the second semiconductor layer 114. The sixth PR pattern 134c corresponds to the third and fourth semiconductor layers 116 and 118 and has substantially the same size as an entire size of the third and fourth semiconductor layers 116 and 118. Then, the first gate electrode 136 over the first semiconductor layer 112, a fourth metal pattern 138 over the second semiconductor layer 114, and a fifth metal pattern 140 are formed by removing the second metal layer 130 (FIG. 11F, FIG. 12F, and FIG. 13F) exposed through portions between the fourth, fifth, and sixth PR patterns 134a, 134b, and 134c. At the same time, the gate line GL connected to one end of the fifth metal pattern 140 and the storage line SL connected to another end of the fifth metal pattern 140 are formed on the gate insulating layer 128 (FIG. 12G). When the first semiconductor layer 112 includes a first active region B1 and a second active region B2 at ends of the first active region B1, the first gate electrode 136 corresponds to the first active region B1. Then, the fourth, fifth, and sixth PR patterns 134a, 134b, and 134c are removed.

Figure 12H:
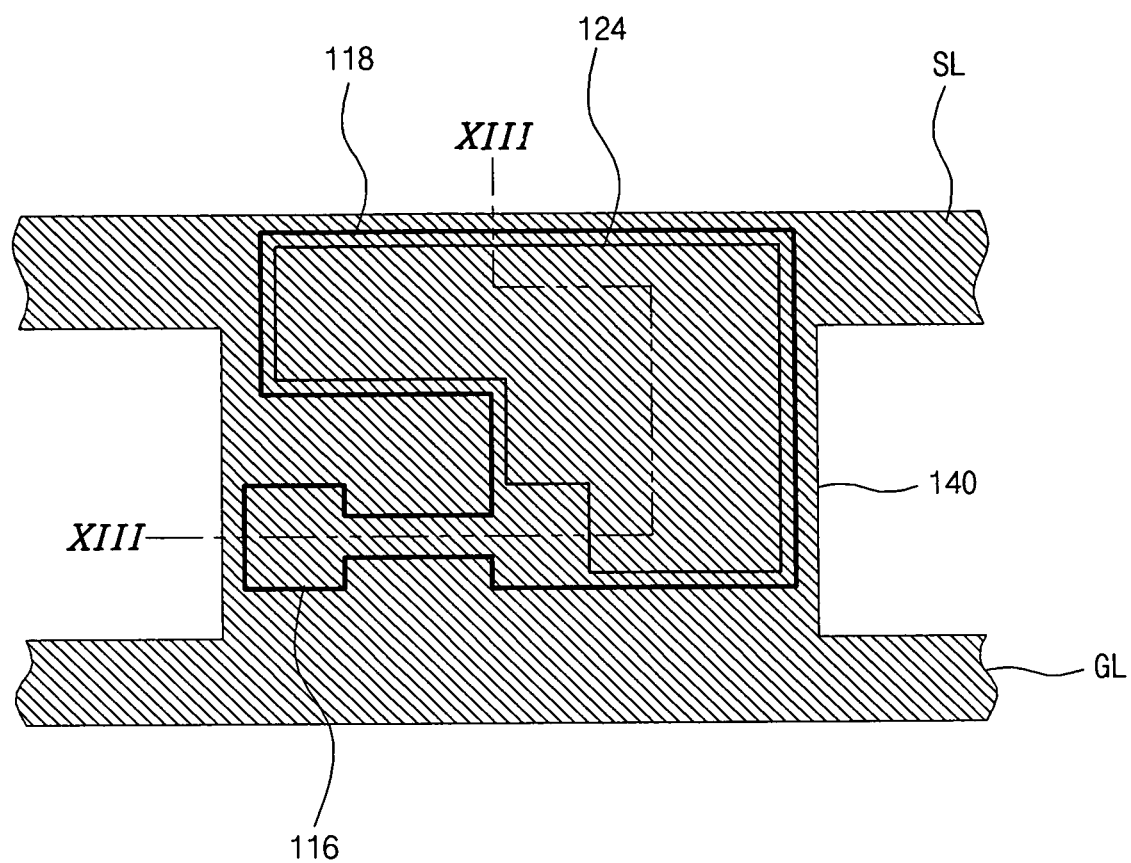
Figure 13H:
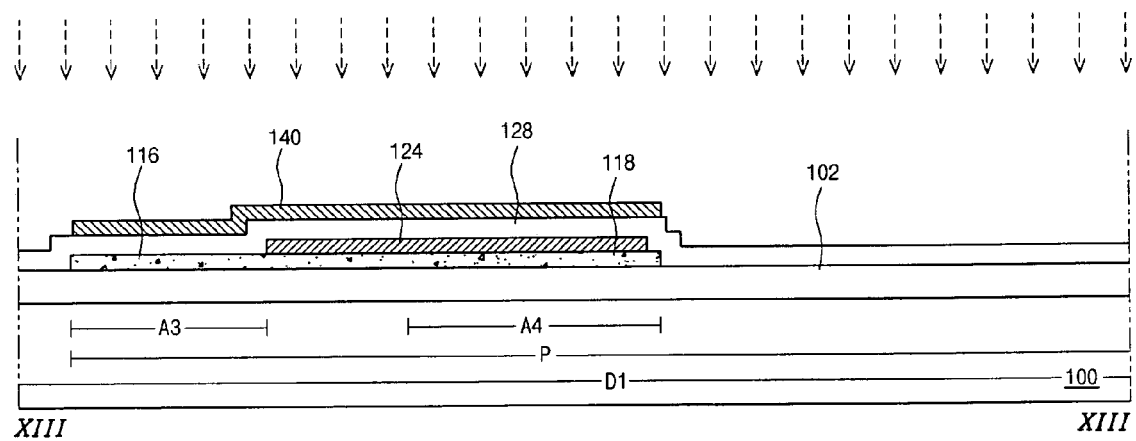
Figure 13I:
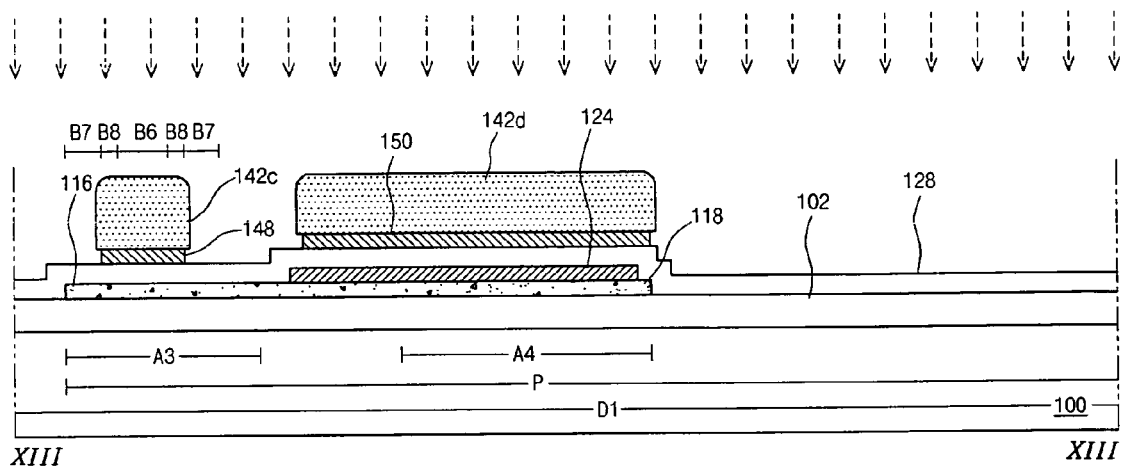
Figure 13J:
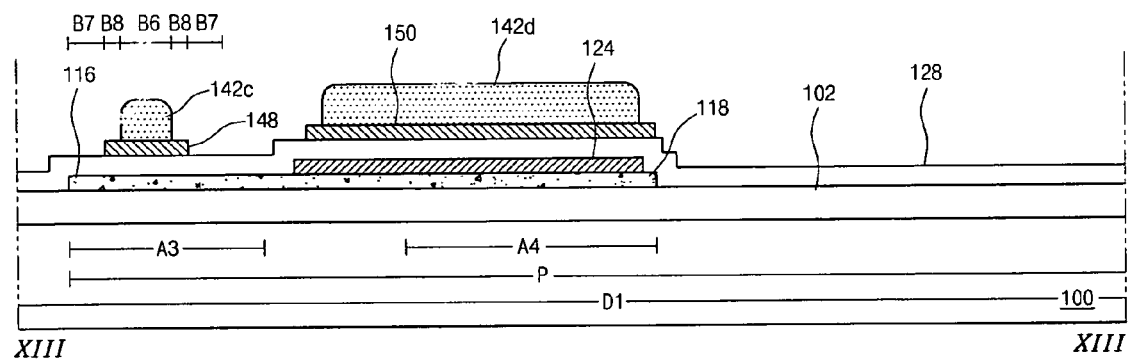

A process of doping the first semiconductor layer with impurities will now be described with reference to FIG. 11H, FIG. 12H, and FIG. 13H. As shown in FIG. 11H, FIG. 12H, and FIG. 13H, the second active region B2 of the first semiconductor layer 112 is doped with high concentration p-type impurities using the first gate electrode 136 and the fourth and fifth metal patterns 138 and 140 as a doping mask. The second active region B2 serves as an ohmic contact.

Figure 12I:
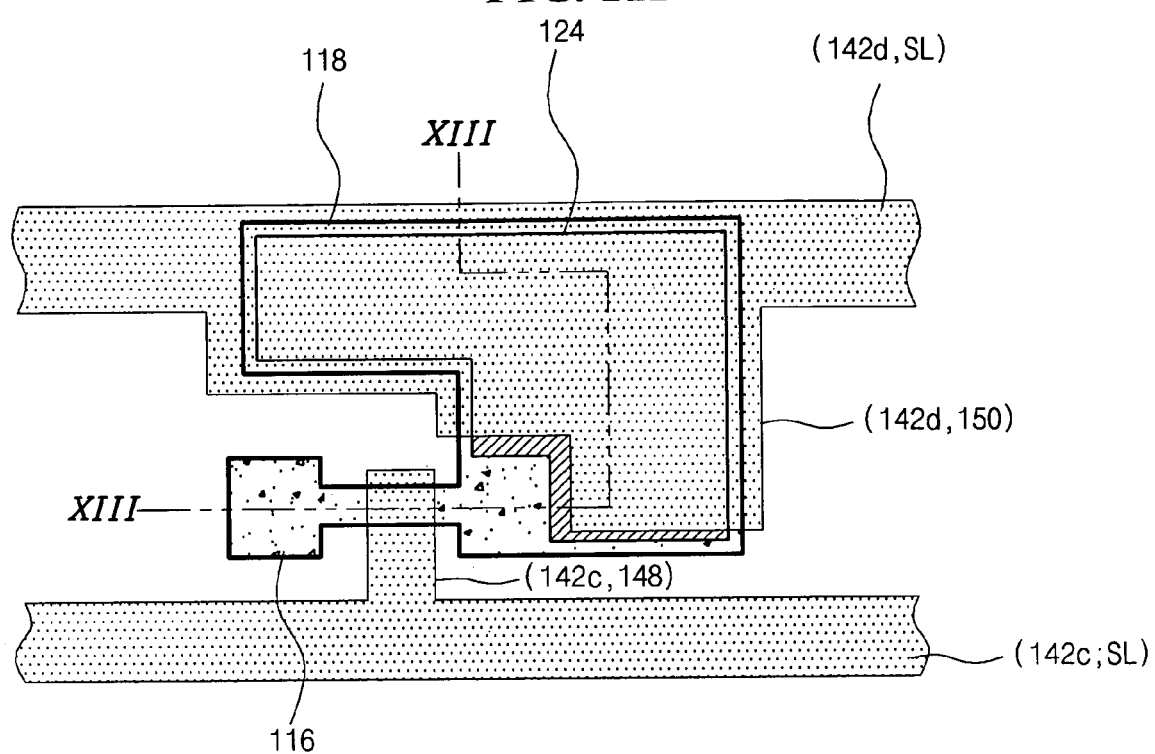
Figure 12J:
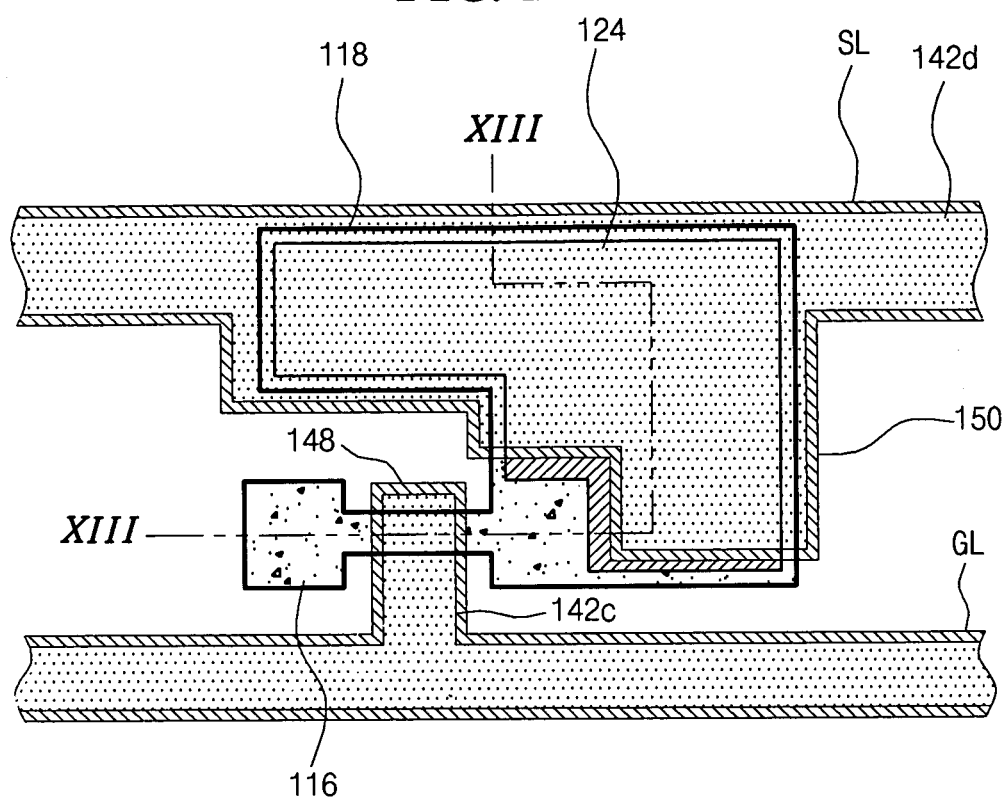

A third mask process will now be described with reference to FIGS. 11I to 11K, FIGS. 12I to 12K, and FIGS. 13I to 13K. As shown in FIG. 11I, FIG. 12I and FIG. 13I, a seventh PR pattern 142a on the first gate electrode 136, an eighth PR pattern 142b on the fourth metal pattern 138, a ninth PR pattern 142c and a tenth PR pattern 142d on the fifth metal pattern 140 are formed by coating and patterning a third PR layer (not shown) using a third mask (not shown). The seventh PR pattern 142a substantially covers the first gate electrode 136 and the first semiconductor layer 112. The eighth PR pattern 142b corresponding to the fourth metal pattern 138 exposes ends of the fourth metal pattern 138. The ninth PR pattern 142c corresponding to the third region A3 exposes portions of the fifth metal pattern 140 in the third area A3. The tenth PR pattern 142d spaced apart from the ninth PR pattern 142c substantially covers the fifth metal pattern 140 in the fourth area A4. Then, the second gate electrode 146 is formed in the second area A2 by etching the fourth metal pattern 138 using the eighth PR pattern 142b as a mask. The third gate electrode 148 is formed in the third area A3 by etching the fifth metal pattern 140 in the third area A3 using the ninth PR pattern 142c as a mask. In forming the third gate electrode 148, the second storage electrode 150 is formed in the fourth area A4 using the tenth PR pattern 142d as a mask. The third gate electrode 148 and the second storage electrode 150 protrude from the gate line GL and the storage line SL, respectively (FIG. 12I).

When the second semiconductor layer 114 includes a third active region B3, a fourth active region B4, and a fifth active region B5, the second gate electrode 146 corresponds to the third and fifth active regions B3 and B5. The fifth active region B5 is disposed at the sides of the third active region B3, and the fourth active region B4 is disposed at the outer sides of the fifth active region B5. Similarly, when the third semiconductor layer 116 includes a sixth active region B6, a seventh active region B7, and an eighth active region B8, the third gate electrode 148 corresponds to the sixth and eighth active regions B6 and B8. The eighth active region B8 is disposed at the sides of the sixth active region B6, and the seventh active region B7 is disposed at the outer sides of eighth active region B8.

Next, the fourth active region B4 of the second semiconductor layer 114 and the seventh active region B7 are doped with high concentration n-type impurities using the seventh, eighth, ninth, and tenth PR patterns 142a, 142b, 142c, and 142d as a doping mask. The fourth active region B4 and the seventh active region B7 serves as an ohmic contact. At this time, since ends of the fourth semiconductor layer 118 is not covered with the counter electrode 124, the ends of the fourth semiconductor layer 118 are doped with the high concentration n-type impurities.

A process for forming a lightly doped drain (LDD) region in the second and third semiconductor layer will now be described with reference to FIGS. 11J and 11K, FIGS. 12J and 12K and FIGS. 13J and 13K. As shown in FIG. 11J, FIG. 12J, and FIG. 13J, a process of ashing the seventh, eighth, ninth, and tenth PR patterns 142a, 142b, 142c, and 142d is performed to expose ends of the second gate electrode 146 and ends of the third gate electrode 148. The ends of the second gate electrode 146 correspond to the fifth active region B5 of the second semiconductor layer 114, and the ends of the third gate electrode 148 correspond to the eighth active region B8. At the same time, ends of the second storage electrode 150 are exposed. Also, the gate line and the storage line SL are partially exposed. Then, the ends of second gate electrode 146, the ends of the third gate electrode 148, and the ends of the second storage electrode 150 are removed, as shown in FIG. 11K, FIG. 12K, and FIG. 13K.

Figure 12K:
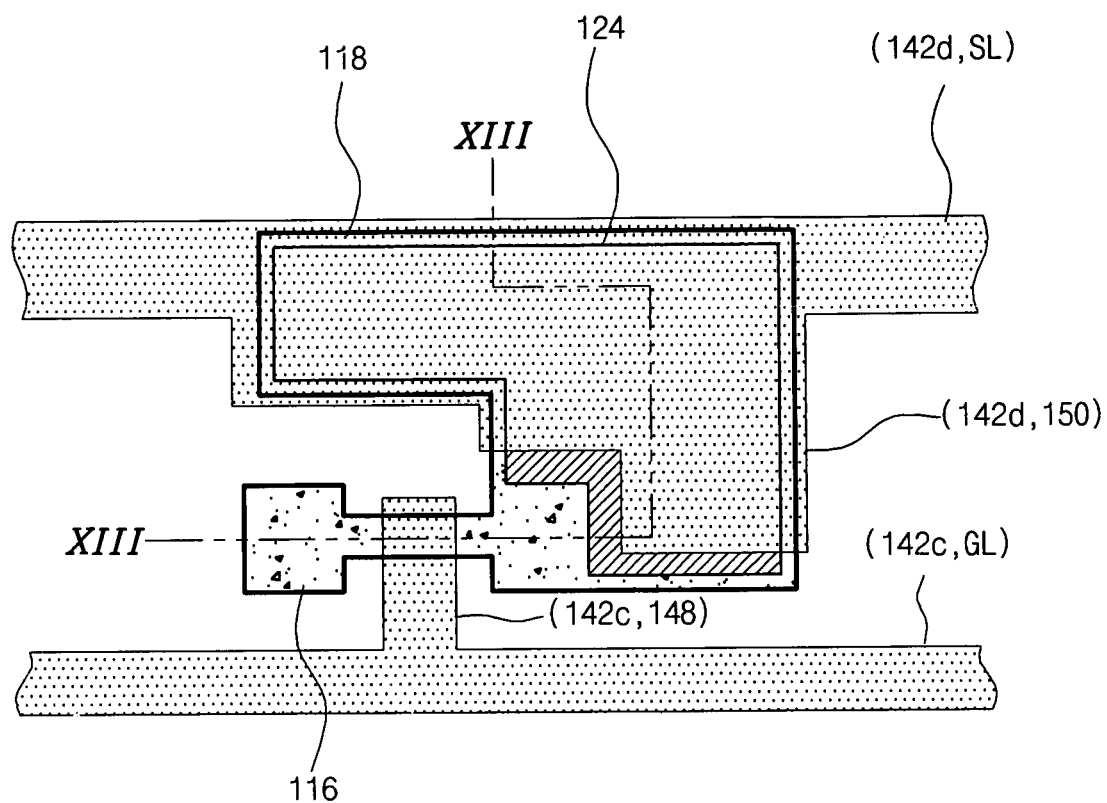
Figure 13K:
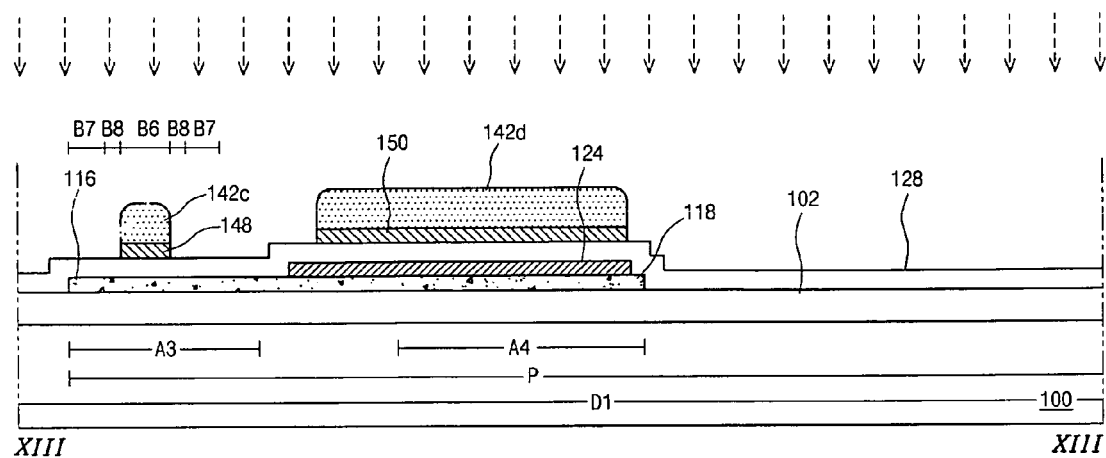

As shown in FIG. 11K, FIG. 12K, and FIG. 13K, the fifth active region B5 and the eighth active region B8 are doped with low concentration n-type impurities using the seventh, eighth, ninth, and tenth PR patterns 142a, 142b, 142c, and 142d and the counter electrode 124 as a doping mask such that the fifth active region B5 and the eight active region B8 are defined as the LDD region, respectively. The LDD region minimizes a leakage current from the semiconductor layers. Then, the seventh, eighth, ninth, and tenth PR patterns 142a, 142b, 142c, and 142d are removed. Ohmic contact regions, which are doped with high concentration n-type impurities in the first, second, and third semiconductor layers 112, 114, and 116, the LDD regions, which are doped with low concentration n-type impurities in the second and third semiconductor layers 114 and 116, the first gate electrode 118 over the first semiconductor layer 112, the second gate electrode 146 over the second semiconductor layer 114, the third gate electrode 148 over the third semiconductor layer 116, and the second storage electrode over the counter electrode 124 are formed in the first substrate 100 by the above-mentioned second and third mask processes.

Figure 12L:
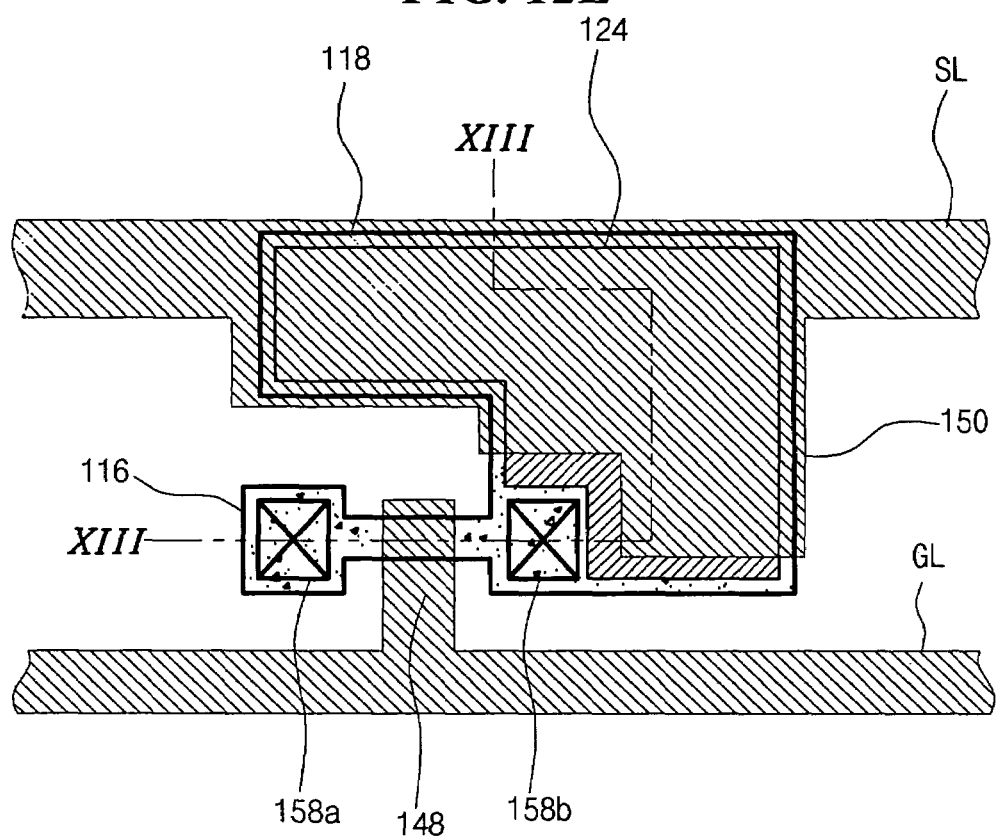
Figure 13L:
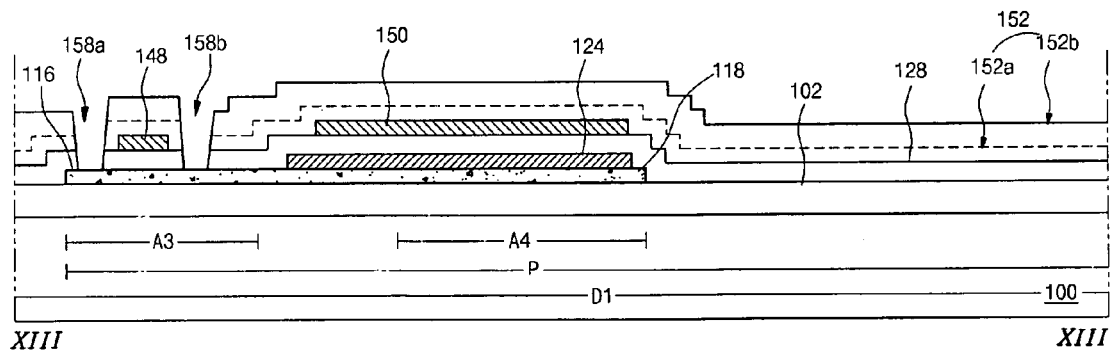
Figure 13M:
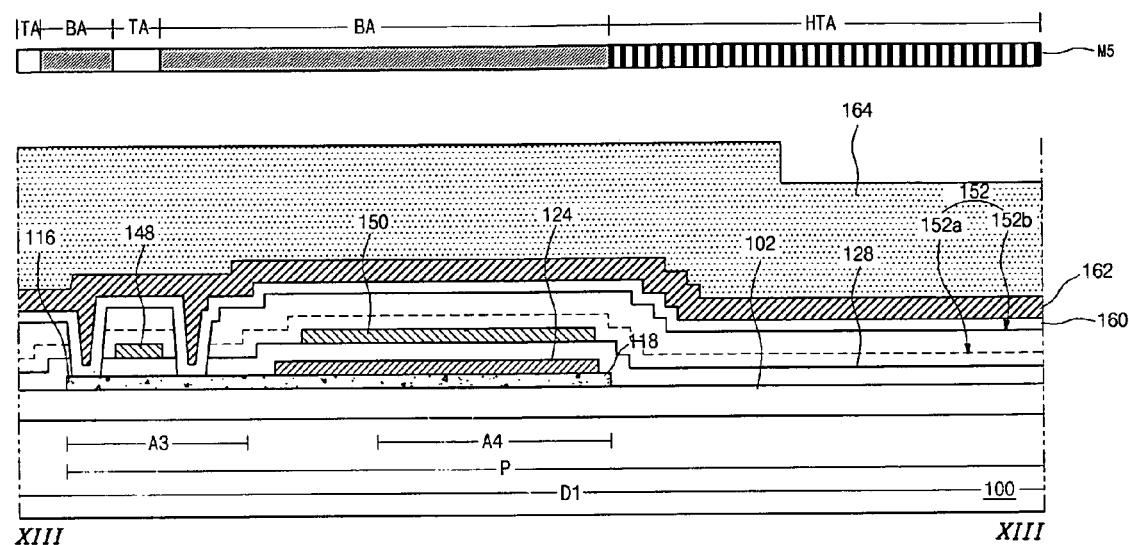

A fourth mask process will now be described with reference to FIG. 11L, FIG. 12L, and FIG. 13L. As shown in FIG. 11L, FIG. 12L, and FIG. 13L, the interlayer insulating layer 152 including the first and second interlayer insulating layers 152a and 152b is formed on the first, second, and third gate electrodes 136, 146, and 148 and the second storage electrode 150 by sequentially depositing and patterning silicon oxide and silicon nitride using a fourth mask (not shown). In other words, the first interlayer insulating layer 152a is made of silicon oxide, and the second interlayer insulating layer 152b is made of silicon nitride. The interlayer insulating layer 152 includes seventh, eighth, ninth, tenth, eleventh, and twelfth contact holes 154a, 154b, 156a, 156b, 158a, and 158b. The seventh and eighth contact holes 154a and 154b expose the second active region (B2 of FIG. 11G) of the first semiconductor layer 112, the ninth and tenth contact holes 156a and 156b expose the fourth active region (B4 of FIG. 11K) of second semiconductor layer 114, and the eleventh and twelfth contact holes 158a and 158b expose the seventh active layer (B7 of FIG. 13K) of the third conductor layer 116. A heating process of the first substrate 100 is performed after forming the first interlayer insulating layer 152a. The high concentration n-type impurities doped into the ends of the fourth semiconductor layer 118 are diffused into the counter electrode 124 by the above-mentioned heating process. Accordingly, the counter electrode 124 and the fourth semiconductor layer 118 have characteristic of ohmic contact such that same signals can be applied to the counter electrode 124 and the fourth semiconductor layer 118. Also, a process of hydrogenation heating is performed on the first substrate 100 after forming the second interlayer insulating layer 152b. Since the fourth semiconductor layer 118 and the third semiconductor layer 116 may be connected, the interlayer insulating layer according to another exemplary embodiment of present invention may include a thirteenth contact hole (not shown) exposing an end of the fourth semiconductor layer 118 or the counter electrode 124 instead of the twelfth contact hole 158b.

A fifth mask process will now be described with reference to FIGS. 11M to 11P, FIGS. 12M to 12P, and FIGS. 13M to 13P. As shown in FIG. 11M, FIG. 12M, and FIG. 13M, a transparent electrode layer 160, a conductive metal layer 162, and a fourth PR layer 164 are formed on the interlayer insulating layer 152. The transparent electrode layer 160 is formed by depositing a transparent conductive material, such as ITO and IZO. The conductive metal layer 162 is formed by depositing a conductive material, such as chrome, molybdenum, tungsten, copper, and aluminum alloy. The conductive metal layer 162 may be opaque. The fourth PR layer 164 may be a positive type photoresist. A fifth mask M5 having the transparent area TA, the half-transparent area HTA, and the blocking area BA is disposed over the fourth PR layer 164. The blocking area BA corresponds to the seventh, eighth, ninth, tenth, eleventh, and twelfth contact holes 154a, 154b, 156a, 156b, 158a, and 158b and the fourth area A4. The blocking area BA has six-sub blocking areas of which five-sub blocking areas correspond to the seventh, eighth, ninth, and tenth contact holes (154a, 154b, 156a, 156b of FIG. 11L) and the eleventh contact hole (158a of FIG. 13L). The other sub-blocking area corresponds to the twelfth contact hole (158b of FIG. 13L) and the fourth area A4. The transparent areas TA are disposed between the six-sub blocking areas. The half-transmissive area HTA corresponds to the pixel electrode (184 of FIG. 8).

Figure 12N:
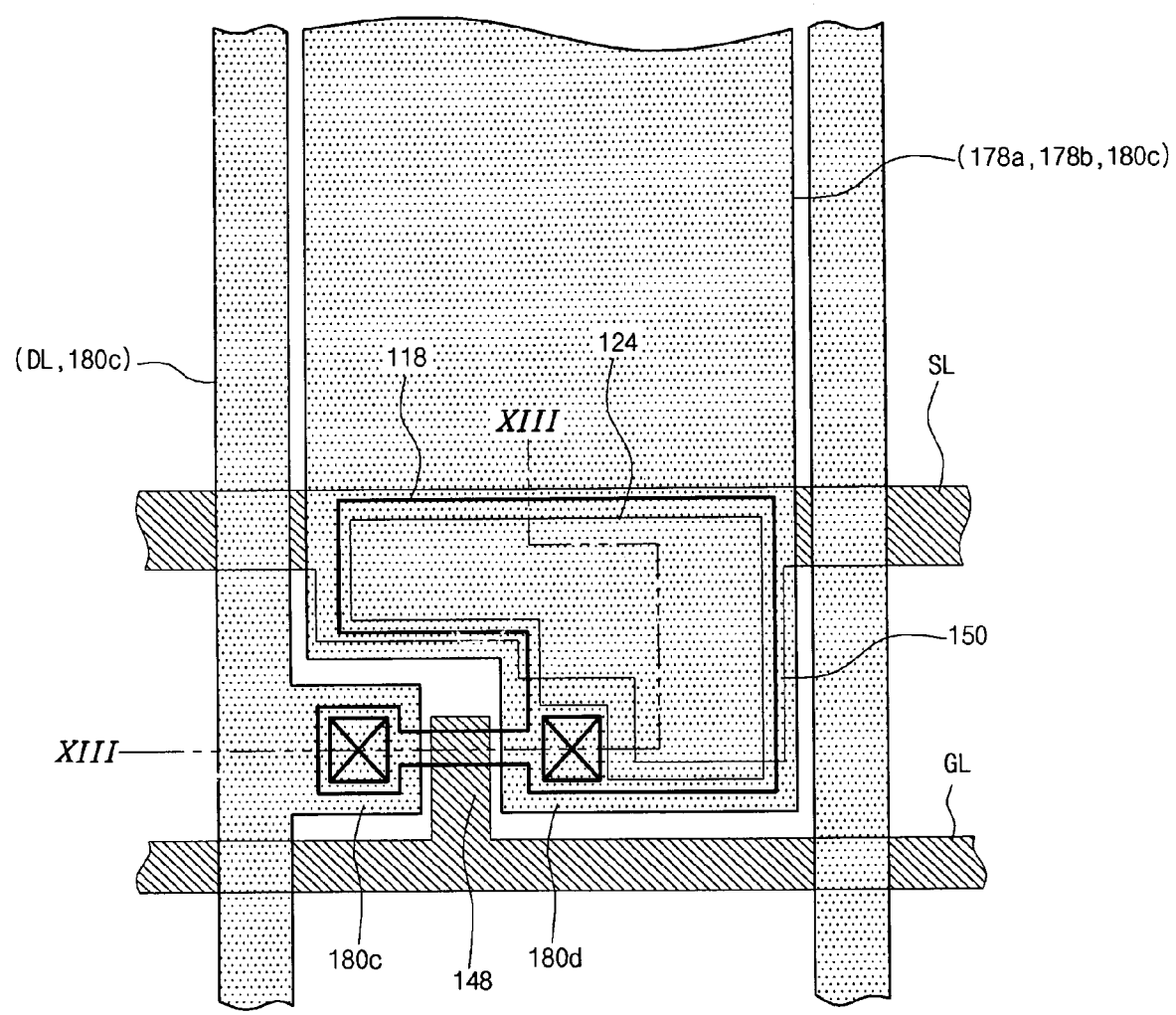
Figure 13N:
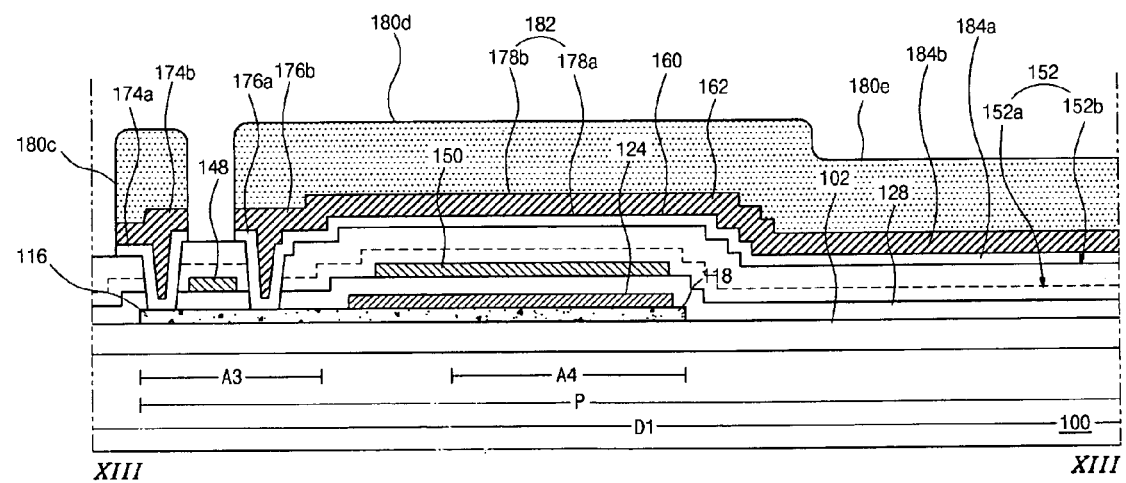

Then, eleventh, twelfth, thirteenth, fourteenth, and fifteenth PR patterns 180a, 180b, 180c, 180d, and 180e are formed on the conductive metal layer 162 by exposing and developing the fourth PR layer 164 using the fifth mask M5, as shown in FIG. 11N, FIG. 12N, and FIG. 13N. The eleventh PR pattern 180a corresponds to the seventh and eighth contact holes (154a and 154b of FIG. 11L), and the twelfth PR pattern 180b corresponds to the ninth and tenth contact holes (156a and 156b of FIG. 11L). The thirteenth PR pattern 180c corresponds to the eleventh contact hole (158a of FIG. 13L), and the fourteenth PR pattern 180d corresponds to the twelfth contact hole (158b of FIG. 13L) and the fourth area A4. The fifteenth PR pattern 180e extends from the fourteenth PR pattern 180*d* and has a smaller height than the eleventh, twelfth, thirtieth, and fourteenth PR patterns 180*a*, 180*b*, 180*c*, and 180*d* due to the half-transparent area HTA. The fifteenth PR pattern 180*e* corresponds to the pixel electrode (184 of FIG. 8). Next, the first, second, third, fourth, fifth, sixth, seventh, and eighth transparent electrode patterns 166*a*, 168*a*, 170*a*, 172*a*, 174*a*, 176*a*, 178*a*, and 184*a* and the first, second, third, fourth, fifth, sixth, seventh, and eighth conductive metal patterns 166*b*, 168*b*, 170*b*, 172*b*, 174*b*, 176*b*, 178*b*, and 184*b* are formed on the interlayer insulating layer 152 by removing the conductive metal layer 162 exposed between the eleventh, twelfth, thirteenth, and fourteenth, PR patterns 180*a*, 180*b*, 180*c*, and 180*d* and the transparent electrode layer 160 between the eleventh, twelfth, thirteenth, and fourteenth PR patterns 180*a*, 180*b*, 180*c*, and 180*d*. At the same time, the data line DL extending from the third source electrode 174 is formed in the display region D1. The data line DL crosses the gate line GL to define the pixel region P. The data line DL includes a transparent electrode pattern (not shown) extending from the fifth transparent electrode pattern 174*a* and a conductive metal pattern (not shown) extending from the fifth conductive metal pattern 174*b*.

Figure 12O:
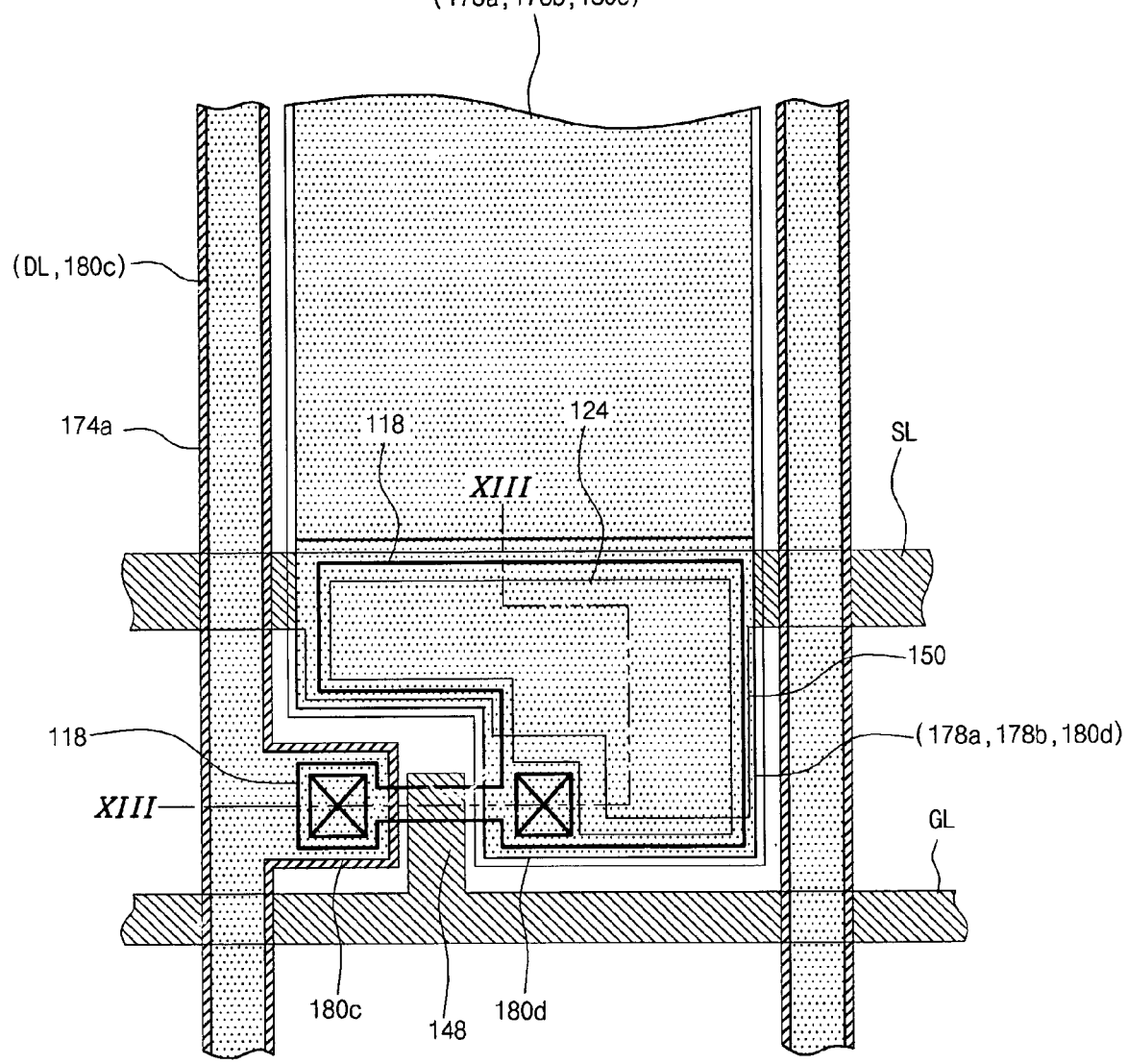
Figure 13O:
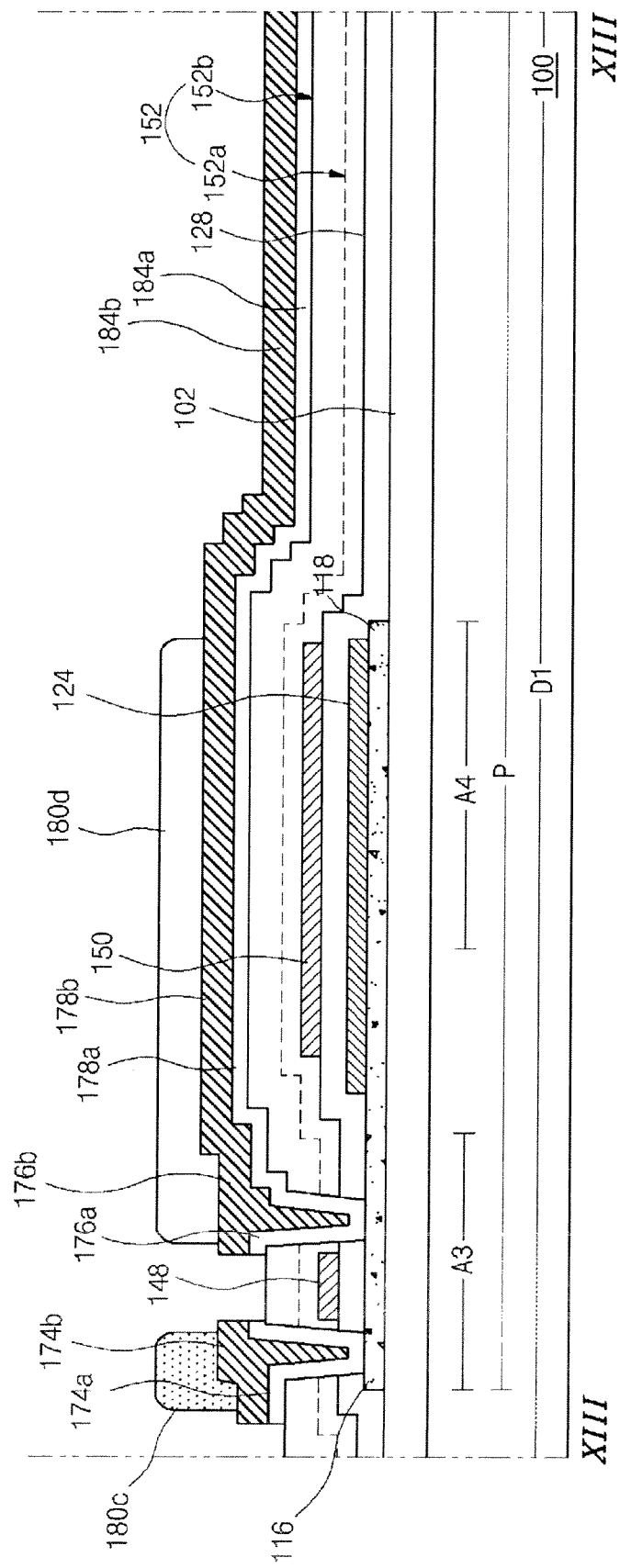
Figure 13P:
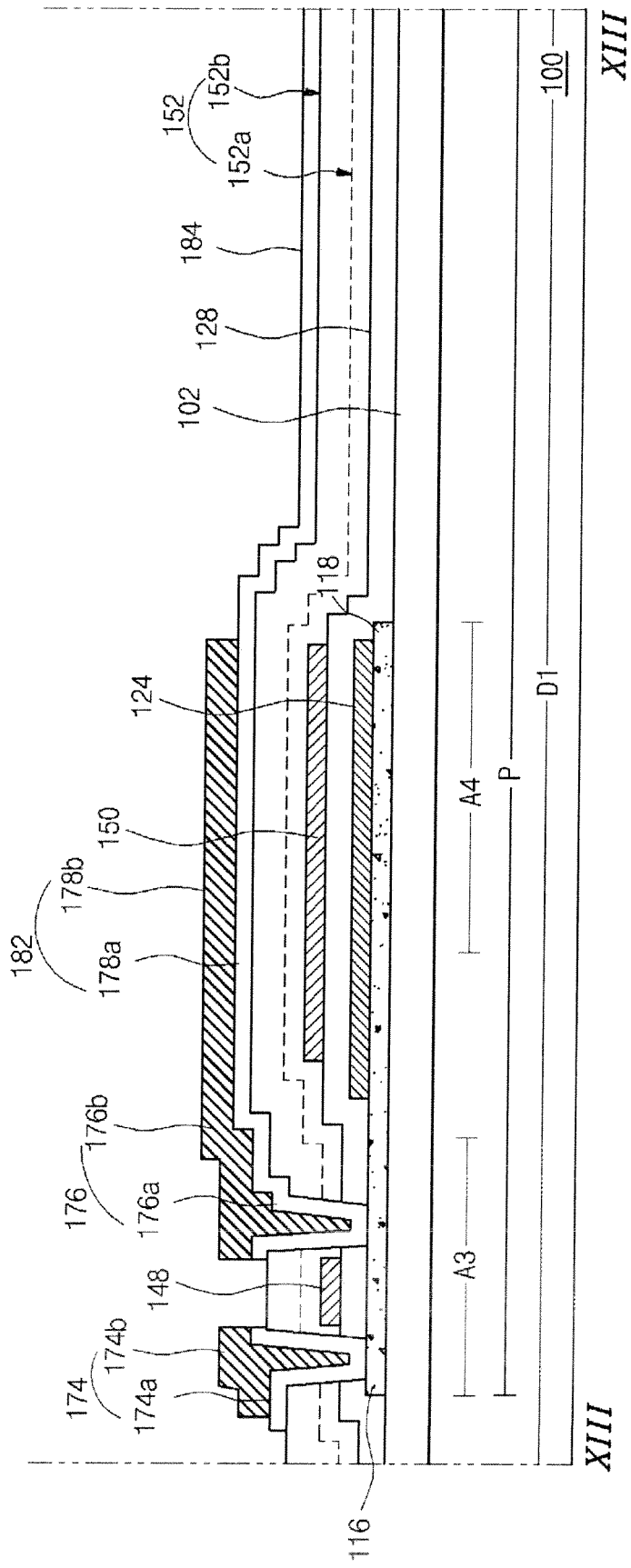

As shown in FIG. 11O, FIG. 12O, and FIG. 13O, a process of ashing the eleventh PR pattern 180*a* to expose ends of the first conductive metal pattern 166*b* and ends of second conductive metal pattern 168*b*, the twelfth PR pattern 180*b* to expose ends of the third conductive metal pattern 170*b* and the fourth conductive metal pattern 172*b*, the thirteenth PR pattern 180*c* to expose ends of the fifth conductive metal pattern 174*b*, the fourteenth PR pattern 180*d* to expose an end of the sixth conductive metal pattern 176*b*, and the fifteenth PR pattern 180*e* to expose an end of the seventh conductive metal pattern 178*b* and the eighth conductive metal pattern 184*b*. Then, the first, second, and third source electrodes 166, 170, and 174, the first, second, and third drain electrodes 168, 172, and 176, the third storage electrode 182, and the pixel electrode 184 are formed on the interlayer insulating layer 152 by removing the exposed ends of the first conductive metal pattern 166*b*, the second conductive metal pattern 168*b*, the third conductive metal pattern 170*b*, the fourth conductive metal pattern 172*b*, the fifth conductive metal pattern 174*b*, the sixth conductive metal pattern 176*b*, the seventh conductive metal pattern 178*b*, and the eighth conductive metal pattern 184*b*, as shown in FIG. 11P, FIG. 12P, and FIG. 13P.

As shown in FIG. 11P, FIG. 12P, and FIG. 13P, the first source electrode 166 in the first area A1 includes the first transparent electrode pattern 166*a* and the first conductive metal pattern 166*b*, and the first drain electrode 168 in the first area A1 includes the second transparent electrode pattern 168*a* and the second conductive metal pattern 168*b*. The second source electrode 170 in the second area A2 includes the third transparent electrode pattern 170*a* and the third conductive metal pattern 170*b*, and the second drain electrode 172 in the first area A2 includes the fourth transparent electrode pattern 172*a* and the fourth conductive metal pattern 172*b*. The third source electrode 174 in the third area A3 includes the fifth transparent electrode pattern 174*a* and the fifth conductive metal pattern 174*b*, and the third drain electrode 176 in the third area A3 includes the sixth transparent electrode pattern 176*a* and the sixth conductive metal pattern 176*b*. The third storage electrode 182 over the second storage electrode 150 in the fourth area A4 includes the seventh transparent electrode pattern 178*a* and the seventh conductive metal pattern 178*b*. The pixel electrode 184 includes the eighth transparent electrode pattern 184*a*. The eleventh, twelfth, thirteenth, and fourteenth PR patterns 180*a*, 180*b*, 180*c*, and 180*d* are removed. As mentioned above, the first, second, and third source electrodes 166, 170, and 174, the first, second, and third drain electrodes 168, 172, and 176, the third storage electrode 182, and the pixel electrode 184 are formed on the first substrate 100 only using the fifth mask (M5 of FIG. 11M).

Although not shown, the LCD device according to the exemplary embodiment of the present invention also includes a color filter substrate facing the array substrate. The color filter includes a second substrate, a black matrix, a color filter layer, and a common electrode. The black matrix on the second substrate may correspond to the non-display region of the first substrate, the gate and data lines, and the switching TFTs in the display region of the first substrate. The color filter layer on the black matrix includes three sub-color filters of red, green, and blue colors. The common electrode on the color filter layer corresponds to the pixel electrode such that an electric field between the common electrode and the pixel electrode is generated.

In the present invention, semiconductor layers of the driving circuit, the switching TFTs, the storage capacitors, and the counter electrodes of the storage capacitors are formed by a same mask process. In addition, the source and drain electrodes, the third storage electrodes and the pixel electrodes are formed by a same mask process. The array substrate according to the exemplary embodiment of the present invention is manufactured by a five mask process. The interlayer insulating layer includes a first layer of silicon oxide and a second layer of silicon nitride, for example. The second layer of silicon nitride and the pixel electrode have an improved interfacial characteristic. Since the array substrate according to the exemplary embodiment of the present invention is manufactured by the five mask process, the process of fabricating the array substrate for the LCD device is simplified.

It will be apparent to those skilled in the art that various modifications and variations can be made in the array substrate for a liquid crystal display device of the present invention and the method of fabricating the same without departing form the spirit or scope of the invention. Thus, it is intended that the present invention cover the modifications and variations of this invention provided they come within the scope of the appended claims and their equivalents.

What is claimed is:

1. A method of fabricating an array substrate for a liquid crystal display (LCD) device, the method comprising:
   preparing a substrate to include a display region and a non-display region;
   forming a first semiconductor layer and a second semiconductor layer in the non-display region of the substrate, and a third semiconductor layer and a fourth semiconductor layer in the display region of the substrate, the first semiconductor layer including a first region and a second region, the second semiconductor layer including a third region, a fourth region, and a fifth region, and the third semiconductor layer including a sixth region, a seventh region, and an eighth region;
   forming a counter electrode on the fourth semiconductor layer to define a first storage electrode;
   forming a gate insulating layer on the first to third semiconductor layer and the counter electrode;
   forming a first gate electrode on the gate insulating layer and over the first region of the first semiconductor layer, a fourth metal pattern on the gate insulating layer and covering the second semiconductor layer, and a fifth metal pattern on the gate insulating layer and covering the third semiconductor layer and the counter electrode;

doping the second region of the first semiconductor layer with high concentration p-type impurities;

forming a second gate electrode over the third region of the second semiconductor layer, a third gate electrode over the sixth region of the third semiconductor layer, and a second storage electrode over the first storage electrode, the second gate electrode being formed from the fourth metal pattern, and the third gate electrode and the second storage electrode being formed from the fifth metal pattern;

doping the fourth region of the second semiconductor layer and the seventh region of the third semiconductor layer with high concentration n-type impurities, and the fifth region of the second semiconductor layer and the eighth region of the third semiconductor layer with low concentration n-type impurities;

forming an interlayer insulating layer to cover the first, second, and third gate electrodes and the second storage electrode, the interlayer insulating layer having first and second contact holes exposing the second region of the first semiconductor layer, third, and fourth contact holes exposing the fourth region of the second semiconductor layer, and fifth and sixth contact holes exposing the seventh region of the third semiconductor layer; and forming first, second, and third source electrodes, first, second, and third drain electrodes, a third storage electrode, and a pixel electrode on the interlayer insulating layer, the first source electrode and the first drain electrode contacting the second region of the first semiconductor layer through the first and second contact holes, respectively, the second source electrode and second drain electrode contacting the fifth region of the second semiconductor layer through the third and fourth contact holes, respectively, the third source electrode and the third drain electrode contacting the eighth region of the third semiconductor layer through the fifth and sixth contact holes.

2. The method according to claim 1, wherein each of the first, second, and third source electrodes, the first, second, and third drain electrodes, and the third storage electrode includes a transparent electrode and a opaque electrode, and the pixel electrode is an extension of the transparent electrode of the third drain electrode.

3. The method according to claim 1, wherein the step of forming the interlayer insulating layer includes:
   forming a first interlayer insulating layer of silicon oxide; and
   forming a second interlayer insulating layer of silicon nitride on the first interlayer insulating layer.

4. The method according to claim 3, further comprising heating the substrate after the first interlayer insulating layer is formed.

5. The method according to claim 1, wherein the steps of forming the first, second, third, and fourth semiconductor layers and the first storage electrode include:
   forming a polycrystalline silicon layer, a first conductive metal layer, and a first photoresist (PR) layer;
   disposing a first mask having first, second, and third masking areas over the first PR layer, wherein the second masking area has a transmittance greater than the third masking area but less than the first masking area;
   forming a first PR pattern in the non-display region and one portion of the display region, and a second PR pattern in the other portion of the display region by exposing and developing the first PR layer, the second PR pattern having a height greater than the first PR pattern;
   forming first, second, and third metal patterns, the first, second, third, and fourth semiconductor layers, and the counter electrode by removing the first metal layer and the polycrystalline silicon layer exposed by the first, second, and third PR patterns, wherein the first metal pattern and the first semiconductor layer correspond to the first PR pattern, the second metal pattern and the second semiconductor layer correspond to the second PR pattern, the third metal pattern and the third semiconductor layer correspond to the third PR pattern, and the counter electrode and the fourth semiconductor layer correspond to the fourth PR pattern;
   exposing the first, second, and third metal pattern by ashing the first PR patterns; and
   removing the first, second, and third metal patterns and the second PR pattern.

6. The method according to claim 5, further comprising forming a buffer layer between the substrate and the polycrystalline silicon layer.

7. The method according to claim 1, wherein the forming the first gate electrode, the fourth metal pattern, and the fifth metal pattern includes:
   forming a second conductive metal layer, and a second photoresist (PR) layer on the gate insulating layer;
   forming fourth, fifth, and sixth PR patterns by exposing and developing the second PR layer using a second mask having a fourth and fifth masking areas, the fourth PR pattern corresponding to the first semiconductor layer and having a smaller size than the first semiconductor layer, the fifth PR pattern corresponding to the second semiconductor layer, the sixth PR pattern corresponding to the third and fourth semiconductor layers, and the fourth masking area having a greater transmittance than the fifth masking area; and
   forming the first gate electrode, the fourth metal pattern, and the fifth metal pattern by removing the second conductive metal layer exposed by the fourth, fifth, and sixth PR patterns.

8. The method according to claim 1, wherein the steps of forming the second gate electrode, the third gate electrode, and doping the fourth, fifth, seventh, and eighth regions include:
   forming seventh, eighth, ninth, and tenth PR patterns, the seventh PR pattern covering the first semiconductor layer, the eighth PR pattern corresponding to the third and fifth regions of the second semiconductor layer, the ninth PR pattern corresponding to the sixth and eighth regions of the third semiconductor layer, and the tenth PR pattern covering the fourth semiconductor layer;
   etching the fourth and fifth metal patterns using the seventh, eighth, ninth and tenth PR patterns as an etching mask to form the second gate electrode, the third gate electrode and the second storage electrode;
   doping the fifth region and the eighth region with high concentration n-type impurities;
   exposing the second gate electrode corresponding to the fifth region of the second semiconductor layer, the third gate electrode corresponding to the seventh eighth region of the third semiconductor layer, and ends of the second storage electrode corresponding to the counter electrode by ashing the seventh, eighth, ninth and tenth PR patterns;
   forming the second gate electrode corresponding to the third region of the second semiconductor layer, the third gate electrode corresponding to the sixth region of the third semiconductor layer, and the second storage electrode corresponding to the counter electrode by removing the portions of the second gate electrode, the third gate electrode, and the second storage electrode exposed by ashing the seventh, eighth, ninth, and tenth PR patterns;

doping the fourth region and the seventh region with low concentration n-type impurities; and removing the seventh, eighth, ninth, and tenth PR patterns.

9. The method according to claim 1, wherein the steps of forming the first, second, and third source electrodes, the first, second, and third drain electrodes, the third storage electrode, and the pixel electrode include:

forming a transparent electrode layer, a third conductive metal layer, and a fourth photoresist (PR) layer on the interlayer insulating layer;

disposing a fourth mask having sixth, seventh, and eighth masking areas over the fourth PR layer, the seventh masking area having a transmittance greater than the eighth masking area but less than the sixth masking area;

forming a eleventh PR pattern on the first and second contact holes, a twelfth PR pattern on the third and fourth contact holes, a thirteenth PR pattern on the fifth and sixth contact holes, a fourteenth PR pattern over the second storage electrode, and a fifteenth PR pattern in the pixel region by exposing and developing the fourth PR layer using the fourth mask, the fifteenth PR pattern having a smaller height than the eleventh, twelfth, thirteenth, and fourteenth PR patterns and being connected to the fourteenth PR pattern;

etching the transparent electrode layer and the third conductive metal layer using the eleventh, twelfth, thirteenth, and fourteenth PR patterns as an etching mask to form the first, second, and third source electrodes and the first, second, and third drain electrodes;

ashing the eleventh, twelfth, thirteenth, fourteenth and fifteenth PR pattern such that the third conductive metal layer on the pixel electrode is exposed; and forming the third storage electrode over the second storage electrode and the pixel electrode in the pixel region by removing the third conductive metal layer in the pixel region.

10. The method according to claim 1, wherein the third storage electrode extends from the third drain electrode and is disposed over the second storage electrode, and the pixel electrode extends from the storage electrode into the pixel region.

* * * * *